US008366528B2

(12) United States Patent
Hayashida et al.

(10) Patent No.: US 8,366,528 B2
(45) Date of Patent: Feb. 5, 2013

(54) COMPUTER READABLE STORAGE MEDIUM HAVING GAME PROGRAM STORED THEREON, GAME APPARATUS, AND GAME CONTROL METHOD

(75) Inventors: Koichi Hayashida, Kyoto (JP); Haruka Kakinuma, Kyoto (JP); Shigeru Miyamoto, Kyoto (JP); Takashi Tezuka, Kyoto (JP); Hiroyuki Kimura, Kyoto (JP); Shigeyuki Asuke, Kyoto (JP); Yusuke Amano, Kyoto (JP)

(73) Assignee: Nintendo Co., Ltd., Kyoto-Shi, Kyoto (JP)

( * ) Notice: Subject to any disclaimer, the term of this patent is extended or adjusted under 35 U.S.C. 154(b) by 449 days.

(21) Appl. No.: 12/729,730

(22) Filed: Mar. 23, 2010

(65) Prior Publication Data
US 2011/0111851 A1    May 12, 2011

(30) Foreign Application Priority Data

Nov. 11, 2009  (JP) .................................. 2009-258311

(51) Int. Cl.
*A63F 13/00* (2006.01)
(52) U.S. Cl. .............................................. 463/7; 463/37
(58) Field of Classification Search ................ 463/7, 36, 463/37, 39
See application file for complete search history.

(56) References Cited

U.S. PATENT DOCUMENTS

| | | | | |
|---|---|---|---|---|
| 5,868,620 | A  * | 2/1999 | Wada et al. ...................... | 463/38 |
| 6,533,663 | B1 * | 3/2003 | Iwao et al. ....................... | 463/32 |
| 2008/0194333 | A1 * | 8/2008 | Zalewski ......................... | 463/42 |
| 2008/0268943 | A1 * | 10/2008 | Jacob .............................. | 463/23 |
| 2010/0035689 | A1 * | 2/2010 | Altshuler et al. ................ | 463/39 |
| 2010/0113116 | A1 * | 5/2010 | Theis ................................ | 463/7 |
| 2010/0144424 | A1 * | 6/2010 | Rogers et al. ................... | 463/23 |

FOREIGN PATENT DOCUMENTS
JP        2002-200351        7/2002

* cited by examiner

*Primary Examiner* — James S McClellan
(74) *Attorney, Agent, or Firm* — Nixon & Vanderhye P.C.

(57) ABSTRACT

Manual operation means controls a motion of an operation target character in accordance with operation data outputted from an input device. Automatic motion control means controls the motion of the operation target character in accordance with a series of pieces of operation data which are prepared in advance. Game control means performs a first process when a first condition is satisfied as a result of control of the motion of the operation target character by the manual operation means only in a predetermined interval in a game in progress, performs a second process which is different from the first process when a second condition is satisfied, and executes the first when the control of the motion is performed by the automatic motion control means in at least a part of the interval regardless of whichever condition is satisfied.

26 Claims, 29 Drawing Sheets

F I G. 1
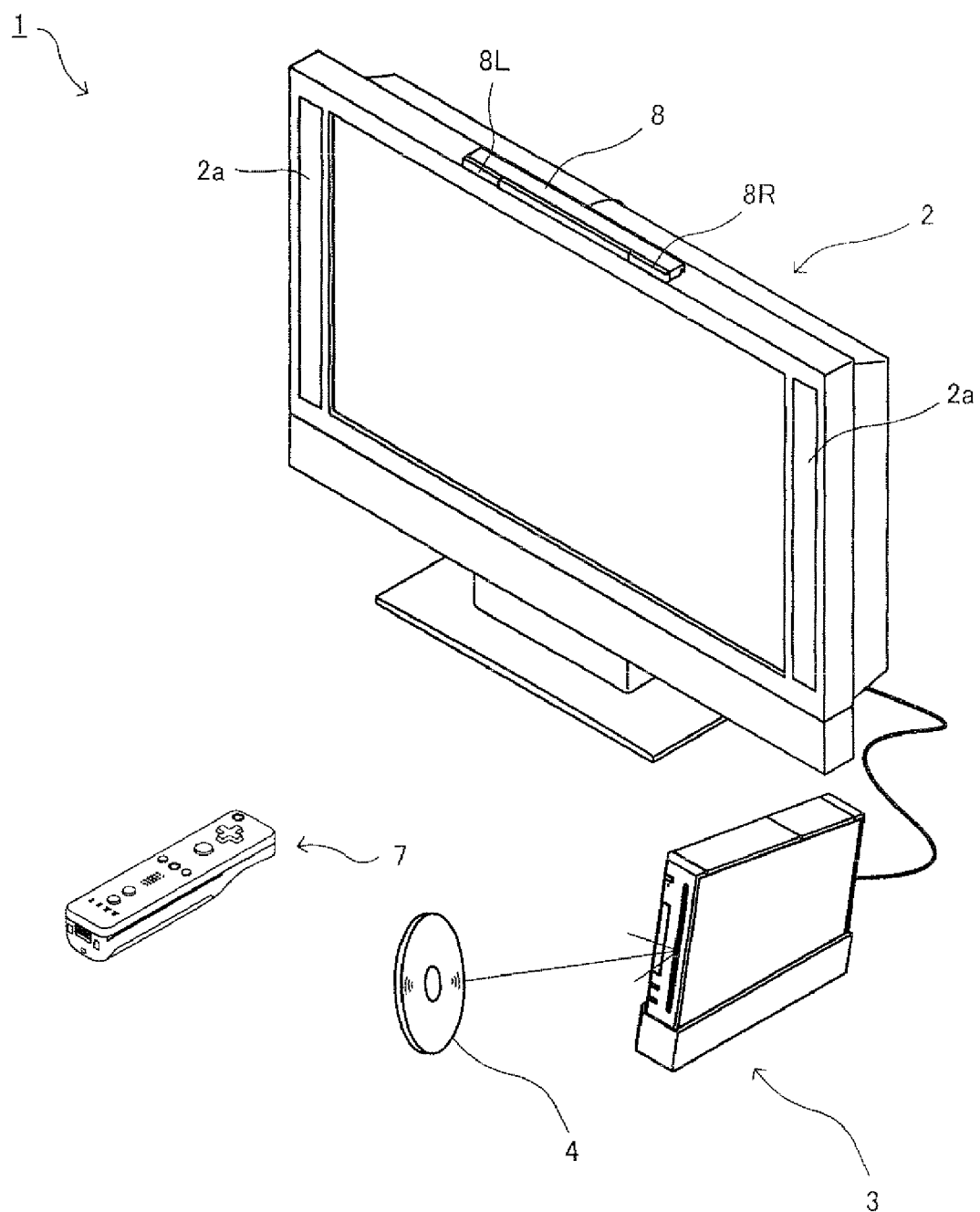

FIG. 12
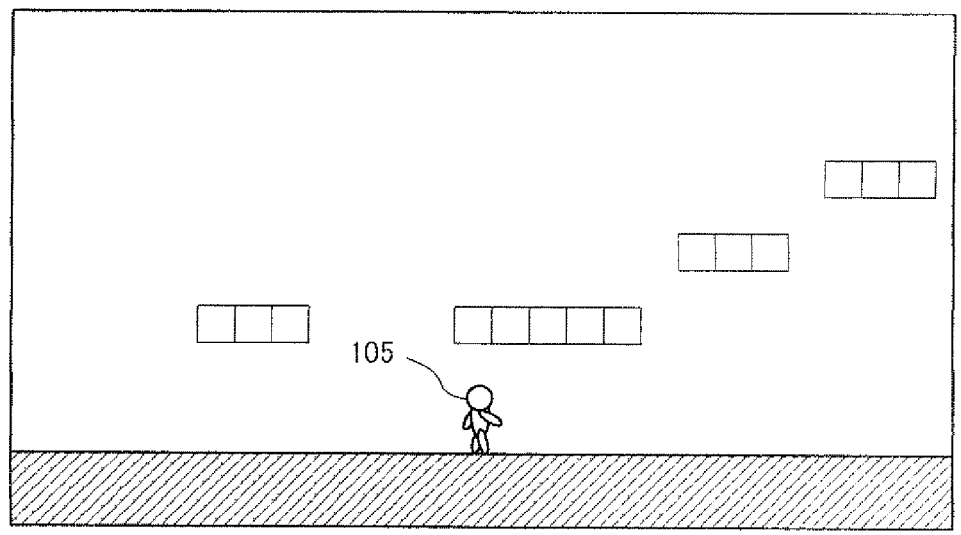
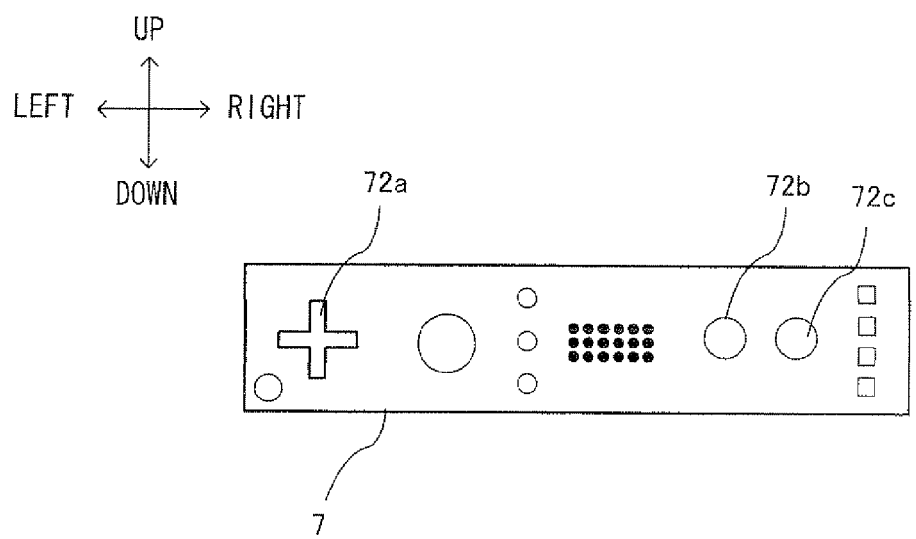

F I G. 15
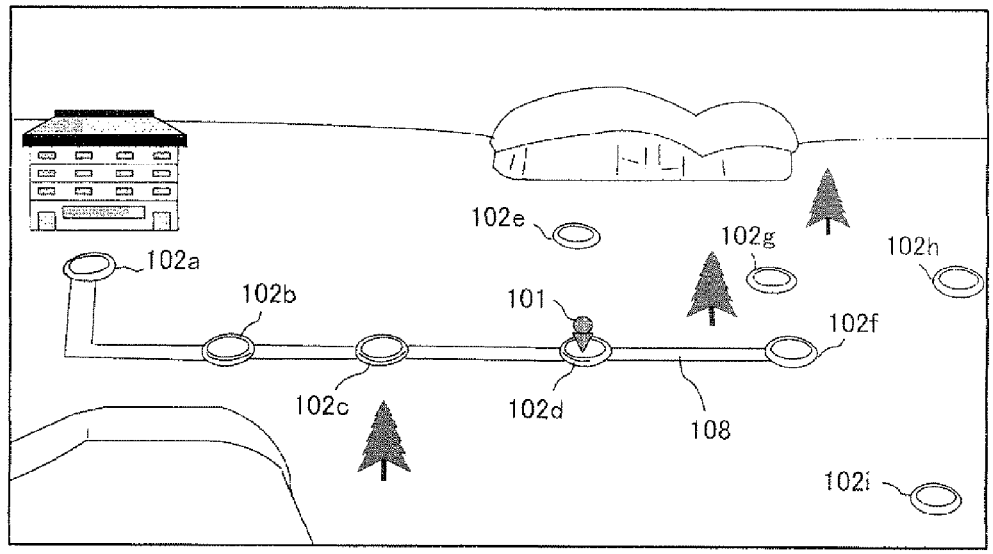
F I G. 16
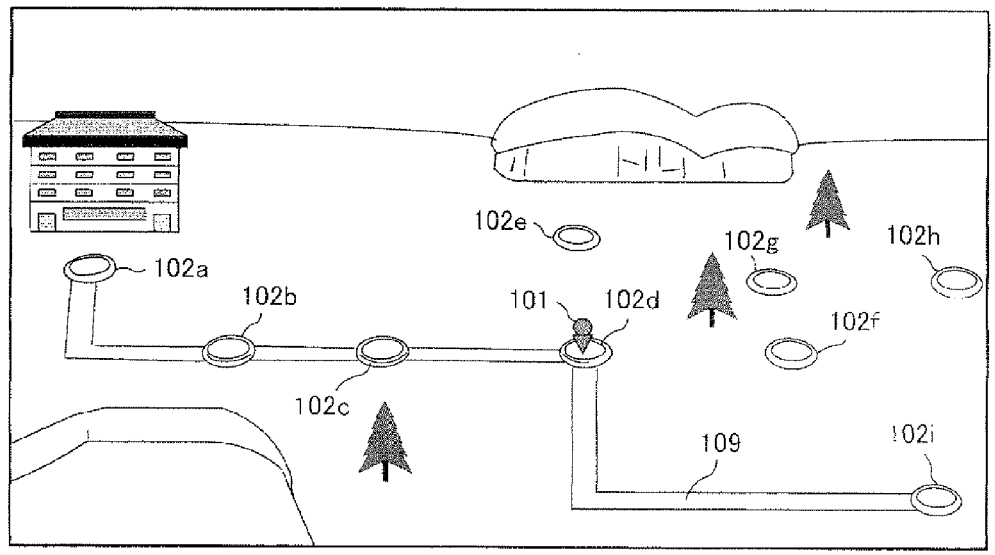

137

| | UP | DOWN | LEFT | RIGHT | A | B | 1 | 2 | + | - | HOME | PWR |
|---|---|---|---|---|---|---|---|---|---|---|---|---|
| 1371 | | | | | | | | | | | | |
| 1372 | 0 | 0 | 0 | 1 | 0 | 1 | 0 | 0 | 0 | 0 | 0 | 0 |

135

| MAIN GOAL FLAG | SUB GOAL FLAG | MODEL CLEAR FLAG |
|---|---|---|
| OFF | OFF | OFF |

139

| COURSE NUMBER | NUMBER OF FAILURES DATA |
|---|---|
| 1-1 | 0 |
| 1-2 | 0 |
| 1-3 | 0 |
| ⋮ | ⋮ |

F I G. 2 7
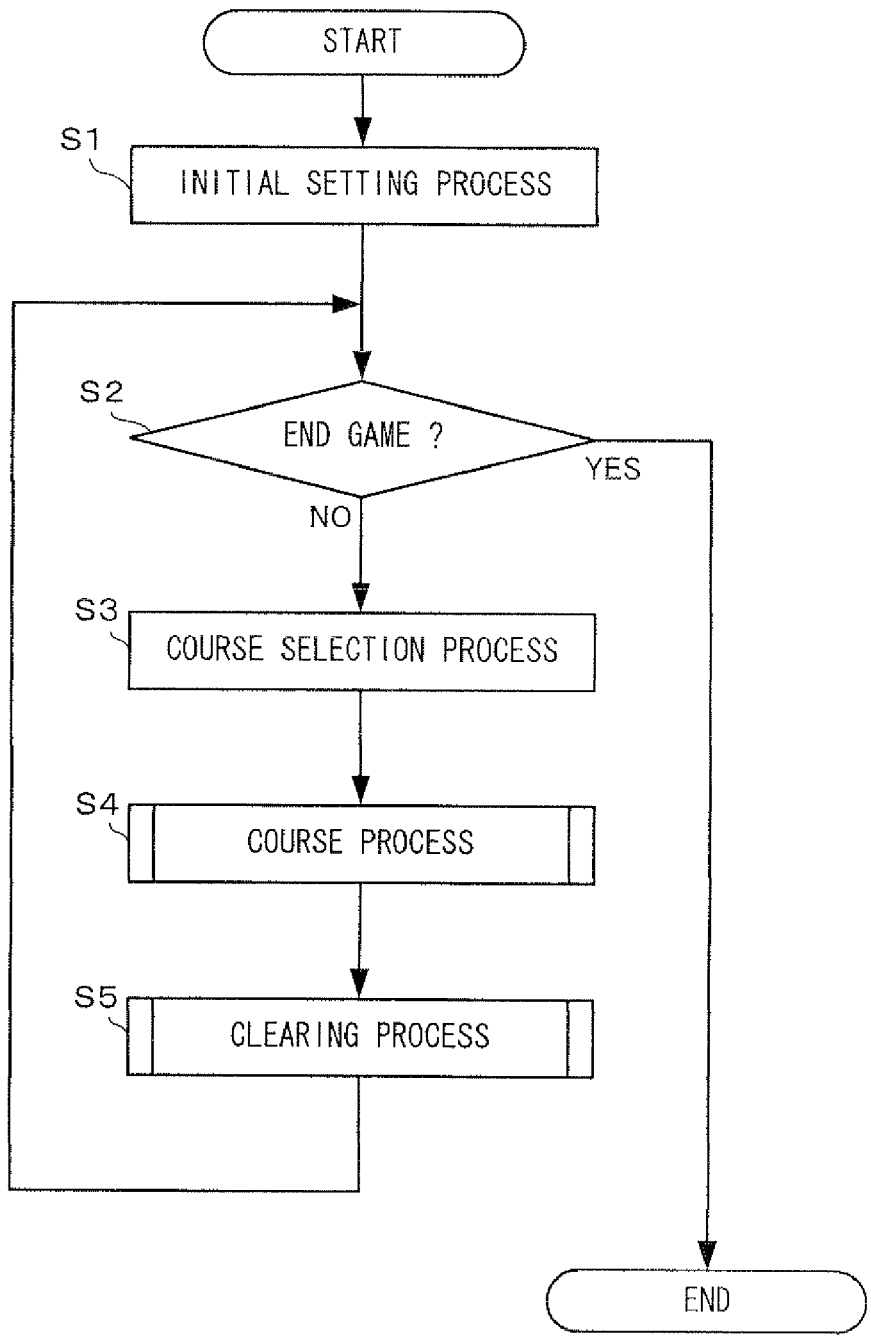

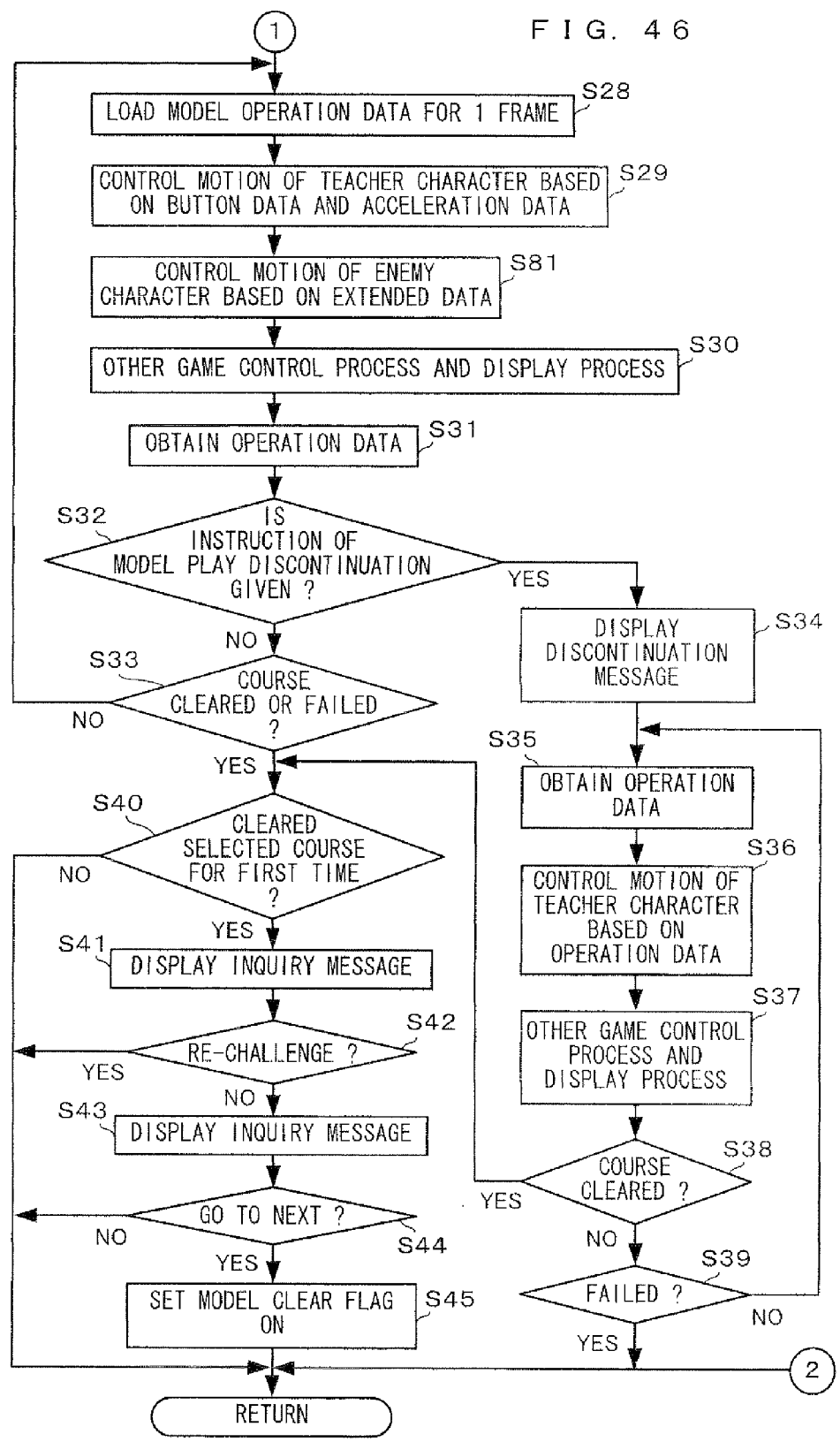

COMPUTER READABLE STORAGE MEDIUM HAVING GAME PROGRAM STORED THEREON, GAME APPARATUS, AND GAME CONTROL METHOD

CROSS REFERENCE TO RELATED APPLICATION

The disclosure of Japanese Patent Application No. 2009-258311, filed Nov. 11, 2009, is incorporated herein by reference.

BACKGROUND OF THE INVENTION

1. Field of the Invention

The present invention relates to a computer readable storage medium having stored thereon a game program executed by a computer of a game apparatus displaying a predetermined operation target character appearing in a virtual game space, a game system, and a game control method, and more particularly to a computer readable storage medium having a game program stored thereon, a game system, and a game control method which control the motion of an operation target character in accordance with operation data outputted from a predetermined input device.

2. Description of the Background Art

Conventionally, there have been various types of video games to be played on a video game apparatus. Examples of the video games are a role-playing game, or an action game. As to the role-playing game, for example, there is known a game program in which, during the game progress, a clue is displayed as a help action for a player who cannot solve a riddle and comes to a stalemate in the game progress (e.g., Japanese Laid-Open Patent Publication No. 2002-200351). In the game program, a clue message is displayed in the vicinity of a location where a special action can be performed when a character capable of performing the special action is not in a party (group of player characters operated by the player).

However, the above game program conventionally has the following problem. The above-described clue display is useful for a role-playing game (also referred to as RPG). However, for an action game, for example, highly complicated action operation is required, generally, as compared with the RPG or the like in order to operate the player character to perform a jump operation, an enemy attack operation, or the like. Therefore, even if a clue for solving a game is displayed in the form of character information, whether or not the player can proceed to the next game stage may depend on the player's skill.

In this regard, there is considered a method of utilizing previously arranged data for operating the player character. For example, a game developer operates the player character to advance the game stage, and data of the operation is recorded and stored, as automatic operation data, in a game disc or the like to be marketed. Then, when the player comes to a stalemate in a stage of the game, the automatic operation data controls a motion of the player character, thereby advancing the game. Use of this method can prevent a case where the player comes to a stalemate and cannot proceed forward, however, it lowers the difficulty level of the game significantly, and allows the player to easily clear the game, resulting in a decrease in fun of the game. That is, the method has a problem of causing the player to easily lose interest in the game.

SUMMARY OF THE INVENTION

Therefore, an object of the present invention is to provide a computer readable storage medium having a game program stored thereon, a game system, and a game control method which allow even a unskilled player to enjoy the game while preventing him/her from coming to a stalemate in a game, and prevent a decrease in fun of the game.

The present invention has the following features to attain the above-mentioned objects.

A first aspect is a computer readable storage medium having stored thereon a game program executed by a computer of a game apparatus which includes a predetermined input device outputting operation data indicative of details of an operation input performed by a player and which displays a predetermined operation target character appearing in a virtual game space. The game program causes the computer to function as manual operation means, automatic operation data obtaining means, automatic motion control means, and game control means. The manual operation means controls a motion of the operation target character in accordance with the operation data. The automatic operation data obtaining means obtains, from predetermined storage means, a series of pieces of operation data which cause the operation target character to move continuously and which are automatic operation data previously stored in the storage means. The automatic motion control means controls the motion of the operation target character in accordance with the automatic operation data in place of the manual operation means. The game control means performs a first process when a first condition is satisfied as a result of control of the motion of the operation target character by the manual operation means instead of by the automatic operation data, performs a second process that is different from the first process when a second condition is satisfied, and performs the first process when the motion of the operation target character is controlled by the automatic motion control means regardless of whether the first condition is satisfied or the second condition is satisfied.

According to the first aspect, it is possible to allow even such a player that is not good at a game to enjoy playing the game to the end, and also possible to prevent a player from losing interest in the game, which enhances the fun of the game.

In a second aspect based on the first aspect, the game program further causes the computer to function as manual/automatic switching means for switching the control of the motion of the operation target character between the control of the motion by the manual operation means and that by the automatic motion control means.

In a third aspect based on the second aspect, the game program further causes the computer to function as automatic control discontinuation means for discontinuing the control of the motion by the automatic motion control means in accordance with the operation data inputted during the control of the motion, when the motion of the operation target character is controlled by the automatic motion control means, so as to be switched to the control of the motion by the manual operation means.

According to the second to third aspects, while the motion of the operation target character is automatically controlled, the player can switch the control to his/her own control, and thus the fun of the game can be enhanced.

In a fourth aspect based on the first aspect, the automatic operation data is the series of pieces of operation data representing motions of the operation target character which satisfy the first condition.

According to the fourth aspect, a game element is provided which cannot be experienced by a player when only the automatic motion control is used, and thus it is possible to prevent the player from losing interest in the game, and also possible to enhance the fun of the game.

In a fifth aspect based on the first aspect, the game control means is executed in a predetermined interval in a game in progress which is realized by execution of the game program, and performs the first process regardless of whether the first condition or the second condition is satisfied when the motion of the operation target character is controlled by the automatic motion control means in at least a portion of the predetermined interval in the game in progress.

According to the fifth aspect, in a game in which the player needs to clear a plurality of intervals, it is possible to include such a game element that cannot be experienced by the player when each interval is cleared by using only the automatic motion control. Thus, it is possible to prevent the player from losing interest in the game, and also possible to enhance the fun of the game.

In a sixth aspect based on the fifth aspect, the game which is realized by execution of the game program includes a plurality of game stages which are obtained by dividing the progress of the game into predetermined units in accordance with how the progress of the game is going. In addition, the game is designed to cause a player to aim for final game clearing by sequentially clearing the plurality of game stages. The predetermined interval is each of the game stages.

According to the sixth aspect, in a game including a plurality of game stages, it is possible to allow even such a player that is not good at playing a game to enjoy the game to the end. Further, the game may include such a game element that cannot be experienced by a player when only the automatic motion control is used. Thus, it is possible to prevent the player from losing interest in the game, and also possible to enhance the fun of the game.

In a seventh aspect based on the sixth aspect, the first condition is that the operation target character has reached a first point which is previously set in the virtual game space in the game stage. Further, the second condition is that the operation target character has reached a second point which is previously set in the virtual game space in the game stage.

According to the seventh aspect, a plurality of goal points are arranged in each game stage, for example, and the process after course clearing may be changed depending on which goal point has been reached. Accordingly, it is possible to enhance the fun of the game.

In an eighth aspect based on the sixth aspect, the first process is a process of setting a predetermined stage as the game stage to be played subsequently, and the second process is a process of setting a stage that is different from the predetermined stage as the game stage to be played subsequently.

In a ninth aspect based on the eighth aspect, the first process is a process that allows the player to select the predetermined stage as the game stage to be played subsequently. The second process is a process that allows the player to select an other stage than the predetermined stage set by the first process as the game stage to be played subsequently.

According to the eighth or ninth aspect, in a game including a plurality of game stages, the game stage to be played subsequently can be changed depending on whether the game stage is cleared by using the automatic motion control or without using the automatic motion control. Accordingly, it is possible to set a game stage that cannot be experienced when only the automatic motion control is used. Thus, it is possible to prevent the player from losing interest in the game, and to enhance the fun of the game.

In a tenth aspect based on the fifth aspect, the first process is a process for setting a predetermined interval as an interval to be played subsequently, and the second process is a process for setting an other interval than the predetermined interval set by the first process as the interval to be played subsequently.

According to the tenth aspect, in a game in which the player needs to clear a plurality of intervals, it is possible to set such that when a certain interval has been cleared, an interval playable subsequently can be changed depending on how the interval is cleared.

In an eleventh aspect based on the first aspect, the first condition and the second condition are predetermined conditions achievable by the operation target character in the virtual game space.

According to the eleventh aspect, depending on the condition achieved, the process thereafter can be changed, whereby the fun of the game is enhanced.

In a twelfth aspect based on the second aspect, the game program further causes the computer to function as automatic control instruction means. The automatic control instruction means provides an instruction of switching from the control by the manual operation means to the control by the automatic control means in accordance with the operation data. The control of the motion of the operation target character is switched only when the automatic control instruction means provides the instruction.

According to the twelfth aspect, the control of the motion of the operation target character can be switched to the automatic motion control on the player's own will.

In a thirteenth aspect based on the twelfth aspect, the automatic control instruction means is usable only when a predetermined condition during the game is satisfied while the motion of the operation target character is controlled by the manual operation means.

According to the thirteenth aspect, only when a predetermined condition during a game is satisfied, the automatic motion control is available, whereby the fun of the game can be enhanced.

In a fourteenth aspect based on the thirteenth aspect, the automatic control instruction means arranges an instruction object in the virtual game space when the predetermined condition during the game is satisfied. In addition, the automatic control instruction means provides the automatic control switching means with an instruction to switch the control of the motion when the operation target character performs a predetermined action in response to the instruction object.

According to the fourteenth aspect, a predetermined operation by a player in response to the instruction object enables switching to the automatic motion control, and thus the player is easily notified of the switching to the automatic motion control.

In a fifteenth aspect based on the fourteenth aspect, the automatic control instruction means arranges the instruction object when the operation target character operated by the manual operation means satisfies a predetermined failure condition, which is previously set, for a predetermined number of times.

In a sixteenth aspect based on the fourteenth aspect, the automatic control instruction means arranges the instruction object when the play time in the predetermined interval exceeds a threshold which is previously set.

According to the fifteenth to sixteenth aspects, when the player comes to a stalemate during the game progress, the player can switch the control to the automatic motion control, and a player who is not good at the game can use the automatic motion control as a help action.

In a seventeenth aspect according to the first aspect, the game program further causes the computer to function as inquiry means and restoring means. The inquiry means inquires whether or not to re-challenge the game stage when the game stage has been cleared while the motion of the operation target object is controlled by the automatic control means. The restoring means restores the state of the game to the state before the start of the game stage when the re-challenge of the game stage is selected in the inquiry by the inquiry means.

According to the seventeenth aspect, the automatic motion control shows the player how to advance the game, for example, a game stage clearing method. Thereafter, the player can play the game stage by him/herself. Accordingly, even if a player comes to a stalemate during the game progress, the player can keep enjoying the game without giving up the game.

In an eighteenth aspect based on the first aspect, the game program further causes the computer to function as background music reproduction means and background music-associated motion control means. The background music reproduction means reproduces a background music including data for partially controlling a motion of a non-operation target character, which is an other character than the operation target character. The background music-associated motion control means partially controls the motion of the non-operation target character in accordance with the data for partially controlling the motion of the non-operation target character included in the background music. In addition, the automatic operation data includes data for partially controlling the motion of the non-operation target character. When the motion of the operation target character is controlled by the manual operation means, the background music-associated motion control means partially controls the motion of the non-operation target character in accordance with the data for partially controlling the motion of the non-operation target character included in the background music. When the motion of the operation target character is controlled by the automatic motion control means, the automatic motion control means partially controls the motion of the non-operation target character in accordance with the data for partially controlling the motion of the non-operation target character included in the automatic operation data.

According to the eighteenth aspect, variable game contents can be arranged, whereby the fun of the game is enhanced.

In a nineteenth aspect based on the first aspect, the input device includes at least one pressable button. The automatic operation data includes button data indicative of whether or not an operation of pressing the button is performed.

According to the nineteenth aspect, the motion of the operation target character created by using the button can be controlled by the automatic motion control, and thus the automatic motion control can be used as a help action for a player who is not good at complicated button operations.

In a twentieth aspect based on the first aspect, the input device includes an acceleration sensor. In addition, the automatic operation data includes acceleration data outputted from the acceleration sensor.

In a twenty-first aspect based on the first aspect, the input device includes an angular velocity sensor. In addition, the automatic operation data includes angular velocity data outputted from the angular velocity sensor.

According to the twentieth to twenty-first aspects, operations performed by using the acceleration and the angular velocities can be controlled by the automatic motion control, and thus the automatic motion control can be used as a help action for a player who is not good at operations using the acceleration or the angular velocities.

In a twenty-second aspect based on the first aspect, the input device includes imaging means for capturing at least one imaging target. In addition, the automatic operation data includes information on the position of an imaging target in a captured image represented by captured image data outputted from the input device including the imaging means.

According to the twenty-second aspect, operation of, for example, pointing to the screen can be controlled by the automatic motion control.

In a twenty-third aspect based on the first aspect, the input device includes an analog operation means which enables inputs in analog mode. In addition, the automatic operation data includes analog operation data outputted from the input device including the analog operation means.

According to the twenty-third aspect, a delicate operation such as that using the analog stick can be controlled by the automatic motion control.

A twenty-fourth aspect is a method for controlling a game in which operation data which indicates details of an operation input performed by a player and is outputted from a predetermined input device is obtained, and a predetermined operation target character appearing in a virtual game space is displayed. The method includes: a manual operation step of controlling a motion of the operation target character in accordance with the operation data; an automatic operation data obtaining step of obtaining, from predetermined storage means, a series of pieces of operation data which cause the operation target character to move continuously and which are automatic operation data previously stored in the storage means; an automatic motion controlling step of controlling the motion of the operation target character in accordance with the automatic operation data, in place of the manual operation step; and a game control step of performing a first process when a first condition is satisfied as a result of control of the motion of the operation target character by the manual operation step without using the automatic operation data, of performing a second process that is different from the first process when a second condition is satisfied, and of performing the first process when the motion of the operation target character is controlled by the automatic motion control step regardless of whether the first condition is satisfied or the second condition is satisfied.

A twenty-fifth aspect is a game system which includes a predetermined input device outputting operation data indicative of details of an operation input performed by a player and which displays a predetermined operation target character appearing in a virtual game space. The game system includes manual operation means, automatic operation data obtaining means, automatic motion control means, and game control means. The manual operation means controls a motion of the operation target character in accordance with the operation data. The automatic operation data obtaining means obtains, from predetermined storage means, a series of pieces of operation data which cause the operation target character to move continuously and which are automatic operation data previously stored in the storage means. The automatic motion control means controls the motion of the operation target character in accordance with the automatic operation data in place of the manual operation means. The game control means performs a first process when a first condition is satisfied as a result of control of the motion of the operation target character by the manual operation means instead of by the automatic operation data, performs a second process that is different from the first process when a second condition is satisfied, and performs the first process when the motion of the operation target character is controlled by the automatic motion control means regardless of whether the first condition is satisfied or the second condition is satisfied.

According to the twenty-fourth to twenty-fifth aspects, it is possible to attain an effect similar to that of the first aspect.

Further, the game program is such a game program that is executed by a computer of a game apparatus which includes a predetermined input device outputting operation data indicative of details of operation inputs by a player, and which displays a predetermined operation target character appearing in a virtual game space. The game program may cause the computer to function as manual operation means, automatic operation data obtaining means, automatic motion control means, inquiry means, and restoring means. The manual operation means controls a motion of an operation target character in accordance with operation data. The automatic operation data obtaining means obtains from the storage means automatic operation data which is a series of pieces of operation data for causing the operation target character to move continuously and is stored previously in predetermined storage means. The automatic motion control means controls the motion of the operation target character in accordance with the automatic operation data in place of the manual operation means. The inquiry means inquires whether or not to re-challenge a game stage when the game stage has been cleared while the motion of the operation target object was controlled by the automatic control means. The restoring means restores the state of the game to that prior to the start of the game stage when re-challenge of the game stage is selected in the inquiry means.

Further, the game program is such a game program that is executed by a computer of a game apparatus which includes a predetermined input device outputting operation data indicative of details of operation inputs by a player, and which displays a predetermined operation target character appearing in a virtual game space. The game program may cause the computer to function as manual operation means, automatic operation data obtaining means, automatic motion control means, background music reproduction means, and background music-associated motion control means. The manual operation means controls a motion of an operation target character in accordance with operation data. The automatic operation data obtaining means obtains from the storage means automatic operation data which is a series of pieces of operation data for causing the operation target character to move continuously and is stored previously in predetermined storage means. The automatic motion control means controls the motion of the operation target character in accordance with the automatic operation data in place of the manual operation means. The background music reproduction means reproduces a background music included in data for partially controlling the motion of a non-operation target character which is an other character than the operation target character. The background music-associated motion control means partially control the motion of the non-operation target character in accordance with the data for partially controlling the motion of the non-operation target character included in the background music. Moreover, the automatic operation data includes data for partially controlling the motion of the non-operation target character. In such a configuration, when the motion of the operation target character is controlled by the manual operation means, the background music-associated motion control means partially controls the motion of the non-operation target character in accordance with the data for partially controlling the motion of the non-operation target character included in the background music. Still moreover, when the motion of the operation target character is controlled by the automatic motion control means, the automatic motion control means partially controls the motion of the non-operation target character in accordance with the data for partially controlling the motion of the non-operation target character included in the automatic operation data.

According to the present invention, even such a player that is not good at playing a game can enjoy the game to the end (e.g., until the player sees the ending, and in addition, it is possible to prevent the player from easily losing interest in the game because of easy game stage clearing to the end with the use of the automatic operation data. Accordingly, the present invention improves fun of the game.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view illustrating a game system 1 according to an embodiment of the present invention;

FIG. 12 is a diagram showing an exemplary game screen of a game considered in the first embodiment;

FIG. 15 is a diagram showing an exemplary game screen of a game considered in the first embodiment;

FIG. 16 is a diagram showing an exemplary game screen of a game considered in the first embodiment;

FIG. 27 is a flowchart illustrating game processing according to the first embodiment of the present invention;

FIG. 46 is a flowchart illustrating a part of the course process according the second embodiment.

DESCRIPTION OF THE PREFERRED EMBODIMENTS

Figure 2:
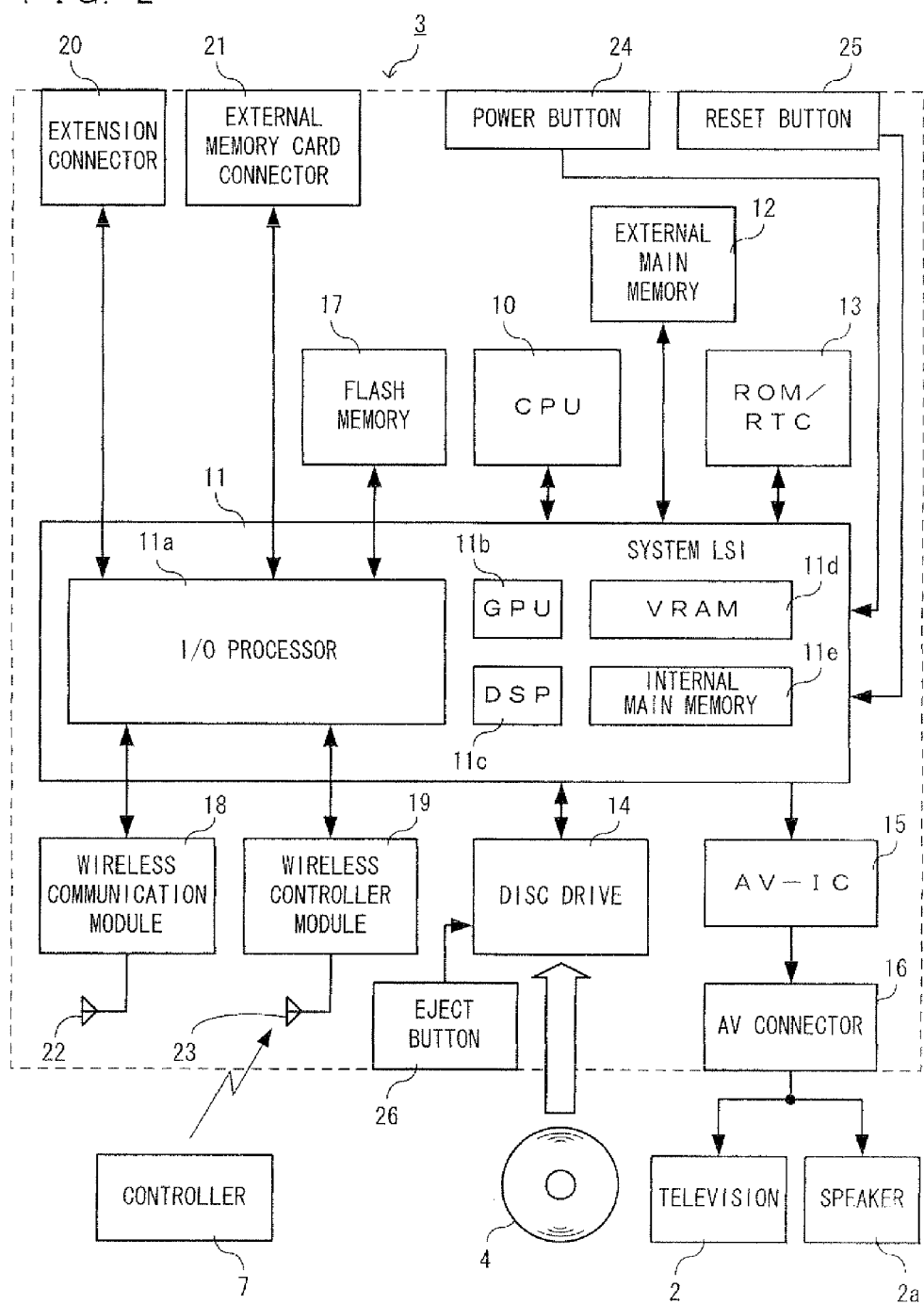
FIG. 2 is a functional block diagram of a game apparatus 5 shown FIG. 1.

Hereinafter, embodiments of the present invention will be described with reference to the drawings. Note that this embodiment does not limit the scope of the present invention in any way. First of all, prior to description of the details of respective embodiments, the configuration of a game system used commonly in the respective embodiments will be described.

(Overall Structure of Game System)

A game system 1 including a game apparatus according to an embodiment of the present invention will be described with reference to FIG. 1. FIG. 1 is an external view of the game system 1. A game apparatus and a game program according to the present embodiment will be described below, using a stationary game apparatus as an example. Referring to FIG. 1, the game system 1 includes a television receiver (hereinafter simply referred to as a "television") 2, a game apparatus 3, an optical disk 4, a controller 7, and a marker section 8. In this system, game processing is executed on the game apparatus 3 based on a game operation performed with the use of the controller 7.

In the game apparatus 3 the optical disk 4, which is an example of an information storage medium exchangeably used for the game apparatus 3, is detachably mounted. The optical disk 4 has stored therein a game program to be executed on the game apparatus 3. The game apparatus 3 has an opening on the front surface thereof for mounting the optical disk 4. The game apparatus 3 reads and executes the game program stored in the optical disk 4 inserted into the opening, and thereby executes game processing.

The game apparatus 3 is connected to the television 2, which is an example of a display device, via a connection cord. The television 2 displays a game image obtained as a result of the game processing executed by the game apparatus 3. In the adjacent area of the display screen of the television 2 (above the display screen in FIG. 1) the marker section 8 is provided. The marker section 8 includes at two ends thereof two markers 8R and 8L, respectively. Specifically, the marker 8R (also the marker 8L) includes one or more infrared LEDs, and outputs infrared light forward from the television 2. The marker section 8 is connected to the game apparatus 3, so that the game apparatus 3 can control each of the infrared LEDs included in the marker section 8 to be lit on or off.

The controller 7 is an input device for providing the game apparatus 3 with operation data representing the details of the operation performed thereon. The controller 7 and the game apparatus 3 are connected to each other via wireless communication. In the present embodiment, the controller 7 and the game apparatus 3 wirelessly communicate with each other using, for example, the Bluetooth (registered trademark) technology. Note that in another embodiment the controller 7 and the game apparatus 3 may be connected to each other in a wired manner.

(Internal Structure of Game Apparatus 3)

The internal structure of the game apparatus 3 will be described with reference to FIG. 2. FIG. 2 is a block diagram showing the structure of the game apparatus 3. The game apparatus 3 includes a CPU 10, a system LSI 11, an external main memory 12, a ROM/RTC 13, a disk drive 14, an AV-IC 15, and the like.

The CPU 10, which performs game processing by executing the game program stored in the optical disk 4, functions as a game processor. The CPU 10 is connected to the system LSI 11. The system LSI 11 is connected to the CPU 10 and also to the external main memory 12, the ROM/RTC 13, the disk drive 14, and the AV-IC 15. The system LSI 11, for example, controls data transfer between the elements connected thereto, generates images to be displayed, and obtains data from external devices. The internal structure of the system LSI 11 will be described below. The external main memory 12, which is of a volatile type, stores therein programs including the game program read from the optical disk 4, the game program read from a flash memory 17, or various other data. The external main memory 12 is used as a work area or a buffer area of the CPU 10. The ROM/RTC 13 includes a ROM (a so-called boot ROM) having incorporated therein a program for starting the game apparatus 3 and also includes a clock circuit (RTC: Real Time Clock) for counting time. The disk drive 14 reads program data, texture data, or the like from the optical disk 4, and writes the read data into an internal main memory 11e described below or the external main memory 12.

The system LSI 11 includes an input/output processor (I/O processor) 11a, a GPU (Graphics Processor Unit) 11b, a DSP (Digital Signal Processor) 11c, a VRAM 11d, and an internal main memory 11e. Although not shown, these elements 11a through 11e are connected to each other via an internal bus.

The GPU 11b, which forms a part of drawing means, generates an image in accordance with a graphics command (a command to draw an image) from the CPU 10. More specifically, the GPU 11b generates game image data by performing, in accordance with the graphics command, a calculation process that is necessary for displaying 3D graphics, such as coordinate transformation from 3D coordinates to 2D coordinates, which is a preprocessing step of rendering, and the application of a texture, which is a final process of rendering. Here, the CPU 10 provides the CPU 11b with an image generation program that is necessary for generating the game image data, as well as the graphics command. The VRAM 11d stores therein data (polygon data, texture data, etc.) that is necessary for the GPU 11b to execute the graphics command. The CPU 11b uses the data stored in the VRAM 11d to generate image data.

The DSP 11e functions as an audio processor and generates audio data by using sound data, acoustic waveform (timbre) data, and the like that are stored in the internal main memory 11e or the external main memory 12. Similarly to the external main memory 12, the internal main memory 11e stores a program or various other data, and is used as a work area or a buffer area of the CPU 10.

The image data and the audio data that have been generated as described above are read by the AV-IC 15. The AV-IC 15 outputs the read image data to the television 2 via an AV connector 16, and also outputs the read audio data to a speaker 2a built in the television 2. Thus an image is displayed on the television 2 and also a sound is output from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an extension connector 20, and a memory card connector 21. The wireless communication module 18 is connected to an antenna 22. The wireless controller module 19 is connected to an antenna 23.

The input/output processor 11a is connected to a network via the wireless communication module 18 and the antenna 22, and therefore can communicate with other game apparatuses or various servers that are also connected to the network. The input/output processor 11a periodically accesses the flash memory 17 and detects the presence or absence of data required to be transmitted to the network. When the data is present, the input/output processor 11e transmits the data to the network via the wireless communication module 18 and the antenna 22. The input/output processor 11a also receives data transmitted from other game apparatuses or data downloaded from a download server, via the network, the antenna 22, and the wireless communication module 18, and stores the received data in the flash memory 17. The CPU 10 executes the game program, and thereby reads the data stored in the flash memory 17 and uses the read data for the game program. The flash memory 17 may have stored therein data (data stored after or during the game) saved as a result of playing the game with use of the game apparatus 3, as well as data to be transmitted to, or data received from, other game apparatuses or various servers.

The input/output processor 11a also receives operation data transmitted from the controller 7 via the antenna 23 and the wireless controller module 19, and stores (temporarily stores) the operation data in a buffer area of the internal main memory 11e or the external main memory 12.

The input/output processor 11a is connected to the extension connector 20 and the memory card connector 21. The extension connector 20, which is a connector for an interface such as USB or SCSI, can be connected to a medium such as an external storage medium, can be connected to a peripheral device such as another controller, or can be connected to a wired communication connector and thereby communicate with the network instead of the wireless communication module 18. The memory card connector 21 is a connector for connecting an external storage medium such as a memory card. For example, the input/output processor 11a can access an external storage medium via the extension connector 20 or the memory card connector 21, and therefore can store or read data.

The game apparatus 3 has a power button 24, a reset button 25, and an eject button 26. The power button 24 and the reset button 25 are connected to the system LSI 11. When the power button 24 is turned on, all the elements of the game apparatus 3 are supplied with power via an AC adapter (not shown). When the power button 24 is pressed in the state where power is on, the mode switches to a low-power standby mode. Since a current is being applied to the game apparatus 3 even in this state, it is possible to constantly keep the game apparatus 3 connected to a network such as the Internet. Note that when it is desired to turn off power in the state where power is on, it is possible to turn off power by pressing the power button 24 long for more than a predetermined period of time. When the reset button 25 is pressed, the system LSI 11 restarts a starting program of the game apparatus 3. The eject button 26 is connected to the disk drive 14. When the eject button 26 is pressed, the optical disk 4 is ejected from the disk drive 14.

Figure 3:
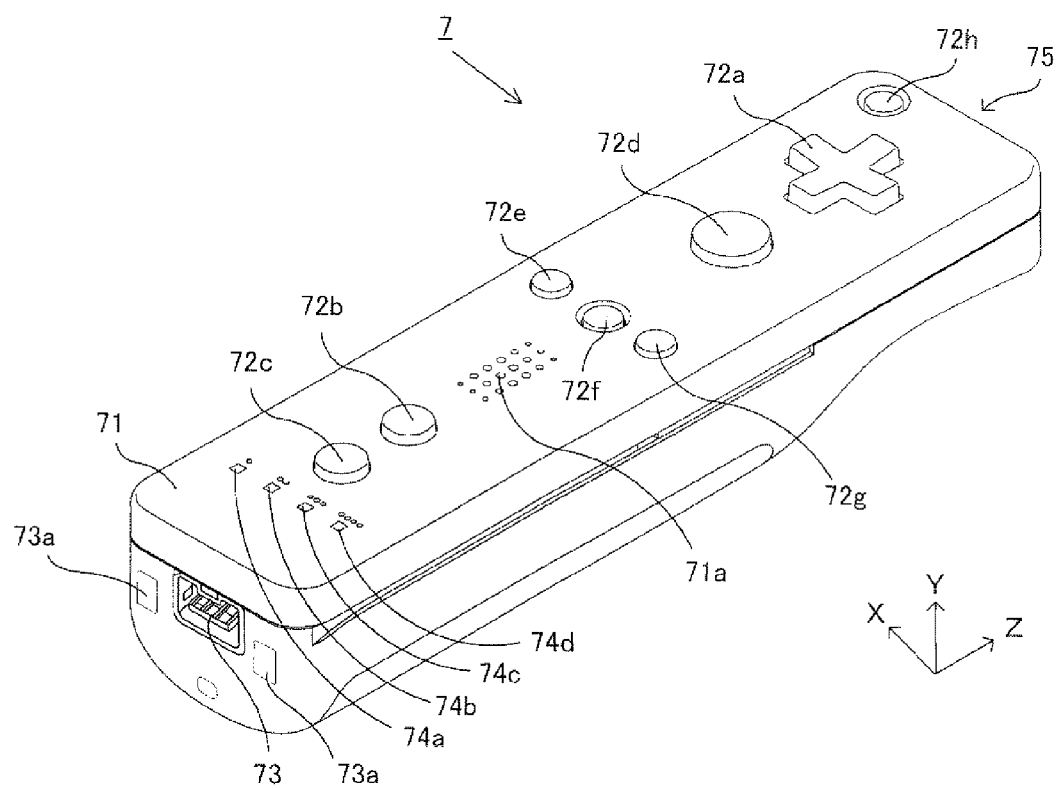
FIG. 3 is a perspective view of a controller 7 shown in FIG. 1 as viewed from the top rear side thereof.
Figure 4:
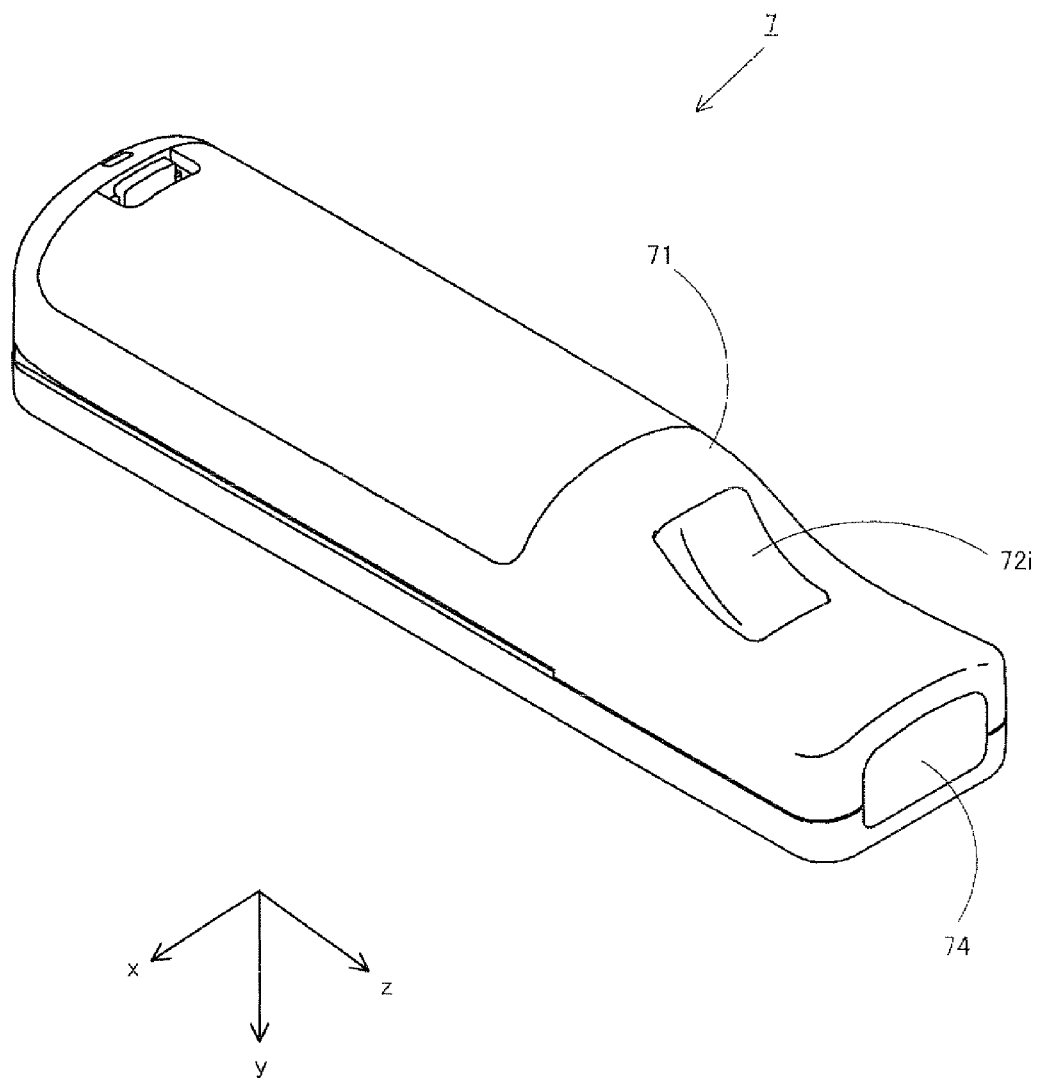
FIG. 4 is a perspective view of the controller 7 shown in FIG. 3 as viewed from the bottom front side thereof.

The controller 7 will be described with reference to FIGS. 3 and 4. Note that FIG. 3 is a perspective view of the controller 7 as viewed from the top rear side thereof. FIG. 4 is a perspective view of the controller 7 as viewed from the bottom front side thereof.

Referring to FIGS. 3 and 4, the controller 7 includes a housing 71 and an operation section 72 having a plurality of operation buttons provided on the surfaces of the housing 71. The housing 71 has a generally parallelepiped shape extending in the longitudinal direction from front to rear. The whole housing 71 can be held with one hand by an adult or even a child. The housing 71 is formed by, for example, plastic molding.

At the front center portion of the top surface of the housing 71a cross key 72a is provided. The cross key 72a is a cross-shaped four-direction push switch. The cross key 72a includes operation portions corresponding to four directions (front, rear, right, and left), which are respectively placed on the projecting portions, arranged at 90 degree intervals, of the cross shape. The player selects one of the front, rear, right, and left directions by pressing one of the operation portions of the cross key 72a. For example, through an operation on the cross key 72a, the player can instruct a player character or the like that appears in a virtual game world to move in the indicated direction, or select one of a plurality of options.

Note that the cross key 72a is an operation section for outputting an operation signal in accordance with the player's direction input operation described above; however, such an operation section may be provided in another form. For example, the cross key 72a may be replaced by an operation section that has four separate push switches extending in four directions corresponding to a cross, and may output an operation signal in accordance with one of the four push switches pressed by the player. Alternatively, an operation section may be provided that has a center switch, at the position at which the four directions meet, as well as and in combination with the above four push switches. Yet alternatively, the cross key 72a may be replaced by an operation section that includes an inclinable stick (a so-called joystick) projecting from the top surface of the housing 71 and outputs an operation signal in accordance with the inclining direction of the stick. Yet alternatively, the cross key 72a may be replaced by an operation section that includes a disk-shaped member horizontally slidable and outputs an operation signal in accordance with the sliding direction of the disk-shaped member. Yet alternatively, the cross key 72a may be replaced by a touch pad.

Behind the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads of the buttons, operation signals assigned to the operation buttons 72b, 72c, 72d, 72e, 72f, and 72g, respectively. For example, the operation buttons 72b, 72c, and 72d are assigned functions of a first button, a second button, and an A-button, respectively. Further, for example, the operation buttons 72e, 72f, and 72g are assigned functions of a minus button, a home button, and a plus button, respectively. The operation buttons 72a, 72b, 72c, 72d, 72e, 72f, and 72g are assigned various operation functions in accordance with the game program to be executed by the game apparatus 3. Note that referring to an example arrangement shown in FIG. 3, the operation buttons 72b, 72c, and 72d are arranged in a line in the front/rear direction in the center on the top surface of the housing 71. The operation buttons 72e, 72f, and 72g are arranged in a line in the left/right direction between the operation buttons 72b and 72d on the top surface of the housing 71. The operation button 72f has the top surface thereof buried in the top surface of the housing 71, so as not to be inadvertently pressed by the player.

In front of the cross key 72a on the top surface of the housing 71, an operation button 72h is provided. The operation button 72h is a power switch for remotely turning on/off the power of the game apparatus 3. The operation button 72h also has the top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from other controllers 7. For example, the LEDs 702 may be used to inform the player of the controller type currently set for the controller 7 that he/she is using. Specifically, when transmission data is transmitted from the controller 7 to the game apparatus 3, one of the plurality of LEDs 702 that corresponds to the controller type is lit on.

Between the operation button 72b and the operation buttons 72e, 72f and 72g on the top surface of the housing 71, a sound hole is provided for outputting to the outside a sound from a speaker (a speaker 706 shown in FIG. 5) described below.

On the other hand, on the bottom surface of the housing 71a recessed portion is formed. The recessed portion is formed at the position at which an index finger or a middle finger of the player is to be placed when the player holds the controller 7 with one hand while orienting the front surface of the controller 7 toward the markers 8L and 8R. On a slope surface of the recessed portion an operation button 72i is provided. The operation button 72i is an operation section that functions as, for example, a B-button.

On the front surface of the housing 71 an image pickup device 743 included in an imaging information calculation section 74 is provided. The imaging information calculation section 74 is a system for analyzing image data captured by the controller 7, determining an area having a high brightness in the image data, and therefore detecting the center of gravity, the size, and the like of the determined area. The imaging information calculation section 74 has a maximum sampling period of, for example, about 200 frames/sec., and therefore can trace and analyze even a relatively fast motion of the controller 7. The imaging information calculation section 74 will be described in detail below. On the rear surface of the housing 71a connector 73 provided. The connector 73 may be, for example, an edge connector, and is used to engage and connect with, for example, a connecting cable.

Here, in order to make the following description specific, a coordinate system to be set for the controller 7 is defined. As shown in FIGS. 3 and 4, an X-axis, a Y-axis, and a Z-axis, which are orthogonal to each other, are defined for the controller 7. Specifically, the longitudinal direction of the housing 71 corresponding to the front/rear direction of the controller 7 is defined as a Z-axis direction, and the direction toward the front surface (the surface on which the imaging information calculation section 74 is provided) of the controller 7 is defined as a Z-axis positive direction. The up/down direction of the controller 7 is defined as a Y-axis direction, and a direction toward the top surface (the surface on which the operation button 72a and the like are provided) of the housing 71 is defined as a Y-axis positive direction. The left/right direction of the controller 7 is defined as an X-axis direction, and the direction toward the left side surface (a side surface not shown in FIG. 3 but shown in FIG. 4) of the housing 71 is defined as an X-axis positive direction.

Figure 5:
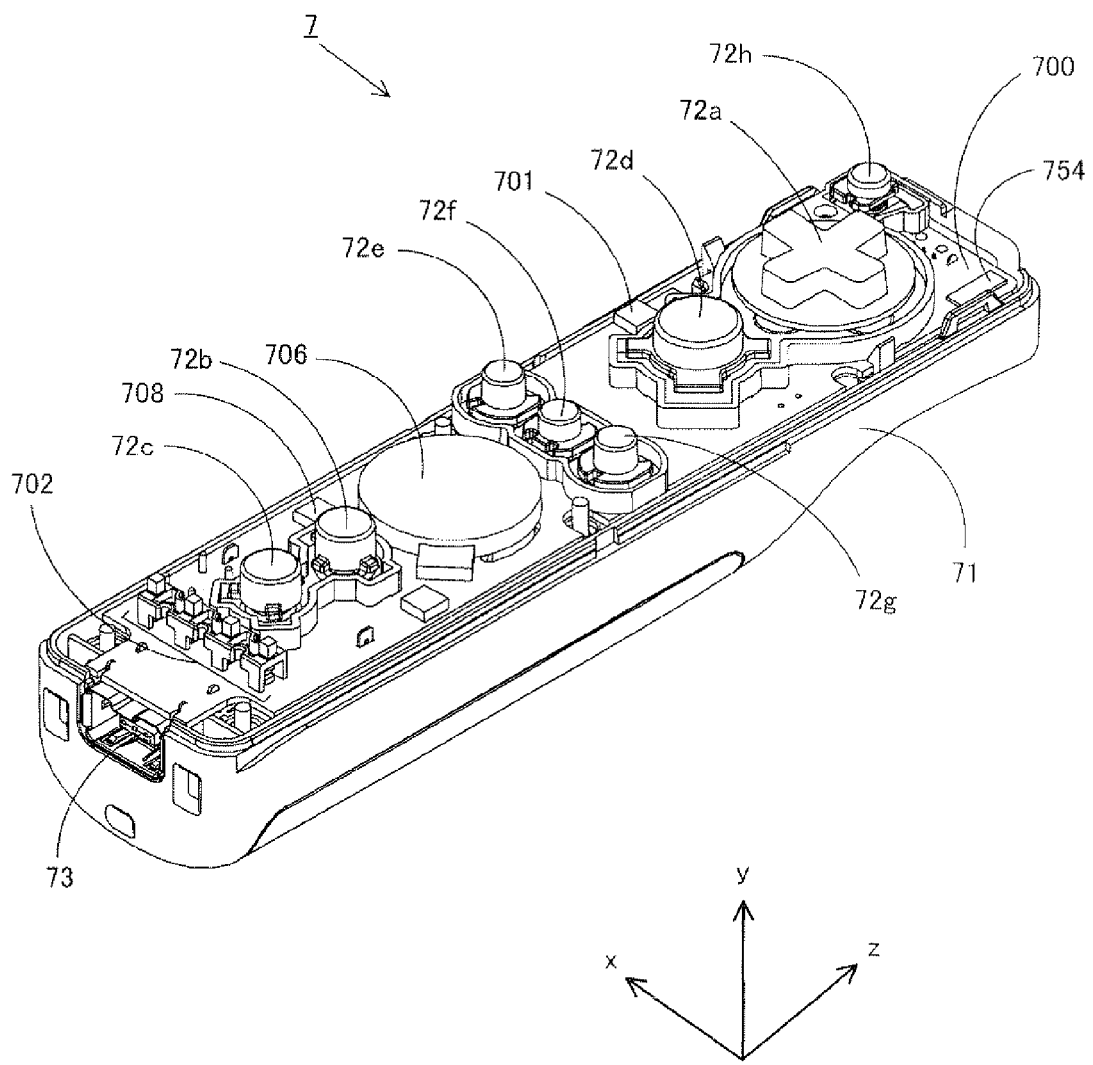
FIG. 5 is a perspective view of the controller 7 shown in FIG. 3 in a state where an upper casing thereof is removed.
Figure 6:
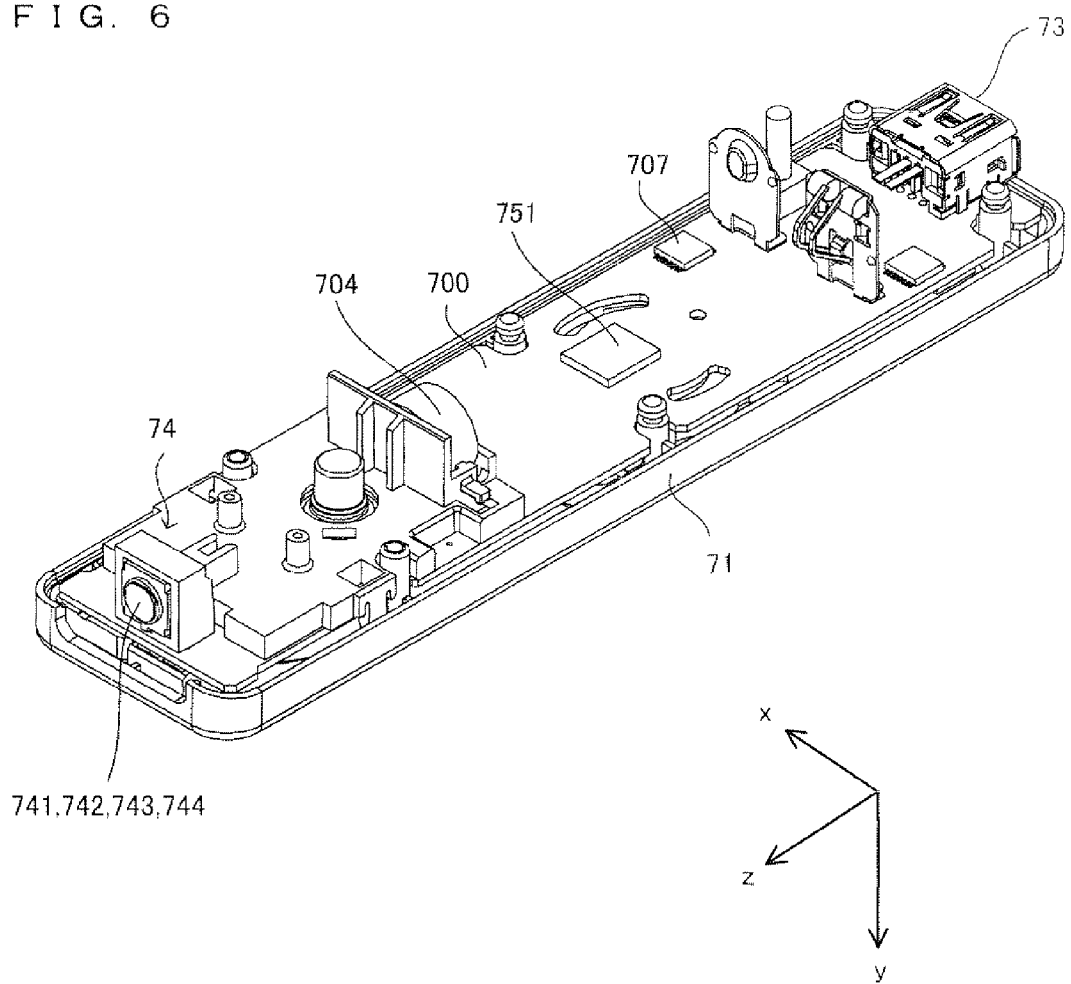
FIG. 6 is a perspective view of the controller 7 shown in FIG. 3 in a state where a lower casing thereof is removed.

The internal structure of the controller 7 will be described with reference to FIGS. 5 and 6. Note that FIG. 5 is a perspective view, from the top rear surface of the controller 7, in a state where an upper casing (a part of the housing 71) of the controller 7 is removed. FIG. 6 is a perspective view, as viewed from the bottom front surface of the controller 7, in a state where a lower casing (a part of the housing 71) of the controller 7 is removed. FIG. 6 is a perspective view showing the reverse side of a substrate 700 shown in FIG. 5.

Referring to FIG. 5, the substrate 700 is fixed within the housing 71. On the top main surface of the substrate 700 the operation buttons 72a, 72b, 72c, 72d, 72e, 72f, 72g and 72h, an acceleration sensor 701, the LEDs 702, an antenna 754, and the like are provided. These elements are connected to a microcomputer 751 (see FIGS. 6 and 7) and the like via wirings (not shown) formed on the substrate 700 and the like. The microcomputer 751 functions to generate operation data corresponding to the types of operation buttons, such as the operation button 72a. This well-known mechanism is realized by, for example, the microcomputer 751 determining whether a wiring is connected or disconnected by using a switch mechanism including a tact switch positioned under a key top, or the like. More specifically, when an operation button is pressed, wirings contact each other and a current is applied thereto. Then the microcomputer 751 detects which operation button is connected to the wirings having caused the application of the current, and generates a signal corresponding to the type of operation button.

A wireless module 753 (see FIG. 7) and the antenna 754 allow the controller 7 to function as a wireless controller. Note that a quartz oscillator (not shown), which is provided within the housing 71, generates a reference clock of the microcomputer 751 described below. On the top main surface of the substrate 700 the speaker 706 and an amplifier 708 are provided. The acceleration sensor 701 is provided on the substrate 700 to the left of the operation button 72d (i.e., provided not in the center portion but in the peripheral portion of the substrate 700). Accordingly, in accordance with the rotation of the controller 7 about the axis of the longitudinal direction thereof, the acceleration sensor 701 can detect an acceleration containing a centrifugal force component, as well as a directional change of a gravity acceleration. Thus, by a predetermined calculation, the game apparatus 3 and the like can determine the rotation of the controller 7 based on the detected acceleration data with excellent sensitivity.

On the other hand, referring to FIG. 6, at the front edge of the bottom main surface of the substrate 700 the imaging information calculation section 74 is provided. The imaging information calculation section 74 includes an infrared filter 741, a lens 742, the image pickup device 743, and an image processing circuit 744 that are placed in this order from the front surface of the controller 7 and are attached on the bottom main surface of the substrate 700. At the rear edge of the bottom main surface of the substrate 700 the connector 73 is attached. On the bottom main surface of the substrate 700 a sound IC 707 and the microcomputer 751 are provided. The sound IC 707, connected to the microcomputer 751 and the amplifier 708 via the wirings formed on the substrate 700 and the like, outputs an audio signal to the speaker 706 via the amplifier 708 in accordance with the sound data transmitted from the game apparatus 3.

On the bottom main surface of the substrate 700 a vibrator 704 is attached. The vibrator 704 may be, for example, a vibration motor or a solenoid. The vibrator 704, connected to the microcomputer 751 via the wirings formed on the substrate 700 and the like, is powered on/off in accordance with vibration data transmitted from the game apparatus 3. The controller 7 is vibrated by the actuation of the vibrator 704, and the vibration is conveyed to the player's hand holding the controller 7. Thus a so-called vibration-feedback game can be realized. Since the vibrator 704 is located at the relatively front side of the housing 71, a large vibration of the housing 71 allows the player holding the controller 7 to easily feel the vibration.

The internal structure of the controller 7 will be described with reference to FIG. 7. Note that FIG. 7 is a block diagram showing the structure of the controller 7.

Figure 7:
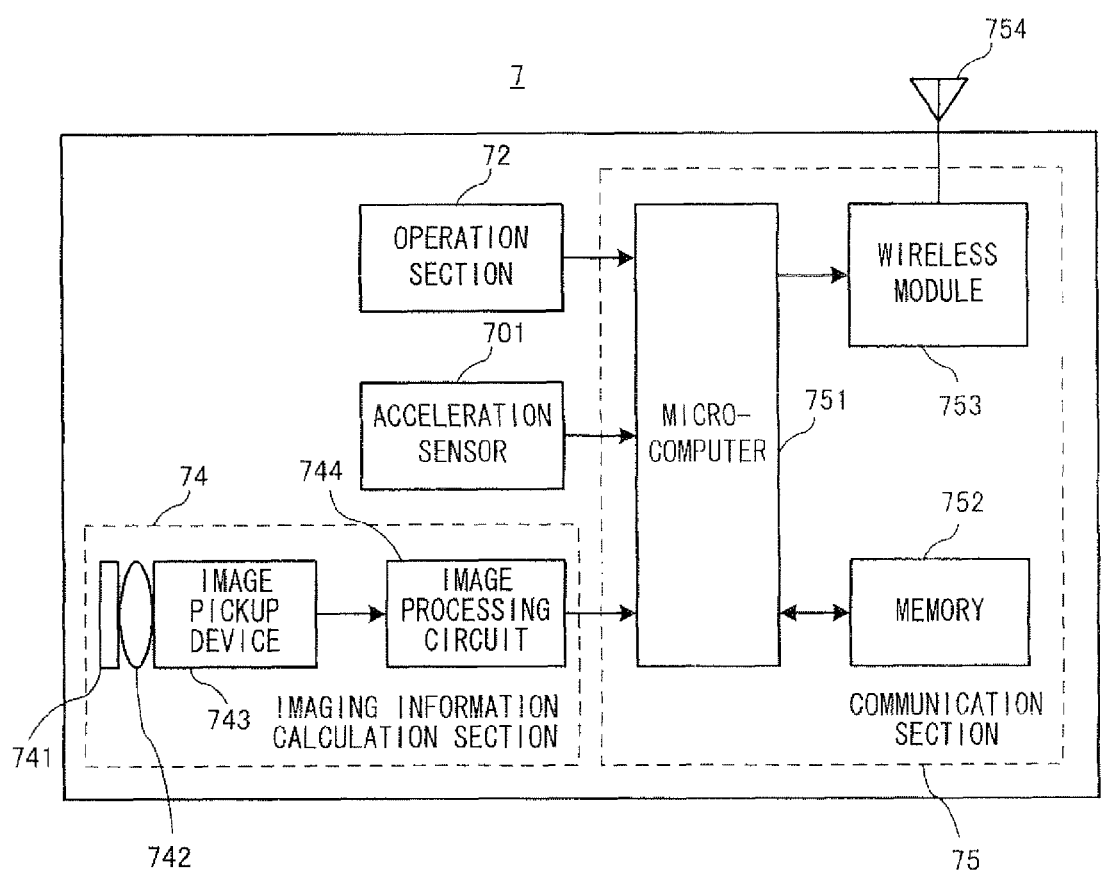
FIG. 7 is a block diagram showing a configuration of the controller 7 shown in FIG. 3.

Referring to FIG. 7, the controller 7 includes a communication section 75, as well as the operation section 72, the imaging information calculation section 74, the acceleration sensor 701, the vibrator 704, the speaker 706, the sound IC 707, and the amplifier 708 that are described above.

The imaging information calculation section 74 includes the infrared filter 741, the lens 742, the image pickup device 743, and the image processing circuit 744. The infrared filter 741 passes only infrared light, among the light incident on the front surface of the controller 7. Here, the markers 8L, and 8R located in the vicinity of the display of the television 2 are infrared LEDs outputting infrared light forward from the television 2. With the infrared filer 741, images of the markers 8L and 8R can be captured with high accuracy. The lens 742 collects infrared light having passed through the infrared filer 741, so as to be emitted to the image pickup device 743. The image pickup device 743 is a solid image pickup element such as a CMOS sensor or a CCD, for example, and captures infrared light collected by the lens 742. Accordingly, the image pickup device 743 captures only the infrared light having passed through the infrared filter 741, and thereby generates image data. Hereinafter, an image captured by the image pickup device 743 is referred to as a captured image. The image data generated by the image pickup device 743 is processed image processing circuit 744. The image processing circuit 744 calculates the positions (coordinates) of imaging targets (markers 8L and 8R) in the captured image. Hereinafter, the coordinates calculated by the image processing circuit 744 are referred to as marker coordinates. The marker coordinates are coordinate points representing positions of the imaging targets in the coordinate system for indicating a position, on a plane, corresponding to a captured image. The image processing circuit 744 outputs the marker coordinates to the microcomputer 751 in the communication section 75. The data of the marker coordinates is transmitted as operation data by the microcomputer 751 to the game apparatus 3. The marker coordinates changes depending on the orientation (attitude) of the controller 7, and thus the game apparatus 3 is capable of calculating the orientation or a position of the controller 7 by using the coordinate values. Further, by calculating a midpoint between two marker coordinate points, a pointed-to position pointed to by the player using the controller 7, i.e., pointed-to coordinates can be also calculated. For example, calculation may be performed as follows. That is, the position of the midpoint is represented by using an xy coordinate system for indicating a position, on a plane, corresponding to a captured image. Next, the CPU 10 converts the coordinates indicative of the position of the midpoint into coordinates on a coordinate system (x'y' coordinate system) for indicating a position on the screen of the television 2. The conversion may be performed by using a function which converts coordinates of the midpoint calculated from a certain captured image into coordinates, on the screen, corresponding to an actually pointed-to position, which is pointed to by the controller 7 when the captured image is captured. At that time, the pointed-to position pointed by the controller 7 and the positions of the marker coordinates in the captured image move in opposite directions, and thus conversion for up-down and right-left inversions is performed. Values indicated by the x'y' coordinate values calculated as above represents the pointed-to coordinates by the controller 7.

It is preferable that the controller 7 includes a three-axis (X-axis, Y-axis, and Z-axis) acceleration sensor 701. The three-axis acceleration sensor 701 senses linear accelerations in three directions, i.e., the up/down, left/right, and front/rear directions. In another embodiment, two-axis acceleration detection means for sensing linear accelerations along only the up/down and left/right directions (or another pair of directions) may be used depending on the types of control signals used for game processing. For example, this three-axis or two-axis acceleration sensor 701 may be of the type available from Analog Devices, Inc. or STMicroelectronics N.V. The acceleration sensor 701 may also be of an electrostatic capacitance (capacitance-coupling) type that is based on silicon micro-machined MEMS (Micro Electro Mechanical Systems) technology. However, the existing technology (e.g., piezoelectric type or piezoresistance type) of acceleration detection means or any other suitable technology developed in the future may be used to provide the three-axis or two-axis acceleration sensor 701.

As known to those skilled in the art, such acceleration detection means as used in the acceleration sensor 701 is capable of sensing only an acceleration (a linear acceleration) along a straight line corresponding to each axis of the acceleration sensor 701. In other words, direct output from the acceleration sensor 701 is a signal representing the linear acceleration (static or dynamic) along each of the two axes or three axes of the acceleration sensor 701. As a result, the acceleration sensor 701 cannot directly sense physical characteristics such as a motion along a non-linear (e.g., arcuate) path, a rotation, a rotational motion, an angular displacement, a tilt, a position, and an orientation.

Note that as those skilled in the art will readily understand from the description herein, a computer such as a processor (e.g., the CPU 10) of the game apparatus 3 or a processor (e.g., the microcomputer 751) of the controller 7 may perform a process based on acceleration signals output from the acceleration sensor 701, whereby it is possible to estimate or calculate (determine) further information about the controller 7. For example, in the case where the computer performs a process on the assumption that the controller 7 having the acceleration sensor 701 is in a static state (i.e., on the assumption that the acceleration detected by the acceleration sensor 701 is limited to a gravitational acceleration), if the controller 7 is actually in a static state, it is possible to determine, based on the detected acceleration, whether or not the controller 7 is tilted in the direction of gravity, and also to determine to what degree the controller 7 is tilted. Specifically, with reference to the state where the detection axis of the acceleration sensor 701 is directed in a vertically downward direction, it is possible to determine, based only on whether or not 1 G (a gravitational acceleration) is applied to the acceleration sensor 701, whether or not the controller 7 is tilted, and it is also possible to determine, based on the magnitude of the gravitational acceleration, to what degree the controller 7 is tilted. Alternatively, in the case of using a multi-axis acceleration sensor, the computer may perform a process on the acceleration signal of each axis, whereby it is possible to determine in more detail to what degree the controller 7 is tilted. In this case, the processor may calculate data of the tilt angle of the controller 7 based on the output from the acceleration sensor 701, or the processor may estimate an approximate degree of the tilt of the controller 7 based on the output from the acceleration sensor 701, without calculating data of the tilt angle. Thus the acceleration sensor 701 may be used in combination with a processor, whereby it is possible to determine the tilt, the orientation, or the position of the controller 7. On the other hand, in the case where the computer performs a process on the assumption that the controller 7 having the acceleration sensor 701 is in a dynamic state, an acceleration corresponding to the motion of the acceleration sensor 701, as well as a component of the gravitational acceleration, is detected, and therefore it is possible to determine the motion direction and the like of the controller 7 by removing the component of the gravitational acceleration through a predetermined process. Specifically, when the controller 7 having the acceleration sensor 701 is moved by being dynamically accelerated with the player's hand, it is possible to calculate various motions and/or positions of the controller 7 by performing processes on the acceleration signals generated by the acceleration sensor 701. Note that even in the case where the computer performs a process on the assumption that the controller 7 having the acceleration sensor 701 is in a dynamic state, it is possible to determine the tilt of the controller 7 relative to the direction of gravity by removing the acceleration corresponding to the motion of the acceleration sensor 701 through a predetermined process. In another embodiment, the acceleration sensor 701 may include an embedded signal processor or another type of dedicated processor for performing any desired process on the acceleration signals output from built-in acceleration detection means prior to outputting a signal to the microcomputer 751. For example, when the acceleration sensor 701 is intended to detect a static acceleration (e.g., a gravitational acceleration), the embedded signal processor or said another type of dedicated processor may convert a sensed acceleration signal into a corresponding tilt angle (or another preferable parameters).

In another embodiment, as a motion sensor for detecting the motion of the controller 7, a gyro sensor may be used that has built therein a rotation element, a vibration element, or the like. An example of an MEMS gyro sensor used in the present embodiment is available from Analog Devices, Inc. Unlike the acceleration sensor 701, a gyro sensor can directly sense a rotation (or an angular velocity) about an axis of at least one gyro element built therein. Thus, since a gyro sensor and an acceleration sensor are basically different from each other, it is necessary to appropriately change processes performed on output signals from these devices, depending on which one of the devices is selected for each purpose.

Specifically, when a tilt or an orientation is calculated using a gyro sensor instead of an acceleration sensor, a significant change is required. That is, when a gyro sensor is used, the value of the tilt is initialized at the start of detection. Then, angular acceleration data output from the gyro sensor is integrated. Next, the amount of change in tilt is calculated from the initialized tilt value. In this case, the calculated tilt has a value corresponding to an angle. On the other hand, when a tilt is calculated using an acceleration sensor, the tilt is calculated by comparing a predetermined reference to the value of a component of a gravitational acceleration with respect to each axis. Therefore the calculated tilt can be represented by a vector, and an absolute direction can be detected by acceleration detection means without initialization. Note that the value of the calculated tilt is an angle when the gyro sensor is used, while it is a vector when the acceleration sensor is used. Therefore, when the gyro sensor is used instead of the acceleration sensor, the tilt data is required to be subjected to predetermined conversion, with the difference between the two devices taken into account. As well as the basic difference between acceleration detection means and a gyro sensor, the characteristics of a gyro sensor is well known to those skilled in the art, and therefore will not be described in further detail herein. A gyro sensor has the advantage of directly sensing a rotation, while an acceleration sensor generally has the advantage of being more cost-effective than a gyro sensor when applied to such a controller as used in the present embodiment.

The communication section 75 includes the microcomputer 751, a memory 752, the wireless module 753, and the antenna 754. With the use of the memory 752 as a storage area during processing, the microcomputer 751 controls the wireless module 753 that wirelessly transmits transmission data. The microcomputer 751 controls the operations of the sound IC 707 and the vibrator 704, based on data received by the wireless module 753 from the game apparatus 3 via the antenna 754. The sound IC 707 processes sound data and the like transmitted from the game apparatus 3 via the communication section 75. The microcomputer 751 also actuates the vibrator 704 based on, for example, vibration data (e.g., a signal for powering the vibrator 704 on or off) transmitted from the game apparatus 3 via the communication section 75.

Data from the controller 7 including operation signals (key data) from the operation section 72, acceleration signals (X-axis, Y-axis and Z-axis direction acceleration data; hereinafter referred to simply as "acceleration data") from the acceleration sensor 701, and the process result data from the imaging information calculation section 74 is output to the microcomputer 751. The microcomputer 751 temporarily stores in the memory 752 the received data (the key data, the acceleration data, and the process result data) as transmission data to be transmitted to the wireless controller module 19. The wireless transmission from the communication section 75 to the wireless controller module 19 is performed periodically at predetermined time intervals. Since game processing is generally executed in a cycle of 1/60 sec., the wireless transmission is required to be performed in a shorter cycle time. Specifically, the unit of game processing is 16.7 ms (1/60 sec.), and the transmission interval of the communication section 75 configured using the Bluetooth (registered trademark) technology is 5 ms. At the time of performing transmission to the wireless controller module 19, the microcomputer 751 outputs to the wireless module 753 the transmission data stored in the memory 752, as a series of operation information. With the use of, for example, the Bluetooth (registered trademark) technology, the wireless module 753 modulates the operation information using a carrier wave of a predetermined frequency, and radiates an electric wave signal of the operation information from the antenna 754. That is, the data from the controller 7 including the key data from the operation section 72, the acceleration data from the acceleration sensor 701, and the process result data from the imaging information calculation section 74 is modulated into an electric wave signal by the wireless module 753, and is transmitted from the controller 7. The wireless controller module 19 of the game apparatus 3 receives the electric wave signal, and the game apparatus 3 demodulates and decodes the electric wave signal, and thereby obtains the series of operation information (the key data, the acceleration data, and the process result data). Based on the obtained operation information and the game program, the CPU 10 of the game apparatus 3 performs game processing. Note that when configured using the Bluetooth (registered trademark) technology, the communication section 75 can also have a function of receiving transmission data wirelessly transmitted from other devices.

Figure 8:
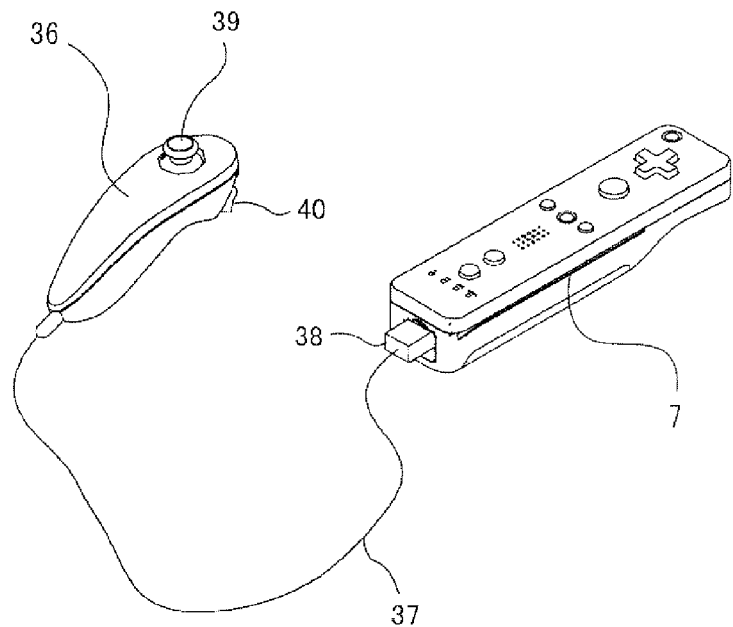
FIG. 8 is a diagram showing a state where an extended controller 36 is connected to a connector 73 of the controller 7.
Figure 9:
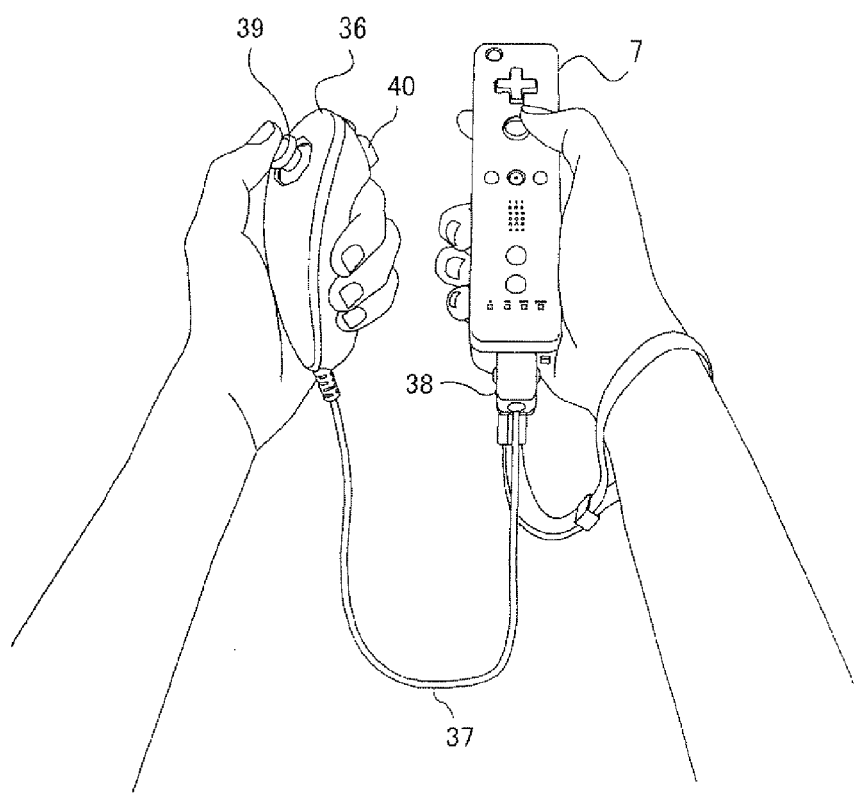
FIG. 9 is a diagram showing an example of how to hold the controllers.

Further, for the game described in this embodiment, an extended controller may be used for operation. For example, as shown in FIG. 8, a player character may be operated by using the extended controller 36 connected to the connector 73 of the controller 7, and details of the operation will be described later. In FIG. 8, a connector 38 is provided at the end of a cable 37 extending from the rear edge of the extended controller 36, and the connector 38 is connected to the connector 73 of the controller 7. Here, the extended controller 36 includes an analog stick 39 which enables inputs in analog mode and a pressable button 40. To play a game, the player holds the controller 7 with his/her right hand, and holds the extended controller 36 with his/her left hand as shown in FIG. 9, for example. In this case, the player holds the controller 7 such that the front surface (a side having an entrance of light to be captured by the imaging information calculation section 74) of the controller 7 held with the right hand is directed to the markers 8L and 8R. In this situation, the player changes the tilt of the controller 7, changes the position on the screen to be pointed to (pointed-to position) by the controller 7, or changes the distance between the controller 7 and the respective markers 8L and 8R, thereby performing a game operation.

When the connector 38 of the extended controller 36 is connected the connector 73, the operation data (input data) of the extended controller 36 is provided to the controller 7 via the cable 37. The controller 7 then transmits operation data including the input data of the controller 7 and the input data of the extended controller 36 to the game apparatus 3.

(First Embodiment)

Next, the concept of processing considered in the present invention will be described. The processing in the present invention relates to control of a motion of a player character (also referred to as a player object), and a game including the following two control methods is considered herein. As the first control method, provided is a method of controlling the motion of a player character in accordance with the operation signal from the controller 7 operated by the player. That is, a generally used control method of controlling the motion of a player character is provided. Provided as the second control method is based on automatic operation data arranged in advance, and is such a control method that causes the player character to move automatically (where player does not operate the controller 7). The automatic operation data is prepared, for example, by recording operation data (data indicative of which button is pressed and the like) outputted from the controller 7 used by a game developer to operate the player character.

In the game including the above-described two motion control methods, a case where the following game setting is done will be considered. Namely, a condition (e.g., goal point) to achieve a certain aim (e.g., a course clearing) is set in a game. Moreover, a plurality of conditions are set (e.g., a plurality of goal points are arranged), and one of the conditions can be selected alternatively to achieve the aim. In the present invention, control is performed as follows. When the above aim is achieved under the first condition by using the motion control based on the first control method, a first process is performed. When the above aim is achieved under the second condition by using the motion control based on the first control method, a second process is performed. However, when the second control method (a case where the automatic operation data is used) is utilized even for a short period of time, the first process is performed regardless of whether the aim is achieved under the first condition or under the second condition.

Next, an outline of the game considered in the first embodiment will be described with reference to FIG. 10 to FIG. 21. The game considered in the first embodiment is a 2D scrolling-type jump action game (various characters are drawn as 3D polygon models, though). The game includes a plurality of "courses", and the courses are cleared one by one, whereby the ending of the game finally appears. The courses may be referred to as "stages" (game stages), "worlds", "rounds", "areas", "chapters", "levels", "episodes", and the like depending on the games. That is, each of these indicates a unit forming a game such as an action game or the like in which a break between the courses or the like is obviously recognized. In other words, the courses or the like refers to respective intervals or periods when the progress of an entire game is divided into a predetermined number of units of intervals or periods, the units being determined based on the development of the story or the scenario (generally determined subjectively by the game developer).

Further, as the player character, which is the target to be operated by the player, a predetermined number of stock player characters are set in advance, and thus one failure by the player (for example, a case where the player character bumps against the enemy character) does not lead to the game over. The player can start playing the course from a predetermined position in the course where the player has failed while keep using the score or the like obtained by the player until that point, and keep playing the game until the number of the stock player characters comes to 0 (that is, a game using stock characters, which is widely adopted in action games).

Figure 10:
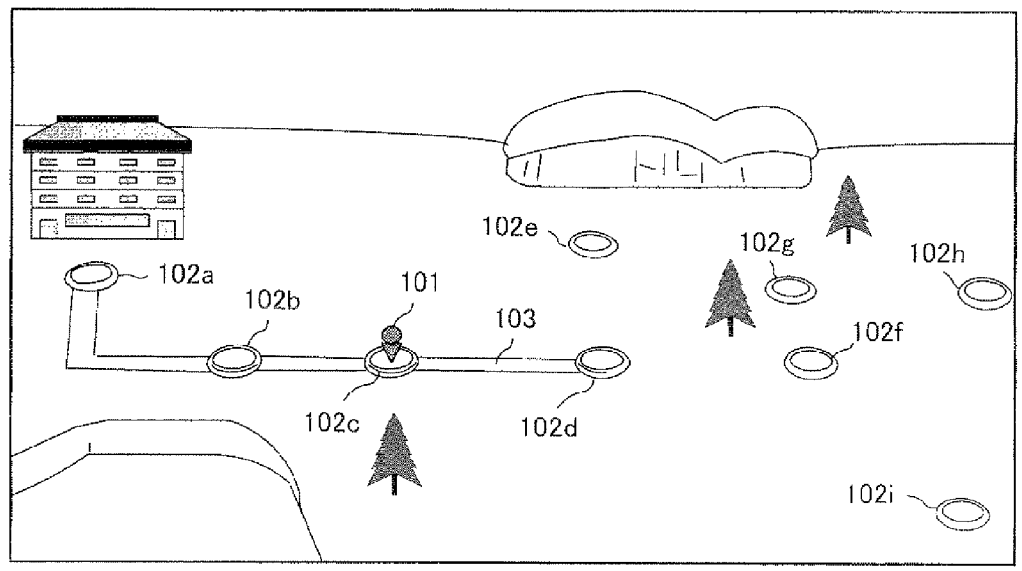
FIG. 10 is a diagram showing an exemplary game screen of a game considered in a first embodiment.
Figure 11:
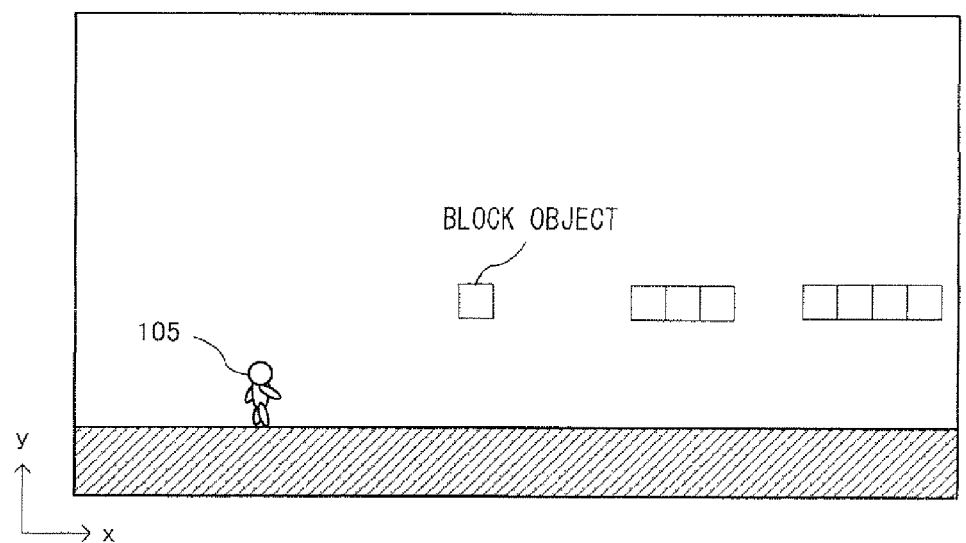
FIG. 11 is a diagram showing an exemplary game screen of a game considered in the first embodiment.

FIG. 10 shows an example of a screen for course selection (hereinafter referred to as a world map screen), and FIG. 11 shows a game screen of a selected course being played by the player (FIG. 11 is a screen showing a start point of the course). In the world map screen shown in FIG. 10, there are displayed a player mark 101 and a plurality of course marks 102a to 102i (hereinafter also collectively referred to as a course mark 102). At the time of starting the game, the player can only select the course starting from the course mark 102a shown on the upper left side of the screen in FIG. 10. As the player clears the respective courses one by one, a route leading to the next course mark is displayed, and thereby the player can proceed to (select) the next course. FIG. 10 shows a state immediately after the third course (course mark 102c) has been cleared, where a route 103 is newly connected to the fourth course mark 102d, thereby to allow the player to proceed to the fourth course (note that the course already cleared can be played again). The course mark 102 has a design representing a round lamp, and the lighting state thereof changes depending on whether or not the course has been cleared.

In the world map screen shown in FIG. 10, when the player moves the player mark 101 to the fourth course mark 102*d*, and performs an operation for selecting the course, then the screen is replaced with the screen shown in FIG. 11, and game processing relating to the course (hereinafter referred to as a course process) starts. Basically, the game proceeds to the right. Each course has a goal point where a flag object is arranged. The player causes the player character 105 to move forward toward the goal point. The course has been cleared when the player character 105 reaches the flag object on the goal point.

Here, the operation in the above course process will be described. The player operates the controller 7 while holding the controller 7 laterally such that the cross key 72*a* is on the left side. FIG. 12 shows the relation between the state of the controller 7 and the game screen. In the present embodiment, with the use of the cross key 72*a*, the player character 105 is caused to move in the up/down and left/right directions. In addition, with the use of the button 72*c*, the player character 105 is caused to jump. Further, when the player character 105 is moved while the button 72*b* is being pressed, it is possible to cause the player character 105 to make a dash. Still further, when the controller 7 is swung, it is possible to cause the player character 105 to perform a so-called "spin-jump", that is, to make a jump while spinning.

Figure 13:
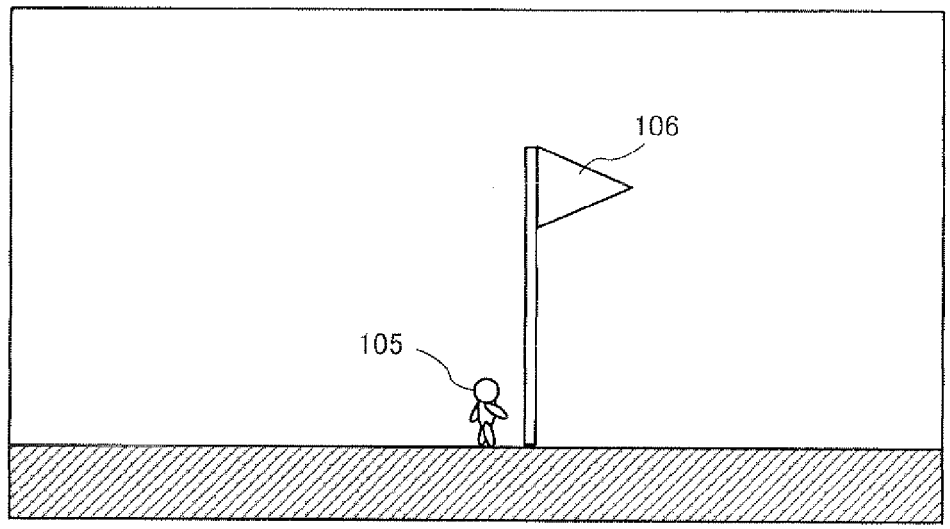
FIG. 13 is a diagram showing an exemplary game screen of a game considered in the first embodiment.
Figure 14:
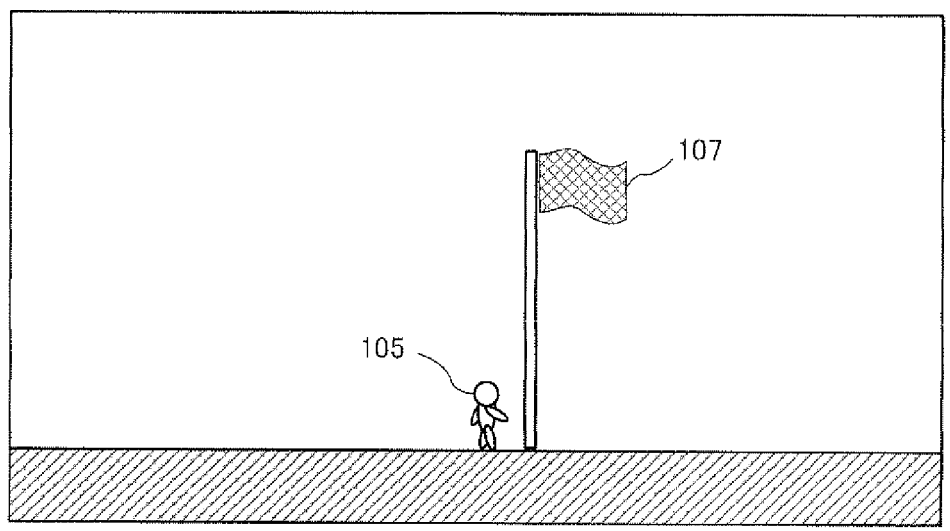
FIG. 14 is a diagram showing an exemplary game screen of a game considered in the first embodiment.
Figure 17:
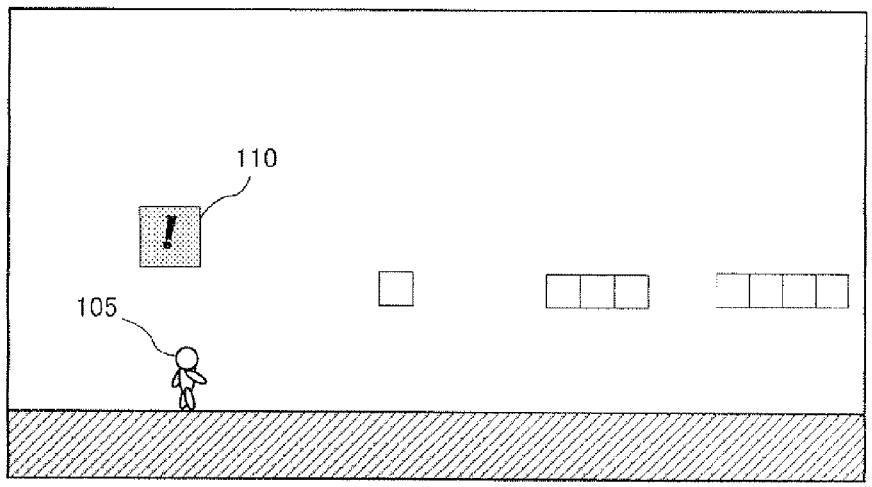
FIG. 17 is a diagram showing an exemplary game screen of a game considered in the first embodiment.

In this game, some courses have two goal points. In the present embodiment, one of the goal points is referred to as a "main goal", and the other goal point is referred to as a "sub goal". The main goal is a goal point reached by the player character when the player character normally advances the course, and has a flag object 106 arranged thereat as shown in FIG. 13. On the other hand, the sub goal is a goal point located at a position which is difficult to be recognized by the player at first glance, that is, a so-called hidden goal point. A flag object 107 as shown in FIG. 14 is arranged at the sub goal point, and is different in design from the flag object 106 at the main goal.

In the course that have such two goals, when the player character 105 reaches the main goal and the player has cleared the course, the first route (hereinafter sometimes referred to as main route) 108 is opened as shown in FIG. 15, and thereby the player is allowed to proceed to the next course (in FIG. 15, a course having a course mark 102*f*). On the other hand, when the player character reaches the sub goal and thereby the player has cleared the course, the second route (hereinafter sometimes referred to as sub route) 109 as shown in FIG. 16 is opened, and the player character is allowed to proceed to a course (a course having a course mark 102*i* in FIG. 16) which is different from the main route.

Figure 18:
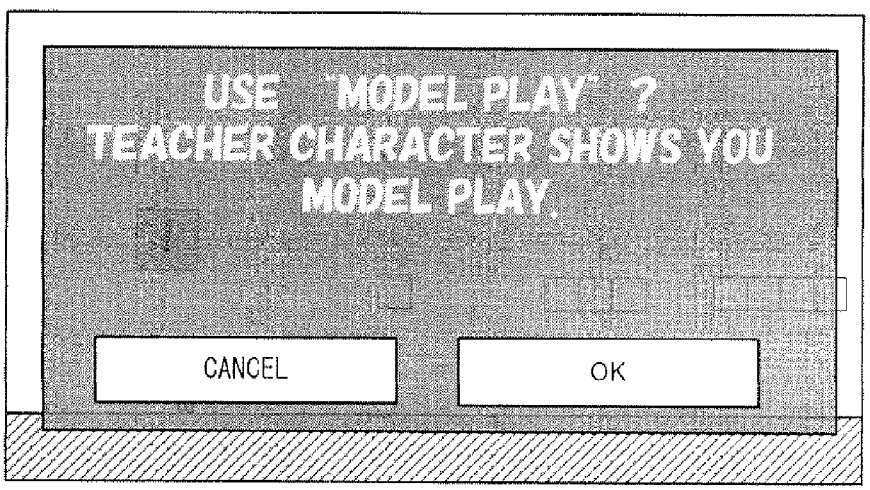
FIG. 18 is a diagram showing an exemplary game screen of a game considered in the first embodiment.
Figure 19:
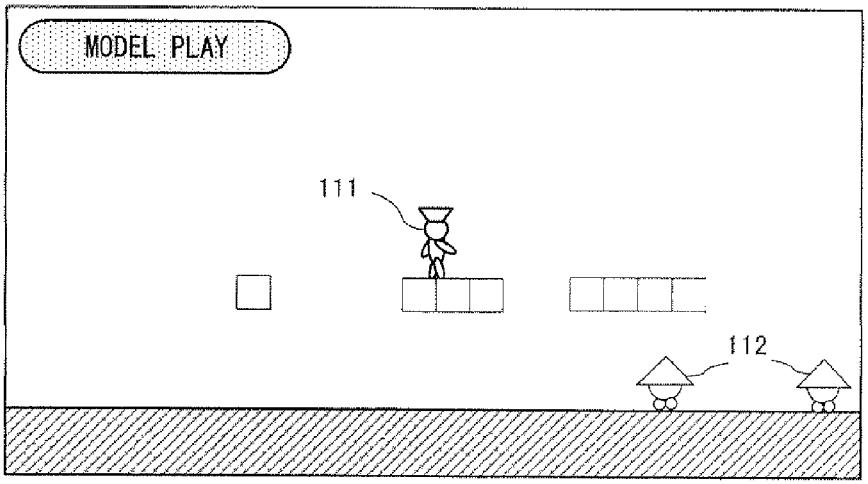
FIG. 19 is a diagram showing an exemplary game screen of a game considered in the first embodiment.

Further, in this game, when a predetermined condition is satisfied, a "model play" which is automatic control of the motion of the player character based on automatic operation data becomes available. The predetermined condition in this game is that the player continuously fails eight times (the number of stocks for the player characters 105 comes to zero). Note that when the number of stocks for the player characters 105 comes to zero resulting in game over, and the player again plays the game by selecting a so-called "continue" thereafter, the number of play times is continuously counted before and after the game over. In that case, if the player failed eight times, and starts the ninth-times play, a "model block" 110 shown in FIG. 17 appears at the start point of the course. When the player uses the model block 110 (in this game, the player performs an operation so as to cause the player character 105 to hit the model block 110 from below), an inquiry screen is displayed inquiring "whether or not to use the model play" as shown in FIG. 18. When the player selects to use the "model play" on the screen, the screen is blacked out, and as shown in FIG. 19, a game screen is displayed where the player character 105 is replaced with a teacher character 111 (i.e., the teacher character 111 appears in place of the player character 105). Further, in this case, a "model play mode" is displayed on the upper left of the game screen. Hereinafter, this situation is referred to as the "model play mode". Note that the teacher character 111 is used so as to allow the player to clearly recognize that the current play state is in the "model play mode". Basically, the teacher character 111 is equivalent to the player character 105. In other words, the teacher character 111 is not necessarily required, and the player character 105 may be used therefor.

The motion of the teacher character 111 is controlled based on the automatic operation data prepared in advance. The automatic operation data (hereinafter referred to as model operation data) is prepared, for example, in the game development stage (i.e., in the stage prior to commercialization), and is included in a game package to be marketed (an optical disc, a download package or the like) as a part of game data. For example, a developer who is familiar with the course operates the player character 105 so as to create a model operation for clearing the course. Operation data of a series of operations (performed from the start point of the course until arrival to the goal point, i.e., one entire course) to be model operation is recorded, and then the model operation data is created. In the present embodiment, data of key operations for the series of operations to be the model operation (the pressing state of the respective buttons of the controller 7) is recorded at predetermined time intervals, thereby to create the model operation data. Further, in the present embodiment, for the course that has two goals, the model play leads the player character to the main goal.

Figure 20:
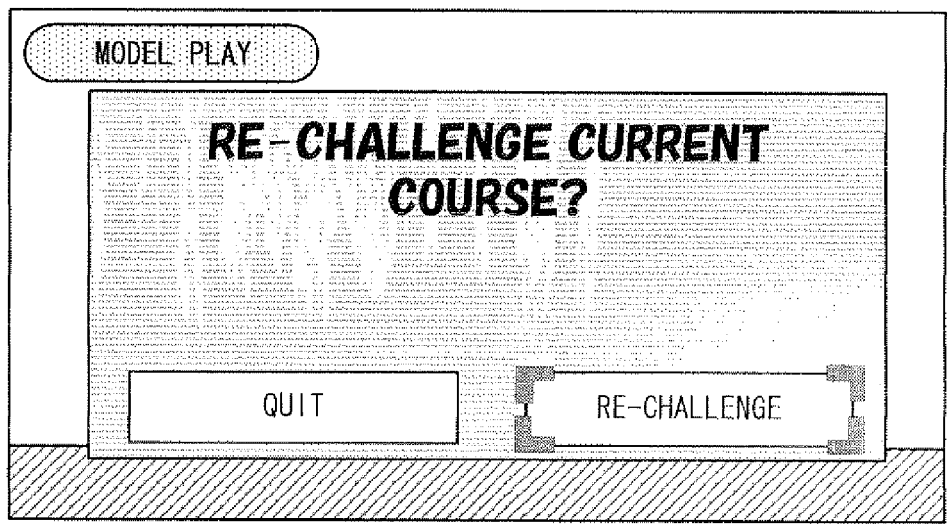
FIG. 20 is a diagram showing an exemplary game screen of a game considered in the first embodiment.
Figure 21:
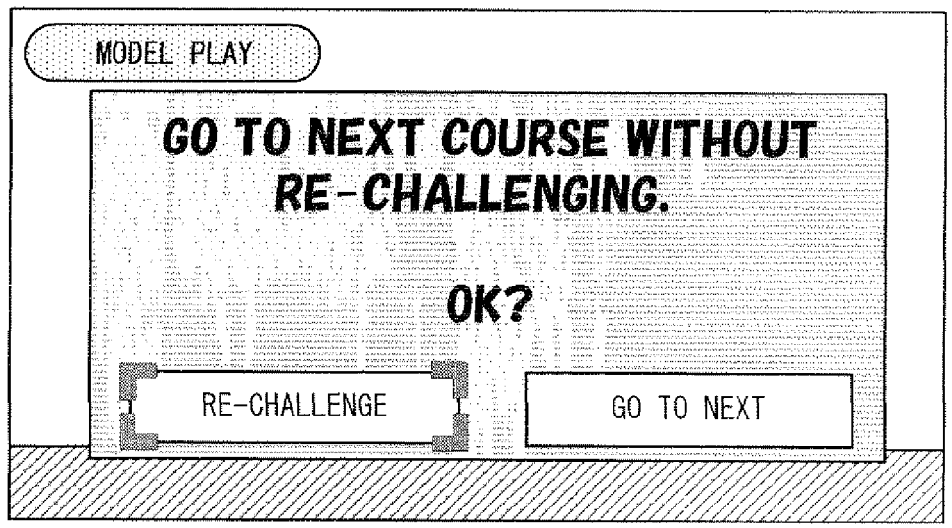
FIG. 21 is a diagram showing an exemplary game screen of a game considered in the first embodiment.

In the model play mode, as shown in FIG. 19, the teacher character 111 automatically moves based on the model operation data (that is, the operation of the player character 105 performed by the developer is reproduced). In the model play mode, scores or the like are not added. Even if the teacher character 111 has obtained some item or the like during the model play, the obtainment is not provided to the player character 105. When the teacher character finally reaches the goal of the course (the main goal, in the case of the course having two goals), the model play ends, and an inquiry message is displayed at the end of model play as shown in FIG. 20. The message asks the player whether or not to re-challenge the course by him/herself. If the player selects to "re-challenge" the course in response to the message, the screen changes to display the start point of the course, whereby the course process based on the operation by the player is started again. On the other hand, if the player selects not to re-challenge the course on the screen shown in FIG. 20, another inquiry message shown in FIG. 21 is displayed. The message shown in FIG. 21 asks the player whether or not to proceed to the next course. If the player selects to proceed to the next course in response to the message, the course is regarded to have been cleared, and the route for proceeding to the next course will be opened. Namely, if the player cannot clear the course even after several challenges, the player can use the above model play so as to let the teacher character 111 clear the course. Accordingly, even if the player does not clear the course by him/herself, the player can advance the game forward. In other words, the model play represents a kind of a help action for the case of a stalemate in the game.

In this embodiment, it is possible for the player to stop the automatic control of the motion of the teacher character 111 during the model play mode, and to take over the operation of the teacher character 111 by him/herself. For example, it is possible to play such that the player utilize the model play to let the teacher character 111 overcome a hardest point in the course, and operates the teacher character 111 by him/herself after the hardest point thereby to advance the course forward. In this case, when the player takes over the operation of the teacher character 111 in the course having two goals, the teacher character 111 may reach the sub goal although the teacher character 111 basically reaches the main goal in the model play mode. However, in the present embodiment, the game processing is set such that the teacher character always reaches the main goal even in the above case. That is, in the course that has two goals, when the course has been cleared by utilizing the "model play", it is always considered that the teacher character has "reached the main goal and cleared the course". As a result, even if the player stops the model play and takes over the operation of the teacher character by him/herself to cause the teacher character to reach the sub goal, the sub route 109 shown in FIG. 16 will not be opened, but the main route 108 shown in FIG. 15 will be opened. Therefore, in such a case, the player cannot select the course leading to the course mark 102i. That is, in order to proceed to the course leading to the course mark 102i, the player needs to cause the player character to reach the sub goal by him/herself. In this manner, for such a player that is not good at playing the game, with the use of a help action, i.e., the model play, it is possible to prevent the player from coming to a stalemate in the game. On the other hand, utilization of the model play does not lead the player to the course leading to the course mark 102l, and thus it is possible to maintain fun for the player to conquer the game. That is, it is possible to prevent such a player that can easily clear the game when using the model play from losing interest in the game, and consequently fun of the game can be enhanced.

In the present embodiment, after the course clearing, in order to indicate the course clear state (whether or not the course has been cleared, and whether or not the clearing is performed by the player's own play or by the model play), the course mark is displayed variously in the world map screen. Specifically, the course which is in the non-clear state is displayed such that the course mark 102 blinks in red. When the course has been cleared by the player on his/her own from the beginning to the end of the course without using the model play, the course mark 102 is lit in blue regardless of whether the main goal is reached or the sub goal is reached. Further, when the course has been cleared by using the model play, the course mark 102 is lit in red.

Figure 22:
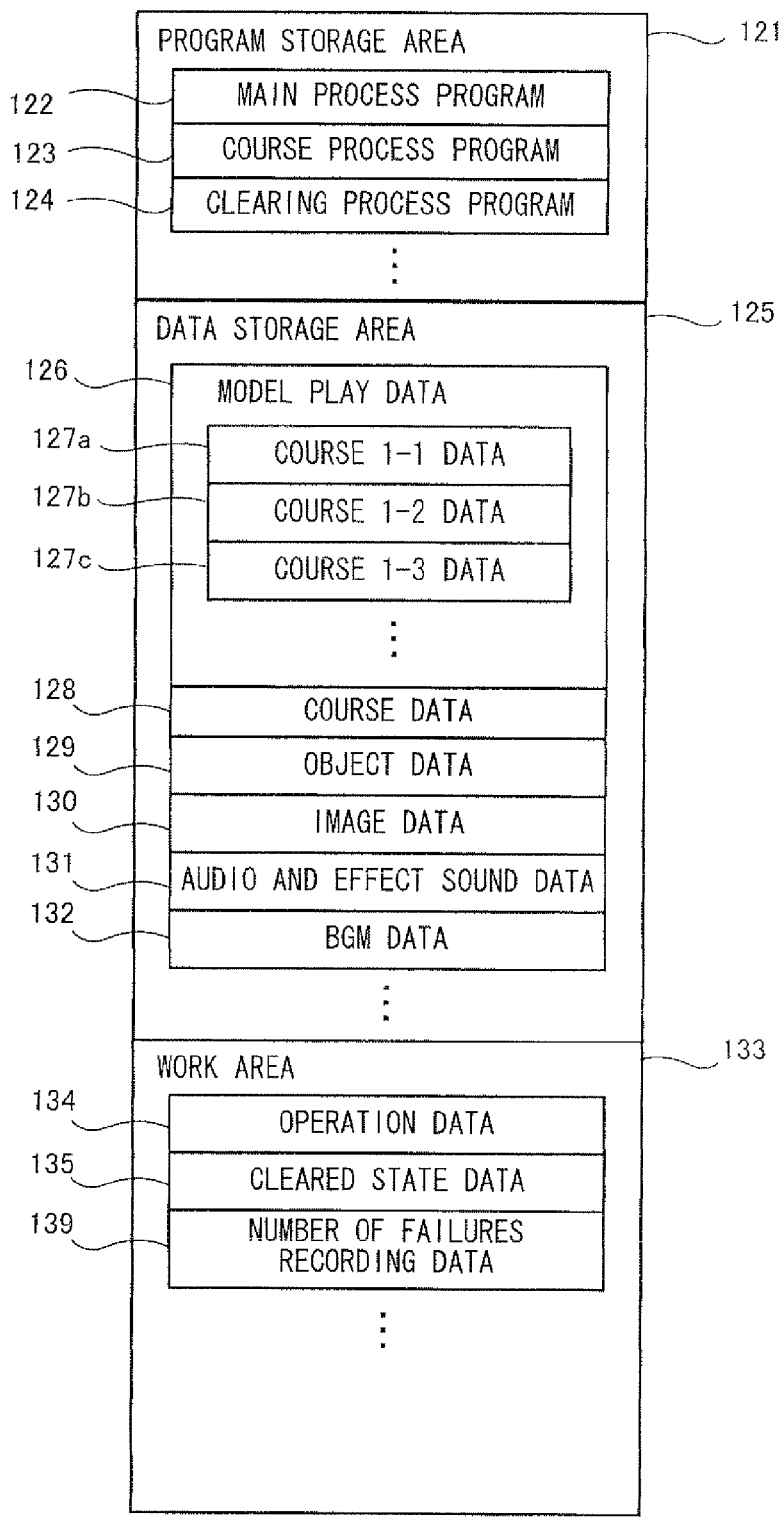
FIG. 22 shows an exemplary memory configuration in an external main memory 12.

Next, data stored in the external main memory 12 at the time of executing the game processing of the first embodiment will be described. FIG. 22 shows an exemplary memory configuration in the external main memory 12 (or in the internal main memory 11e, or in both memories). In FIG. 22, the external main memory 12 includes a program storage area 121, a data storage area 125, and a work area 133. The program storage area 121 has stored therein a game program executed by the CPU 10. Data in the program storage area 121 and in the data storage area 125 is such data that is stored in the optical disc 4 in advance, and is copied to the external main memory 12 for the game processing according to this embodiment.

A main process program 122 is a program corresponding to the processing of the flowchart in FIG. 27 to be described later. A course process program 123 is a program for causing the CPU 10 to execute the game processing in each course, and a course clearing process program 124 is a program for causing the CPU 10 to execute various processes for course clearing.

The data storage area 125 has stored therein model play data 126, course data 128, object data 129, image data 130, audio and effect sound data 131, BGM data 132, and the like.

The model play data 126 is data for controlling the motion of the teacher character 111 in the model play above described. The data is prepared for each course, and accordingly, course 1-1 data 127a, course 1-2 data 127b, course 1-3 data 127c, and the like are arranged for example (hereinafter, data for each course may be collectively referred to as course data 127). These pieces of data are generated in the game development stage, for example, by recording operation information on the actual operations of the controller 7 performed by the developer playing each course, the operation information being transmitted from the controller 7.

Figures 23, 24, 25, 26:
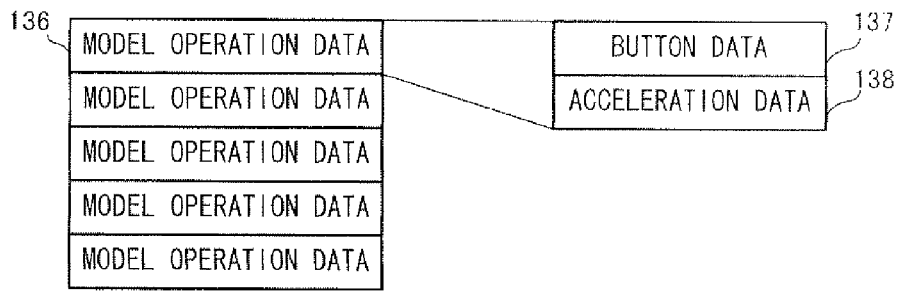
FIG. 23 shows an exemplary configuration of course data 127.
FIG. 24 shows an exemplary configuration of button data 137.
FIG. 25 shows an exemplary configuration of clear state data 135.
FIG. 26 shows an exemplary configuration of number of failures recording data 139.

FIG. 23 shows an exemplary configuration of course data 127, and the data is composed of a set of pieces of model operation data 136. In this embodiment, the controller 7 outputs the operation information every 5 ms. The model operation data 136 is recorded every 5 ms as well. That is, each of the pieces of model operation data 136 is 5 ms-long data. Further, these pieces of the model operation data 136 are sorted and recorded in chronological order.

Each piece of the model operation data 136 is composed of button data 137 and acceleration data 138. The button data 137 is data indicative of pressing state of each button in the operation section 72 (a plurality of operation buttons) provided on the controller 7. FIG. 24 shows an exemplary configuration of the button data 137. The button data 137 includes a button type 1371 and a pressing state 1372. The button type 1371 indicates each button in the operation section 72. The pressing state 1372 indicates whether or not each button is being pressed (on/off state), where "0" indicates that the button is not being pressed (off state) and "1" indicates that the button is being pressed (on state). In the example of FIG. 24, only the "right" portion of the cross key 72a and the B button 72i are being pressed.

The acceleration data 138 in FIG. 23 is data indicative of whether or not the controller 7 is swung, namely, data indicative of whether or not the operation for the above spin-jump is performed. While the developer is performing operations for model play to prepare the model operation data, when acceleration equal to or greater than a predetermined value is applied to the controller 7, it is considered that the developer has performed an operation of swinging the controller 7 for causing the above spin-jump. Accordingly, "1" is set to and recorded in the data. On the other hand, when no swinging operation is performed, "0" is set to the data.

With reference back to FIG. 22, the course data 128 is data for generating respective courses, and includes information relating to the respective courses (such as the configuration of each course, the location of various objects, and the like). The object data 129 is polygon model data of various characters appearing in the game, such as the player character 105, the enemy character 112, and the like. The image data 130 is data of various images such as texture images attached to the above objects and background images. The audio and effect sound data 131 is data of audio and effect sound reproduced during a game. The BGM data 132 is data of musical compositions reproduced during a game as the background music (BGM).

The work area 133 is a storage area for storing data which is temporarily generated and stored during game processing, and stores therein operation data 134, clear state data 135, number of failures recording data 139, the number of stocks for the player characters 105, and various data temporarily required during the game processing.

The operation data 134 is such operation data that is transmitted from the controller 7 to the game apparatus 3. In the present embodiment, the operation data is transmitted from the controller 7 to the game apparatus 3 in the cycle of 1/200 seconds, and the operation data 134 stored in the external main memory 12 is updated in the same cycle. In the present embodiment, only the latest (most recently obtained) operation data may be stored in the external main memory 12.

When the extended controller 36 is connected to the controller 7, the operation data 134 also includes the operation data of the extended controller 36. For example, data indicative of operation details of the analog stick 38 and data indicative of whether or not the button 40 is being pressed are included.

The clear state data 135 is information relating to the state where a course has been cleared. FIG. 25 shows an exemplary configuration of the clear state data 135. The clear state data 135 is composed of main goal flag 1351, sub goal flag 1352, and model clear flag 1353. The main goal flag 1351, the sub goal flag 1352, and the model clear flag 1353 are data indicative of how a selected course has been cleared. As an initial value, 0 is set to each flag. When the course is cleared by arrival to the main goal, "1" is set to the main goal flag 1351. When the course is cleared by arrival to the sub goal, "1" is set to the sub goal flag 1352. When the course is cleared by using the model play, "1" is set to the model clear flag 1353.

The number of failures recording data 139 is information relating to the number of times of failures made in each course. FIG. 26 shows an exemplary configuration of number of failures recording data 139. The number of failures recording data 139 is composed of sets of course numbers 1391 and the number of failures data 1392. The course number 1391 is data for uniquely identifying the respective courses. The number of failures data 1392 is data indicative of the number of times of failures made by the player in a course in progress.

Next, with reference to FIG. 27 to FIG. 30, game processing executed by the game apparatus 3 will be described. When the game apparatus 3 is powered on, the CPU 10 of the game apparatus 3 executes a boot program stored in the ROM/RTC 13, whereby respective units such as the external main memory 12 and the like are initialized. Then, the game program stored in the optical disc 4 is loaded into the external main memory 12, and the CPU 10 starts executing the game program.

FIG. 27 is a flowchart illustrating the whole of the game processing executed by the game apparatus 3. In the flowcharts shown in FIG. 27 to FIG. 30, of the game processing, the process for the above-described course selection, the process relating to the state where each course has been cleared, and the process relating to the model play will be described. Those processes which are not directly relating to the present invention will not be described in detail. Further, the course to be explained with reference to the flowchart has two goal points.

As shown in FIG. 27, in step S1, an initial setting process for preparation of the game processing is performed. More specifically, various data and flags included in the work area 133 are initialized. Thereafter, the operation data 134 is obtained.

Next, in step S2, it is determined based on the operation data 134 whether or not the player has given an instruction to end the game. As a result of the determination, when it is determined that no instruction to end the game is given (NO in step S2), the processing proceeds to step S3 subsequently.

In step S3, a course selection process is performed. To be more specific regarding the process in this step S3, the CPU 10 generates a world map screen shown in FIG. 10 so as to be displayed as the game screen. Then the CPU 10 receives an operation performed by the player. When receiving the course selection operation by the player, the CPU 10 performs preparation for the course process for the course selected by the player (hereinafter referred to as "selected course"). Namely, the course data 128 corresponding to the selected course is loaded from the external main memory 12 so as to generate a virtual game space relating to the selected course. The CPU 10 arranges player objects and the like in the virtual game space as appropriate. Further, the CPU 10 sets a virtual camera so as to shoot a start point of the selected course (i.e., it is set such that the start point is initially displayed on the screen).

Figure 28:
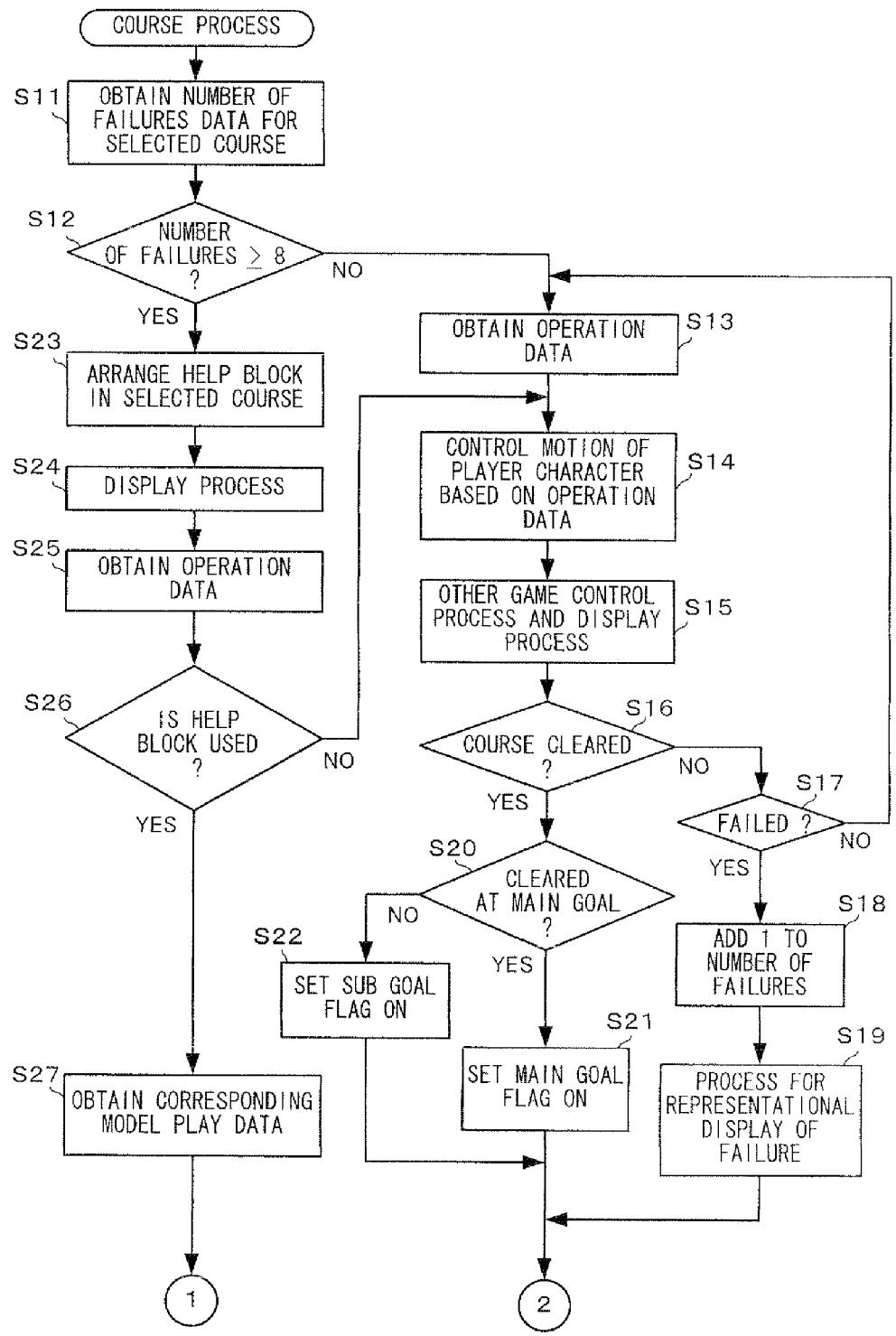
FIG. 28 is a flowchart illustrating, in detail, a course process of step S4 shown in FIG. 24.
Figure 29:
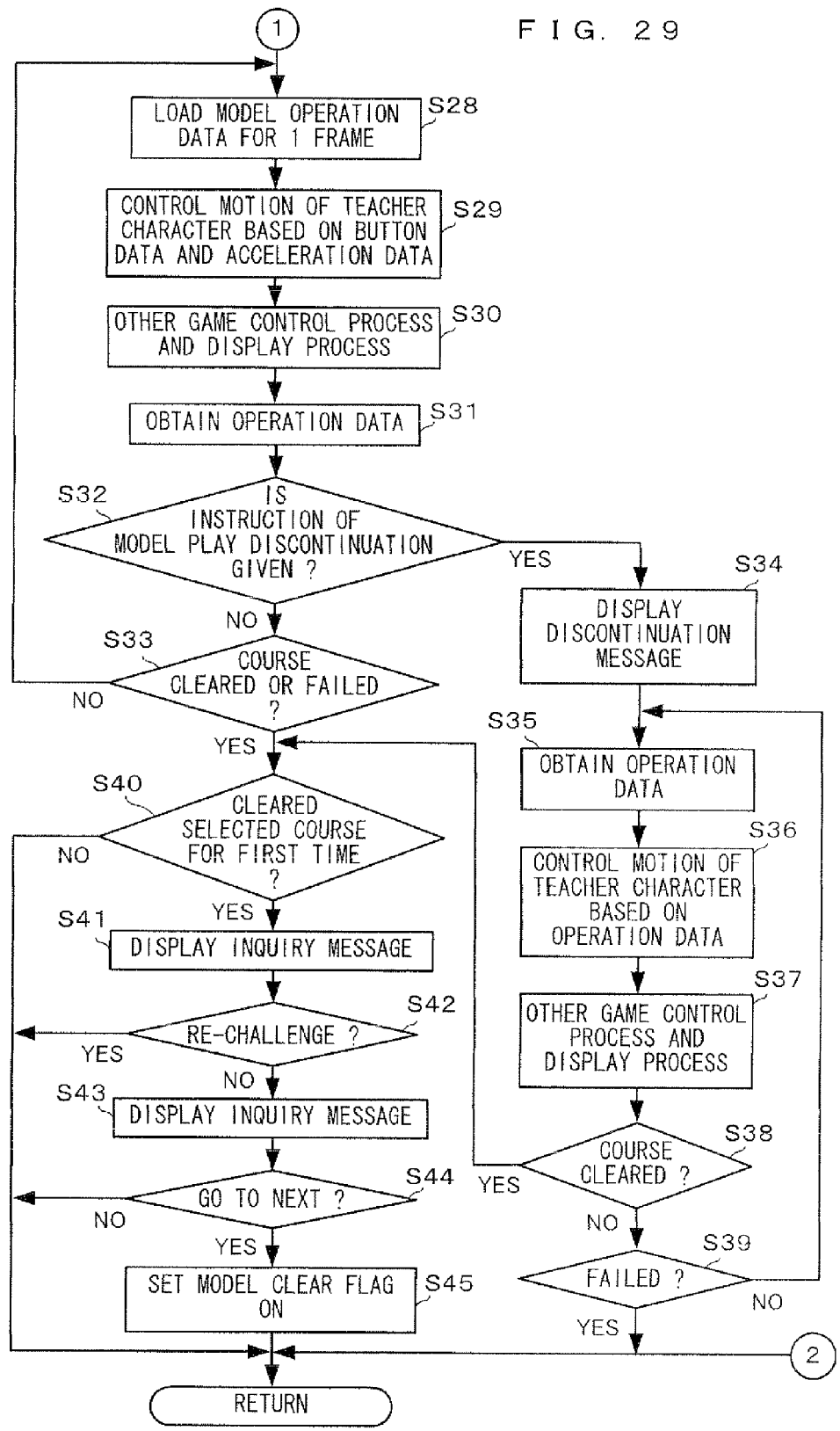
FIG. 29 is a flowchart illustrating, in detail, a course process of step S4 shown in FIG. 24.

Next, in step S4, the course process which is the game processing relating to the selected course is performed. FIG. 28 and FIG. 29 are each a flowchart illustrating in detail the course process shown in above step S4. In FIG. 28, firstly in step S11, the number of failures data 1392 (e.g., which can be specified by the course number 1391) corresponding to the selected course is obtained from the work area 133 ("0" is set as the initial value of the number of failures data 1392 immediately after the start of a game).

Next, in step S12, it is determined whether or not the number of failures made by the player in the selected course (failures herein representing such failures that result in reduction in the number of stock player characters) is equal to or more than eight. As a result of the determination, when it is determined that the number of failures is less than eight (NO in step S12), a process for operating the player character 105 is performed based on the operation performed by the player. That is, in the subsequent step S13, the operation data 134 is obtained. In the subsequent step S14, control of the motion of the player character 105 is performed based on the operation data 134. Further, in step S15, other game control processes (game processing, for example, relating to movement of the enemy characters, determination of whether or not the enemy character is hit, addition of scores, and the like) are performed and a game screen reflecting the results is generated and displayed.

Next, in step S16, it is determined whether or not the selected course has been cleared. That is, it is determined whether or not the player character 105 has reached the main goal point or the sub goal point. As a result of the determination, when it is determined that the selected course is yet to be cleared (NO in step S16), it is determined in subsequent step S17 whether or not the player has made failures (of reducing the number of the stock player characters). When, as a result, it is determined that the player has made no failure (NO in step S17), the process of controlling the motion of the player character based on the operation by the player is repeated after returning to step S13.

On the other hand, as a result of the determination in step S17, when it is determined that the player has made a failure (YES in step S17), 1 is added to the number of failures data 1392 corresponding to the selected course in step S18. Further, another game processing relating to the failure, such as reduction in the number of the stock player characters, is also performed as appropriate. In subsequent step S19, a process for representational display of the failure on the game screen is performed, and the course process ends.

On the other hand, as a result of the determination in above step S16, when it is determined that the course has been cleared (YES in step S16), it is determined in subsequent step S20 whether or not the course clearing is achieved by the player character's 105 arrival to the main goal. As a result of the determination, When it is determined that the course clearing is achieved by its arrival to the main goal (YES in step S20), the main goal flag 1351 of the selected course is set ON in step S21. On the other hand, when it is determined that the course clearing is achieved not by its arrival to the main goal, (NO in step S20), the sub goal flag 1352 of the selected course is set ON in step S22. Then, the course process ends.

Next, in above step S12, the process to be performed when it is determined that the number of failures is equal to or more than eight will be described. In the determination in step S12, when it is determined that the number of failures is equal to or more than eight, (YES in step S12), the above-described model block 110 (see FIG. 17) is generated in step S23, and is located at the start point of the selected course.

Next, in step S24, the game screen with the model block 110 located therein is displayed. Next, in step S25, the operation data 134 is obtained, and in step S26, it is determined based on the operation data 134 whether or not the above model block 110 is used. As a result, when it is determined that the model block 110 is not used (NO in step S26), the processing proceeds to above step S14, and the process of controlling the motion of the player character 105 is performed based on the operation performed by the player.

On the other hand, as a result of the determination in step S26, when it is determined that the model block 110 is used (YES in step S26), the process of controlling the motion of the teacher character 111 as described above is performed based on the model operation data. Specifically, in step S27, the course data 127 corresponding to the selected course is obtained from the external main memory 12. Further, processes for preparation for the above "model play" such as replacement with the teacher character 111 as described above, a change in the screen layout (a display of "model play" on the upper left of the screen), and the like are also performed as appropriate.

Next, in step S28, 1 frame (1/60 seconds) piece of model operation data 136 is obtained from the obtained course data 127 (since one unit piece of model operation data 136 is 1/200 seconds long, approximately three to four unit pieces of model operation data are obtained).

Next, in step S29, the control of the motion of the teacher character is performed based on the model operation data 136. In subsequent step S30, other processes in the game processing and a process for displaying a game screen are performed. These processes are similar to those in step S15.

Next, in step S31, the operation data 134 is obtained so as to determine whether or not an instruction to stop the model play is given. In subsequent step S32, it is determined based on the operation data 134 whether or not the operation for giving the instruction to stop the model play is performed. As a result of the determination, when it is determined that no operation for giving the instruction to stop the model play is performed (NO in step S32), it is determined in step S33 whether or not the course has been cleared by the teacher character, or whether or not any failure has occurred to the teacher character for some reason. The reason why failures occurring to the teacher character 111 is determined is that even if the same course is played by the same model play, the motion of the teacher character 111 may deviates unexpectedly due to the load of the game apparatus or the like. As a result of the determination, when it is determined that the course is yet to be cleared by the teacher character 111 or no failure has occurred to the teacher character 111 (NO in step S33), the processing returns to above step S28, and the model play is continued. On the other hand, as a result of the determination in step S33, when it is determined that the teacher character 111 has cleared the course, or any failure has occurred to the teacher character 111 (YES in step S33), the process at the time of the course clearing in the model play mode is performed (here, the process for stopping the model play will be described firstly).

On the other hand, as a result of the determination in step S32, when it is determined that the instruction to stop the model play is given (YES in step S32), the progress of the game is suspended in step S34, and a message (not shown) indicative of the stop of the model play is displayed. In addition, the process of switching data (input source) from the model operation data 136 to the operation data 134 is performed, the data being used for controlling the motion of the teacher character 111.

Next, in step S35, the operation data is obtained. Then, in step S36, the control of the motion of the teacher character 111 is performed based on the operation data 134. Further, in step S37, other game control processes and a process for displaying a game screen, which are the same as those in step S15, are performed.

Next, in step S38, it is determined whether or not the selected course has been cleared. As a result of the determination, when it is determined that the selected course has been cleared, it is regarded that the course has been cleared with the model play being stopped (the course has been cleared by the teacher character 111). In this case, the processing proceeds to step S40 to be described later, and a process at the time of the course clearing in the model play mode is performed.

On the other hand, as a result of the determination in step S38, when it is determined that the course is yet to be cleared (NO in step S38), it is determined in subsequent step S39 whether or not any failure has occurred. As a result, when it is determined that no failure has occurred (NO in step S39), the processing returns to above step S35, and the control of the motion of the teacher character 111 is continued based on the operation by the player. On the other hand, when it is determined that any failure has occurred (YES in step S39), only a representational display showing the failure is performed (that is, the number of stocks for the player characters 105 is not reduced), and the course process ends.

Next, a process to be performed in the case of YES in above step S33 or step S38, will be described. That is, the process for the case where the player character has reached the goal in the model play mode will be described. Firstly, in step S40, it is determined whether or not this is first time for the player to have cleared the selected course (regardless of whether or not the course is played in the model play mode). As a result of the determination, when it is determined that this is not the first time clearing (NO in step S40), the course process ends. Note that when it is determined in step S33 that some failure has occurred to the teacher character 111, the processing proceeds to the process in this step S40.

On the other hand, when it is determined that this is the first time for the player to have cleared the selected course (YES in step S40), a message is displayed in subsequent step S41 shown in FIG. 20 for inquiring of the player whether or not to re-challenge the selected course by him/herself, followed by reception of an input by the player.

Next, in step S42, it is determined whether or not the player has selected re-challenging in response to the inquiry message. As a result, when it is determined that the player has selected re-challenging (YES in step S42), the course process ends (as a result, the course process is repeated from the beginning). On the other hand, when it is determined that the player has selected no re-challenging (NO in step S42), then, another inquiry message shown in FIG. 21 is displayed in step S43, inquiring of the player whether to re-challenge the course or to proceed to the subsequent course 21, followed by reception of an input by the player.

Next, in step S44, it is determined whether or not the player has selected to proceed to the subsequent course in response to the second inquiry message. As a result, when the player has selected not to proceed to the subsequent course (NO in step S44), the course process ends. On the other hand, when the player has selected to proceed to the subsequent course (YES in step S44), the model clear flag 1353 of the selected course is set ON in step S45, and the course process ends.

Figure 30:
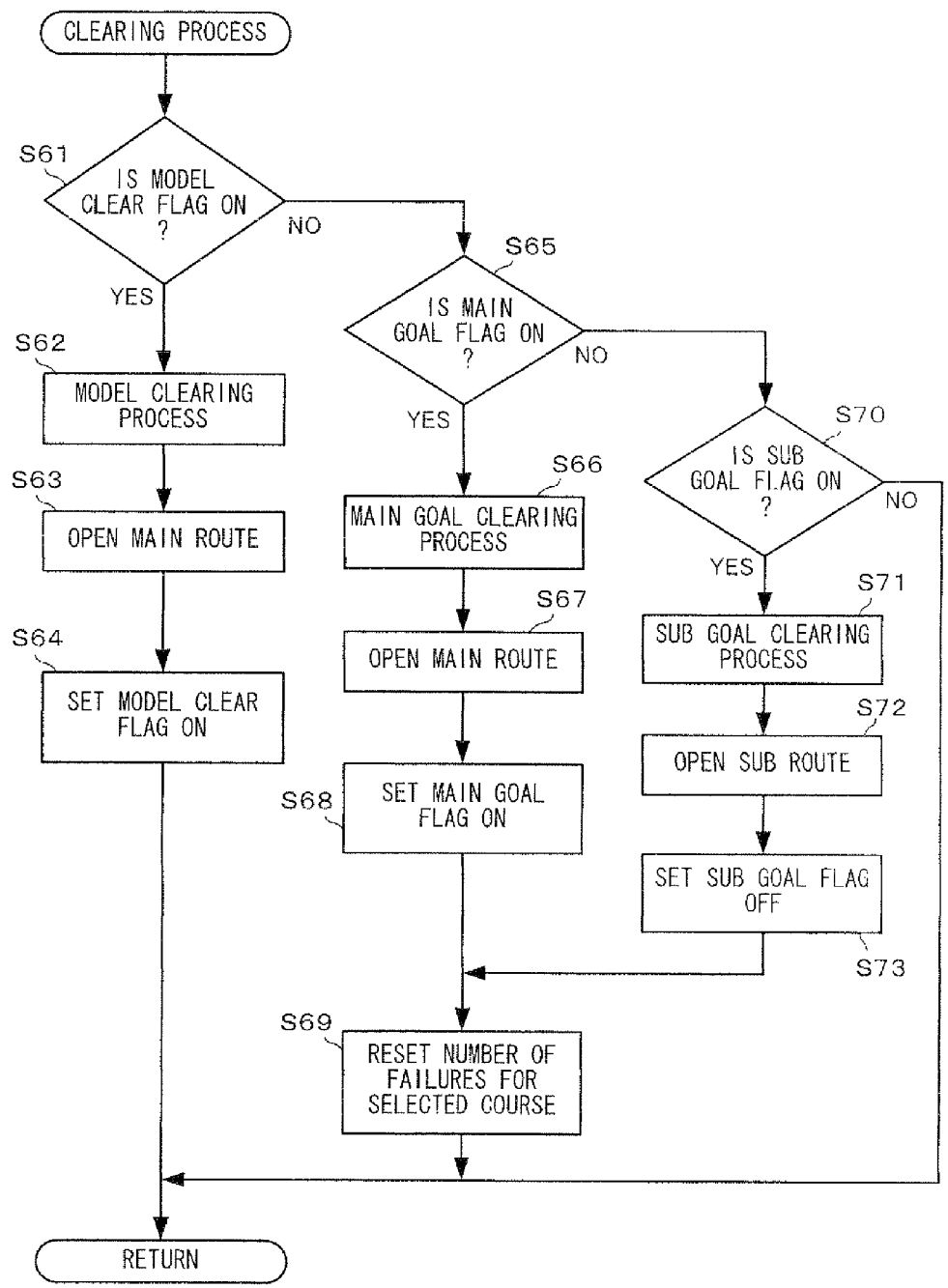
FIG. 30 is a flowchart illustrating, in detail, a clearing process of step S5 shown in FIG. 24.

With reference back to FIG. 27, when the course process in step S4 ends, a clearing process in step S5 is performed subsequently. In this step, the process is performed depending on the condition when the course has been cleared (whether the main goal or the sub goal is cleared, or whether or not a goal in the model play mode is cleared). FIG. 30 is a flowchart illustrating in detail the clearing process shown in step S5. In FIG. 30, firstly it is determined in step S61 whether or not the model clear flag 1353 of the selected course is ON. When it is determined that the model clear flag 1353 is ON (YES in step S61), the process at the time of the course clearing in the model play mode is performed. For example, a representational display showing the course clearing is performed. Next, in step S63, a process for opening the main route 108 as described above with reference to FIG. 15 is performed. Next, in step S64, the model clear flag 1353 of the selected course is set OFF. Then, the clearing process ends.

On the other hand, as a result of the determination in step S61, when it is determined that the model clear flag 1353 is not ON (NO in step S61), then it is determined in step S65 whether or not the main goal flag 1351 of the selected course is ON. As a result, when it is determined that the main goal flag 1351 of the selected course is ON (YES in step S65), a process at the time of the course clearing by arrival to the main goal is performed in step S66. For example, a process of representational display of the course clearing, a process of adding a course clearing bonus to the scores, and the like are performed.

Next, in step S67, a process for opening the main route 108 shown in FIG. 15 is performed. The process is similar to that performed in step S63. In the subsequent step S68, the main goal flag 1351 of the selected course is set OFF. Further, in step S69, the number of failures data 1392 of the selected course is reset (to 0). Then, the clearing process ends.

On the other hand, as a result of determination in step S65, when it is determined that the main goal flag 1351 is not ON (NO in step S65), then it is determined in subsequent step S70 whether or not the sub goal flag 1352 of the selected course is ON. As a result, when it is determined that the sub goal flag 1352 of the selected course is ON (YES in step S70), a process at the time of the course clearing by arrival to the sub goal is performed in step S71. For example, a process of representational display of the course clearing, a process of adding a course clearing bonus to the scores, and the like are performed.

Next, in step S72, a process for opening the sub route 109 as shown in FIG. 16 is performed. In subsequent step S73, the sub goal flag 1352 of the selected course is set OFF. Further, in above step S69, the number of failures data 1392 of the selected course is reset. Then, the clearing process ends.

On the other hand, as a result of determination in step S70, when it is determined that the sub goal flag 1352 is not ON, either (NO in step S70), it is considered that the course is not cleared but the course process has ended due to failures made by the player. Thus, in this case, the clearing process ends.

With reference back to FIG. 27, when the clearing process in step S5 ends, the processing returns to step S2 and repeats. In step S2, when it is determined that an instruction to end the game is given (YES in step S2), the game processing according to the present embodiment ends.

In this manner, in the present embodiment, depending on the condition at the time of arrival to the goal (course clearing), i.e., depending on which goal (main goal or sub goal) the player character has reached, the process thereafter (whether the main route or the sub route is opened) is determined. On the other hand, when the game is played by using the data of the above automatic operation, the process for opening the main route is performed regardless of whether the course is cleared by arrival to the main goal, or the course is cleared by arrival to the sub goal (i.e., even in the case where the automatic operation is stopped and the player performs operation thereafter by him/herself). Further, when the course has been cleared by using the automatic operation data, and the course is not cleared by the player him/herself, the player is allowed to proceed to the subsequent course. Namely, by using the automatic operation data, the difficulty level for clearing the game to the end is lowered so as to allow even such a player that is not good at playing a game to enjoy playing the game to the end (so that the player can see the ending, for example). Further, while the difficulty level for clearing the game to the end is lowered, it is set such that the sub route will be not opened when the automatic operation data is used. Accordingly, it is possible to maintain the fun of the game appropriately. In other words, the game includes an element (sub route) that cannot be experienced when only the automatic operation data is used, and thus it is possible to avoid the situation where those players, who can easily clear the game to the end when using the automatic operation data, lose interest in the game. In addition, it is possible to improve fun of the game.

Note that in the above embodiment, in the model play mode, the player character 105 is replaced with the teacher character 111. However, as above described, the player character 105 need not necessarily be replaced with the teacher character 111 in the model play mode. Even in the model play mode, the player character 105 may be used as it is, and the motion of the player character 105 may be controlled based on the model operation data 136. In this case, it may be set such that, in the model play mode, points will not be added, or the number of stock player characters will not be reduced even in the case of failures. Alternatively, points may be added in the same manner as in the case of a non-model play mode.

In the above embodiment, two goal points, i.e., the main goal and the sub goal, are arranged, and depending on which of the goals has been reached to clear the course, the process thereafter is changed. In addition to the arrangement of two goal points, the following method may be used as the condition to determine the details of the process to be performed after the course clearing. The method is that only one goal point is arranged, and depending on whether or not a predetermined item is obtained before arrival to the goal, the process thereafter is changed. That is, when the player character obtains a predetermined item and reaches the goal, the sub route is opened, whereas when the player character reaches the goal without obtaining the predetermined item, the main route is opened. In addition, the case where the player character does not obtain the predetermined item is as the model play mode (the play mode leading to the main route). Further, it may be set such that the time limit to clear each course is set, and depending on whether or not the remaining time to the time limit at the time of arrival to the goal is longer than a predetermined time, the process performed thereafter is changed. Further, depending on whether or not the player character has reached the goal after passing through a predetermined point arranged in the course (in this case the course is preferably formed of several routes leading to the goal), the process thereafter may be changed. Still further, depending on whether or not the score at the time of arrival to the goal is equal to or greater than a predetermined value, the process thereafter may be changed.

As an example of the above-described process which is to be changed depending on the condition at the time of arrival to the goal, a process to provide or not to provide a predetermined item as a bonus for course clearing may be applied, in addition to the process of opening the main route 108 or the sub route 109.

Further, in the above embodiment, an exemplary case has been described where the player is allowed to select a next course to be played after course clearing. However, without limiting to this, the present invention may applied to a game which does not allow the player to make a course selection. That is, the game may be configured such that the game does not have the world map screen as described above, but that when the first course is cleared by arrival to the main goal, a play for the second course starts automatically, whereas when the first course is cleared by arrival to the sub goal, a play for the third course starts automatically.

As to the condition for appearance of the model block, the model block does not necessarily appear after eight continuous failures as described above. The number of failures having been made may be set as appropriate depending on the game contents. Further, in addition to the number of failures the following case may be used as the condition. That is, in the case where the time limit to clear the course is set, the model block is caused to appear when the remaining time is equal to or lower than a predetermined value.

Further, in the case where an HP (Hit Point) or a strength level is set to the player character 105 (e.g., the RPG, or a game which does not use stocks for the player character 105), the number of damages incurred, the HP, or the remaining value of the strength level may be used as the condition. That is, in the case where one contact with the enemy character does not promptly result in a failure, but each contact with the enemy character is accumulated as a predetermined amount of damage, and excessive amounts of damage exceeding the HP or the strength level lead to a failure (or game over), it may be set such that the model block appears when the amounts of damage incurred exceeds a predetermined value.

Further, it may be set such that the model block appears when it is determined that the player comes to a stalemate in the game progress. For example, when the player character is located at a certain point in the course (e.g., a point in front of a closed door), and the player is thinking while releasing the controller 7 from his/her hand since he/she does not know how to proceed forward (how to open the door), it is assumed that the player character 105 stays at a single position and does not move at all. Alternatively, in such a location, in the case where the player cannot cause the player character to proceed forward even if the player operates the player character 105 in one way or another so as to solve the gimmick, it is assumed that the player character 105 will be loafing around or repeating the same motion (in other words, hardly moving) in a relatively small range. Accordingly, it may be set such that the state where the player character 105 stops moving for a predetermined period of time or more is detected, and that the process for causing the model block to appear in the vicinity of the player character 105 is performed, based on the assumption that the player has difficulty in finding how to proceed forward in such a state. Further, it may be set such that the state where the player character 105 hardly moves or repeats the same motion is detected, and the process for causing the model block to appear is performed, based on the assumption that the player comes to the stalemate in such a state. For example, the history of the operation data 134 is stored, and based on the history of the operation performed in the past several minutes, it is determined whether or not the player character 105 repeats the same operation and moves within a predetermined range of distance. When the above condition is satisfied, the model block may be caused to appear in the vicinity of the player character 105. Alternatively, by recording the movement trajectory of the player character 105, it may be determined whether or not the movement trajectory shows a repetitive motion at a single location. Further, in such a case, the model play with the use of the model block may be started at the beginning of the course in the same manner as the case of the above embodiment. Alternatively, the model play may be started at the point where the model block has appeared.

Further, as to the configuration of the number of failures data 1392, in the above embodiment, it is configured such that the number of failures data 1392 is prepared in a manner as to be associated with the respective courses, and that the number of failures can be recorded for each course (see FIG. 26). However, the present invention is not limited to such a configuration, but it may be configured such that the course is not associated with the number of failures. That is, it may be configured such that only one piece of failures data 1392 is prepared, and only the number of continuous failures is counted regardless of the location of the course being played. In this case, each time the course being played is changed (for example, when a player changes the course to proceed to, such as when a player has continuously failed four times in the course 1-2, and changes the course to be played to the course 1-1), the number of failures data may be reset.

In the above embodiment, a case has been described where only a single player character 105 appears, that is, the game is played by a single player. Without limiting to this, the present invention may be applicable to a two-party simultaneous play, or a multi-party simultaneous play. In such a case, at the time of preparing the model operation data 136 in the game development stage, model operation data for 1P player character and that for 2P player character may be generated. For the model play, two teacher characters are caused to appear, and the motion of one of the teacher characters may be controlled based on the model operation data for the 1P player character, and the motion of the other may be controlled based on the model operation data for the 2P player character.

Figure 31:
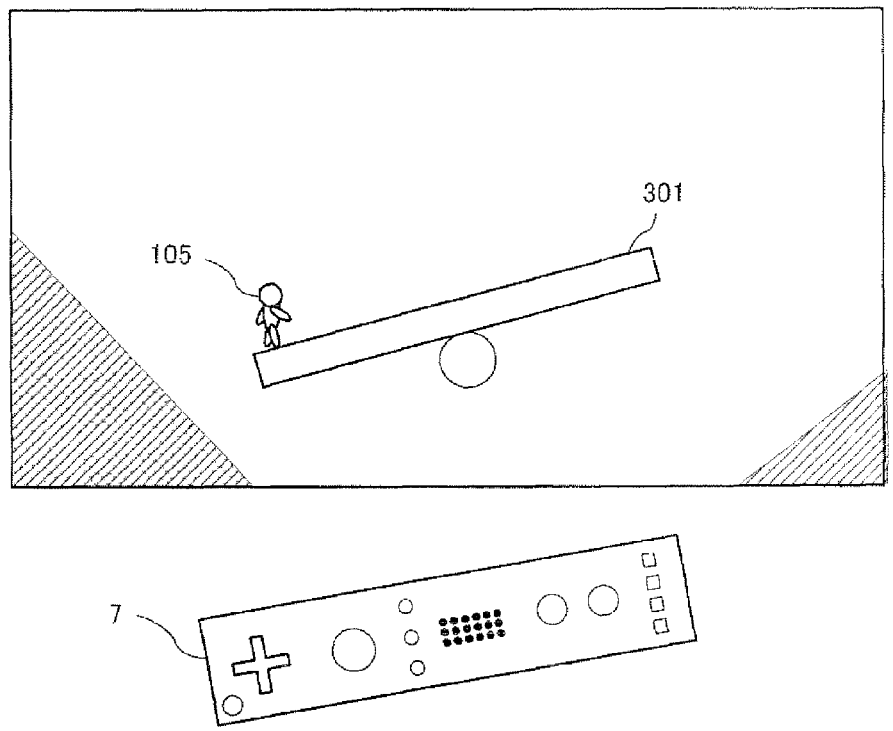
FIG. 31 is an example of a gimmick performed by using acceleration data.
Figure 32:
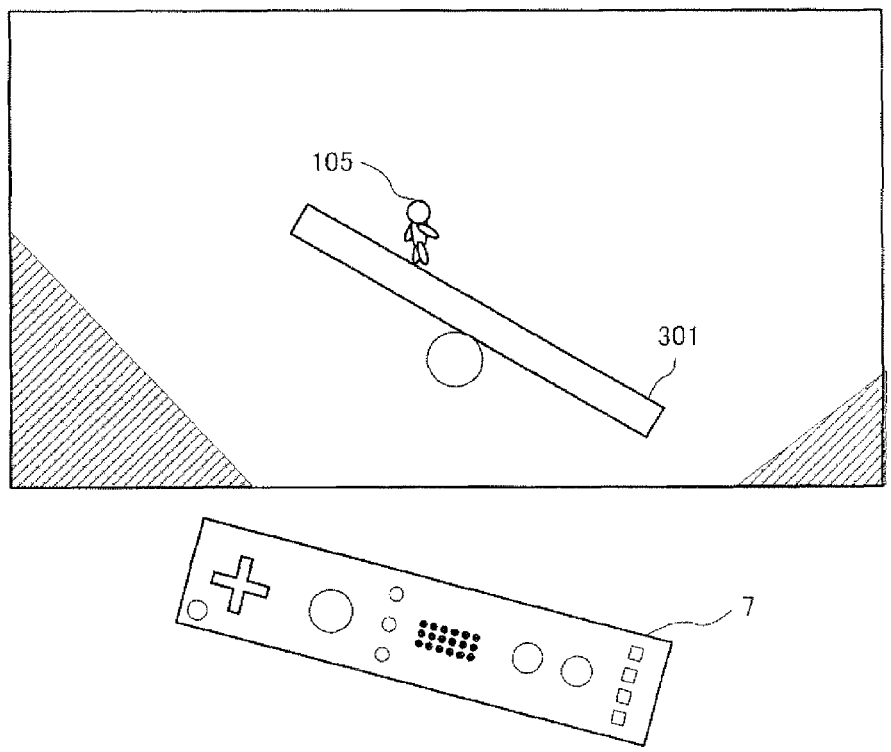
FIG. 32 is an example of a gimmick performed by using acceleration data.

Further, in the above embodiment, as an exemplary operation using the acceleration data, the "spin-jump" which is realized by swinging the controller 7 has been described. As to the contents in the model operation data 136, the acceleration data 138 is recorded, which is the data indicative of whether or not the spin-jump has been performed (whether or not the controller 7 has been swung). Without limiting to this configuration, data of three-axis (X-, Y-, and Z-axis) components detected by the acceleration sensor 701 may be recorded. For example, the tilt of the controller 7 itself is calculated from the above-described acceleration data so as to reflect the operation during a game, and it is assumed that a seesaw-like lift 301 shown in FIG. 31 is set as a gimmick to be reflected on the operations in the game. As shown in FIG. 31 (an example of tilting the lift 301 to the left) and FIG. 32 (an example of tilting the same to the right, likewise), the lift 301 itself can be tilted depending on the tilt of the controller 7. For a course in which the lift 301 is utilized, at the time of preparing the model operation data 136, the game program is configured so as to allow identification of whether or not the player character 105 is on the lift 301. For example, it may be considered, while the player character 105 is on the lift 301, a flag indicative of such a state is ON. At the time of preparing the model operation data 136, it may be set such that the acceleration data outputted from the controller 7 is recorded only while the flag is ON. In this manner, the acceleration data is recorded only for the scene the acceleration data is necessary, whereby it is possible to minimize the data size of the model operation data 136. Moreover, during the above-described model play, it is set such that only when the flag indicating that the player character 105 is on the lift 301 is ON, the acceleration data included in the model operation data 136 is referred to, and accordingly, the motion of the lift 301 is controlled.

Further, not only the acceleration data but also a gyro-sensor may be provided to the controller 7, thereby to allow a game operation using the angular velocity data and recording of the operation. For example, for controlling the tilt of the above lift 301, the angular velocity data may be used instead of the acceleration data.

Further, the model operation data 136 may include the marker coordinates outputted from the imaging information calculation section 74. When the player holds the controller 7 with the front surface (the side having an entrance of light to be captured by the imaging information calculation section 74) of the controller 7 facing the markers 8a and 8b, for example, a process utilizing pointed-to positions (pointed-to coordinates) which are pointed to by the player with the controller 7 can be reproduced as the model play.

Further, in the above embodiment, a 2D scrolling action game has been described as an example, however, the type of games is not limited thereto. For example, the present invention is applicable to a car race game, a role-playing game, and the like.

(Second Embodiment)

Next, with reference to FIG. 33 to FIG. 46, a second embodiment of the present invention will be described. In the above first embodiment, data relating to the motion of the player character 105 is used as the model operation data 136. On the other hand, in the second embodiment, the model operation data 136 includes data of elements other than those relating to the motion of the player character 105 (hereinafter referred to as extended data). The extended data is data directly related to or directly affecting the motion of the player character 105 automatically controlled (i.e., in this embodiment, data relating to a BGM-associated motion to be described below). Note that the game apparatus 3 according to this embodiment is similar to that according to the first embodiment, and thus the same reference numerals are used and detailed description thereof will be omitted.

Next, an outline of a game considered in the second embodiment will be described. Basically, the game in the second embodiment is similar to the game described in the first embodiment, and in addition allows the enemy character 112 to perform a specific motion in line with the BGM. For example, at a certain timing in the BGM (when an accentual sound is rendered in a musical composition), the enemy character 112 being on the move stops for a moment, and makes a slight jump on the spot. In this manner, the enemy character 112 performs a predetermined motion in line with the BGM (it seems as if the enemy character dances to the BGM). Hereinafter, the motion is referred to as the BGM-associated motion.

Figure 33:
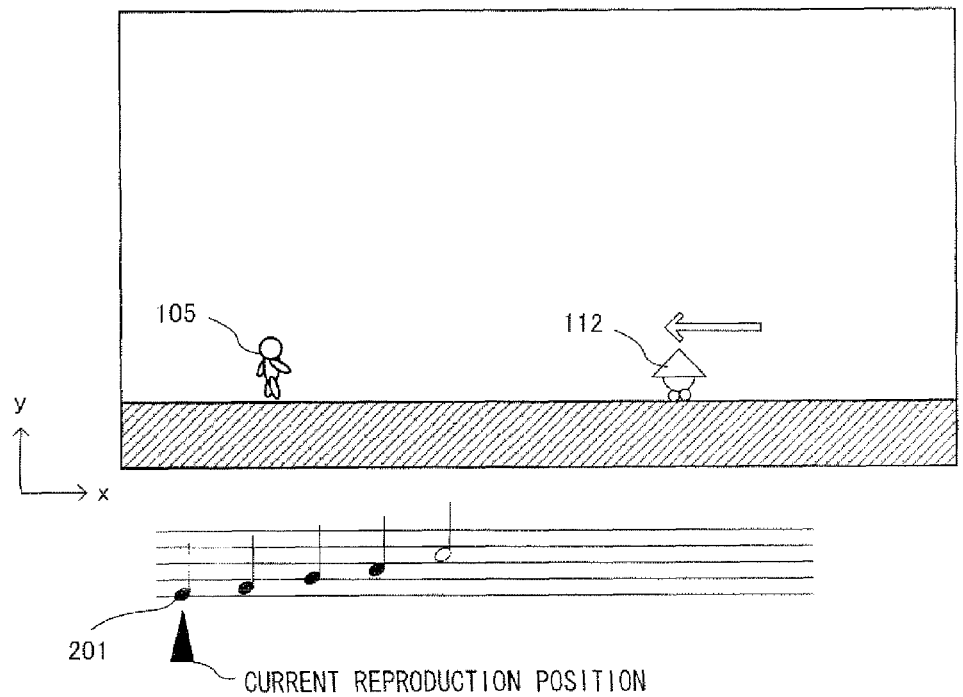
FIG. 33 is a diagram illustrating an outline of a process according to a second embodiment.

In the above-described game, suppose that during the preparation of the model operation data 136, the motion of the enemy character 112 and the operation of the player character 105 are performed as follows. Firstly, as shown in FIG. 33, suppose a state where the enemy character 112 moves from right to left in the screen (In FIG. 33 or the like, an arrow displayed near the enemy character 112 is provided to conveniently indicate the direction in which the enemy character 112 moves). Further, in this case, the player character 105 is located on the left side of the screen, and the player (in this case a developer performing the model operation) is choosing a timing for a trample attack against the enemy character. In addition, in FIG. 33, in order to indicate the BGM played at that moment, a musical score is schematically shown below the screen example. The position indicated by a triangle in the musical score is a position of the musical composition (a note 201) currently reproduced. Hereinafter, the state of the timing shown in the diagram is referred to as a "first frame state".

Figure 34:
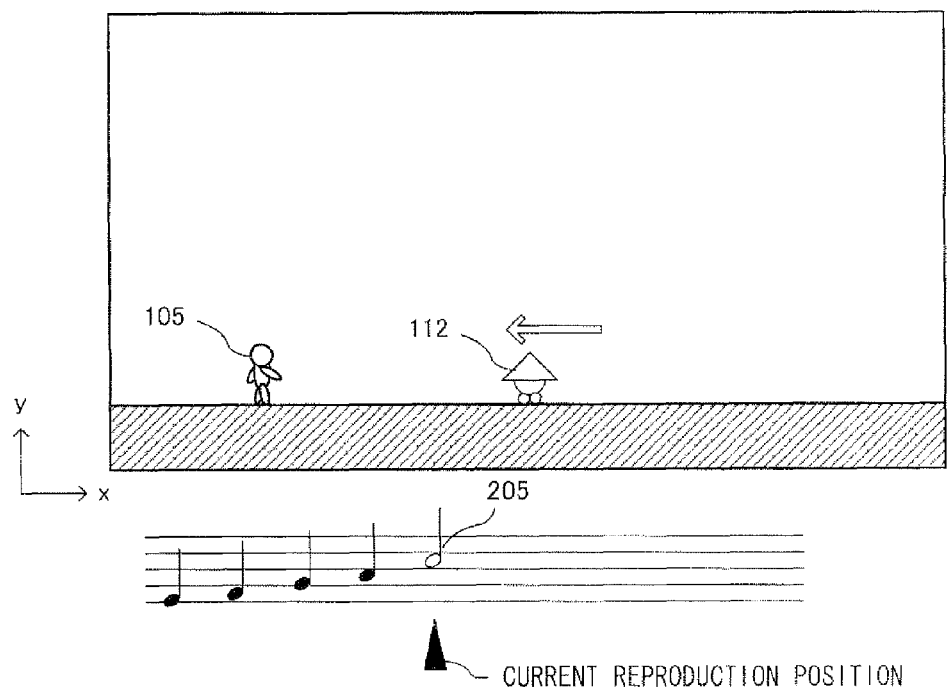
FIG. 34 is a diagram illustrating an outline of a process according to the second embodiment.
Figure 35:
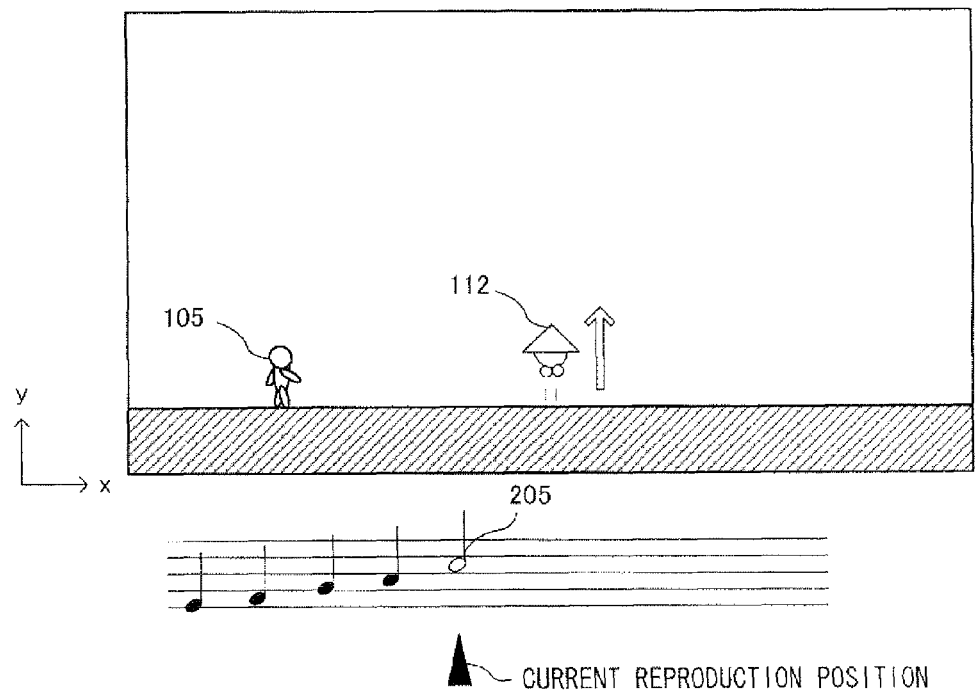
FIG. 35 is a diagram illustrating an outline of a process according to the second embodiment.
Figure 36:
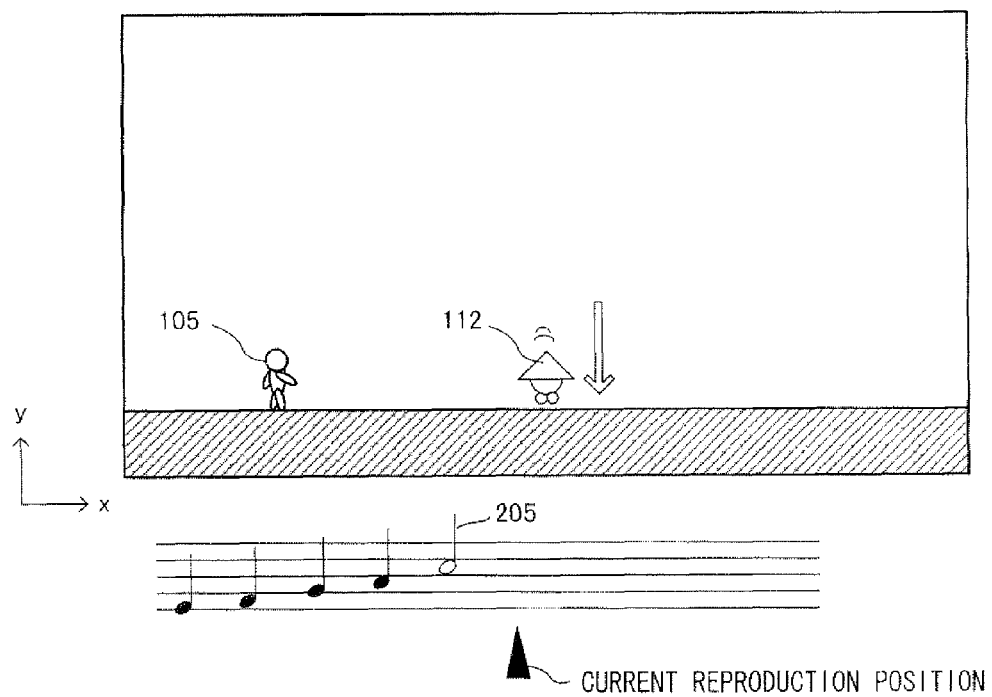
FIG. 36 is a diagram illustrating an outline of a process according to the second embodiment.

Next, suppose that the game proceeds to the state shown in FIG. 34 thereafter. That is, the enemy character 112 has moved further to the left, and consequently, the enemy character 112 has reached almost the center of the screen along the x-axis. In addition, reproduction of the BGM also proceeds, and the note 205 is reproduced. Here, the timing is set such that the time when the note 205 is reproduced corresponds to the time when the enemy character 112 performs the BGM-associated motion. Hereinafter this timing is referred to as trigger timing. As a result, as shown in FIG. 35, the enemy character 112 stops moving to the left at this timing, and makes a slight jump on the spot. Hereinafter, the state of the timing shown in FIG. 34 and FIG. 35 is referred to as a "second frame state". Thereafter, as shown in FIG. 36, the enemy character 112 lands on the ground. Further, the reproduction of the BGM also proceeds forward. Hereinafter, the state of the timing shown in the diagram is referred to as a "third frame state".

Figure 37:
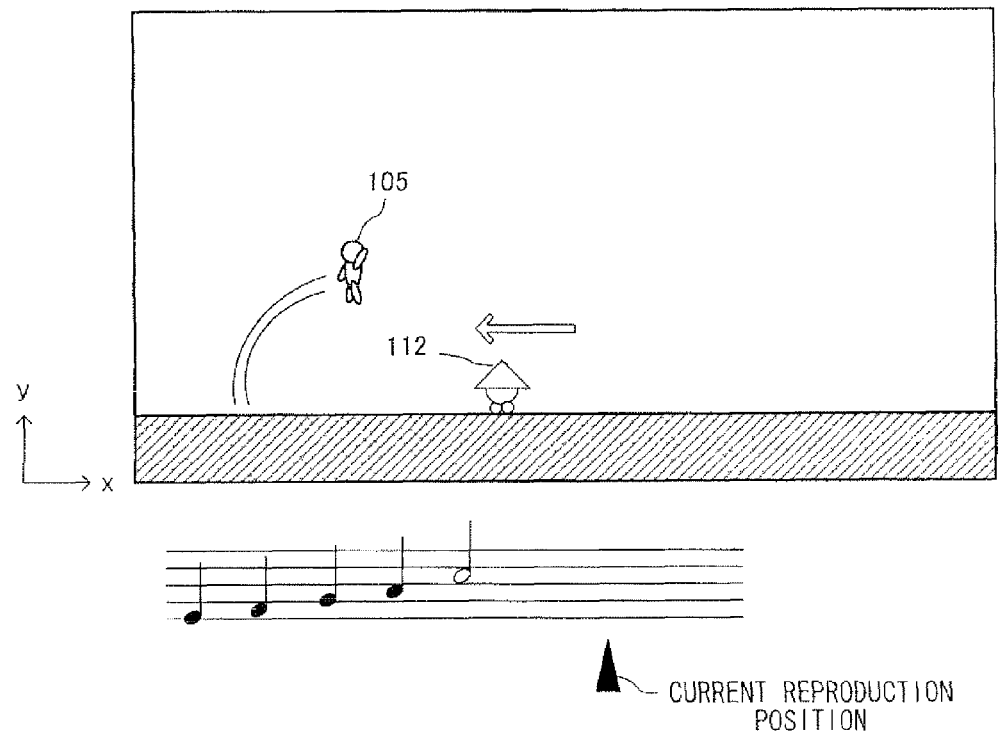
FIG. 37 is a diagram illustrating an outline of a process according to the second embodiment.

Thereafter, as shown in FIG. 37, the enemy character 112 restarts moving to the left. Hereinafter, the state of this timing shown in the diagram is referred to as a "fourth frame state". At this timing, the developer performs an operation to cause the player character 105 to jump upwardly to the right so that the player character 105 performs the trample attack against the enemy character 112.

Figure 38:
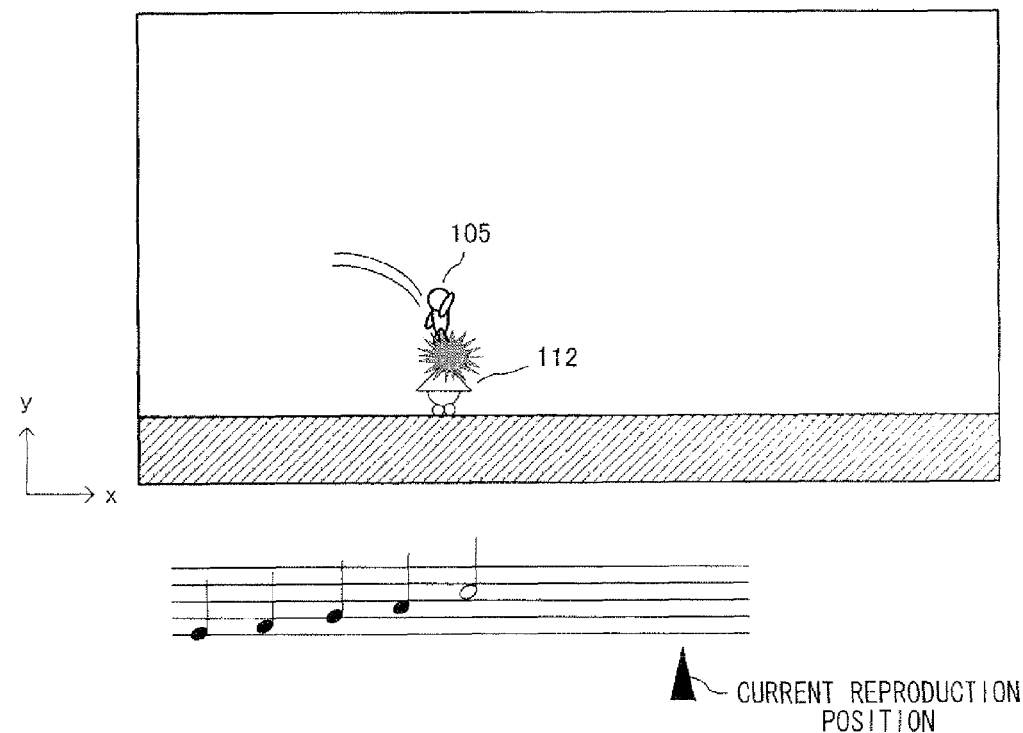
FIG. 38 is a diagram illustrating an outline of a process according to the second embodiment.
Figure 39:
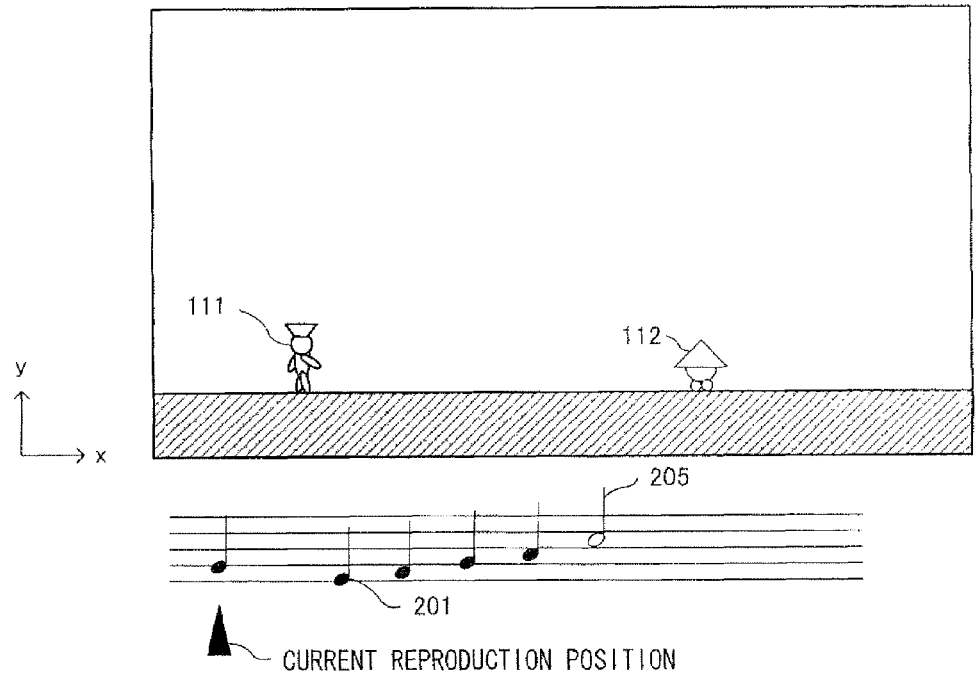
FIG. 39 is a diagram illustrating an outline of a process according to the second embodiment.

Thereafter, as shown in FIG. 38, the player character 105 tramples the enemy character 112 having moved further to the left, whereby the "trample attack" against the enemy character 112 succeeds. Hereinafter, the state of this timing is referred to as a "fifth frame state".

As described above, when the model operation data 136 is prepared, the player character 105 starts the motion of the "trample attack" in the above "fourth frame state".

In the present embodiment, the BGM is reproduced by streaming. At the start of a predetermined course, BGM data is loaded from the optical disc 4, and reproduction of the BGM starts. There may be a case where it takes time to load the BGM data at the start of the course due to dust on the main surface of the optical disc 4 or the like. As a result, the start of reproduction of the BGM may be delayed as compared to the environment where the BGM is played for preparation of the model operation data. When the start of reproduction of the BGM is delayed in this manner, the BGM-associated motion by the enemy character 112 may be performed slightly differently in time as compared to the same motion prepared for the model operation data 136. FIG. 39 to FIG. 44 are diagrams each showing a case where the motion of the teacher character 111 is controlled based on the model operation data 136 while the start of reproduction of the BGM is slightly delayed as compared to the start of the BGM prepared for the model operation data 136, which has been described with reference to FIG. 33 to FIG. 38. In this case, firstly, the BGM reproduction position in FIG. 39, which temporally corresponds to the "first frame state", does not reach the BGM reproduction position indicated in FIG. 33.

Figure 40:
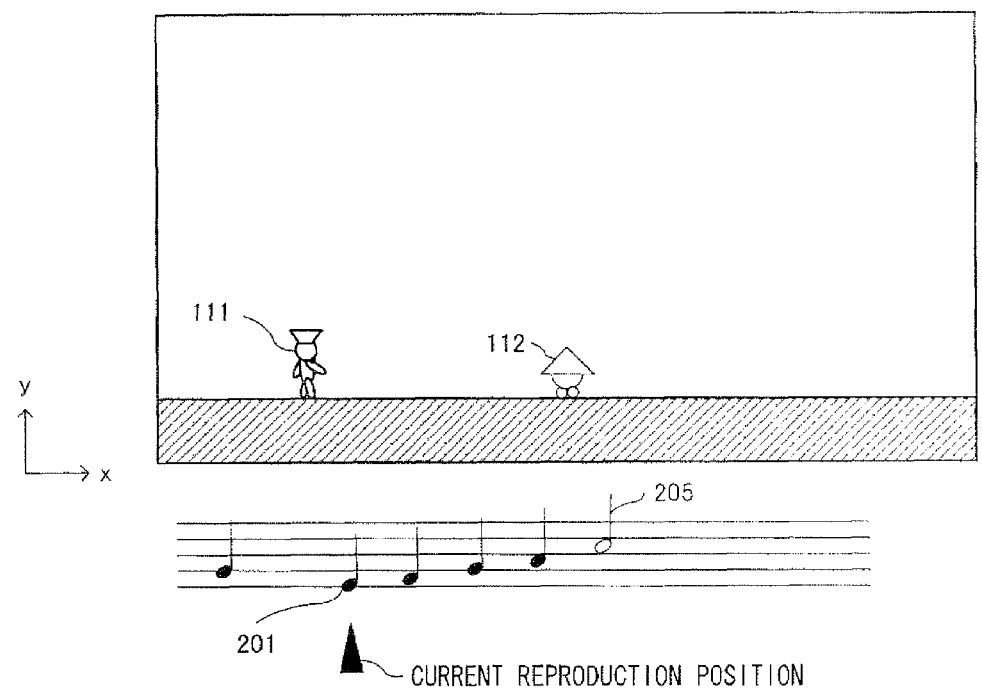
FIG. 40 is a diagram illustrating an outline of a process according to the second embodiment.

The BGM reproduction position in FIG. 40, which temporally corresponds to the "second frame state", actually corresponds to the position of the note 201 shown in FIG. 33.

Figure 41:
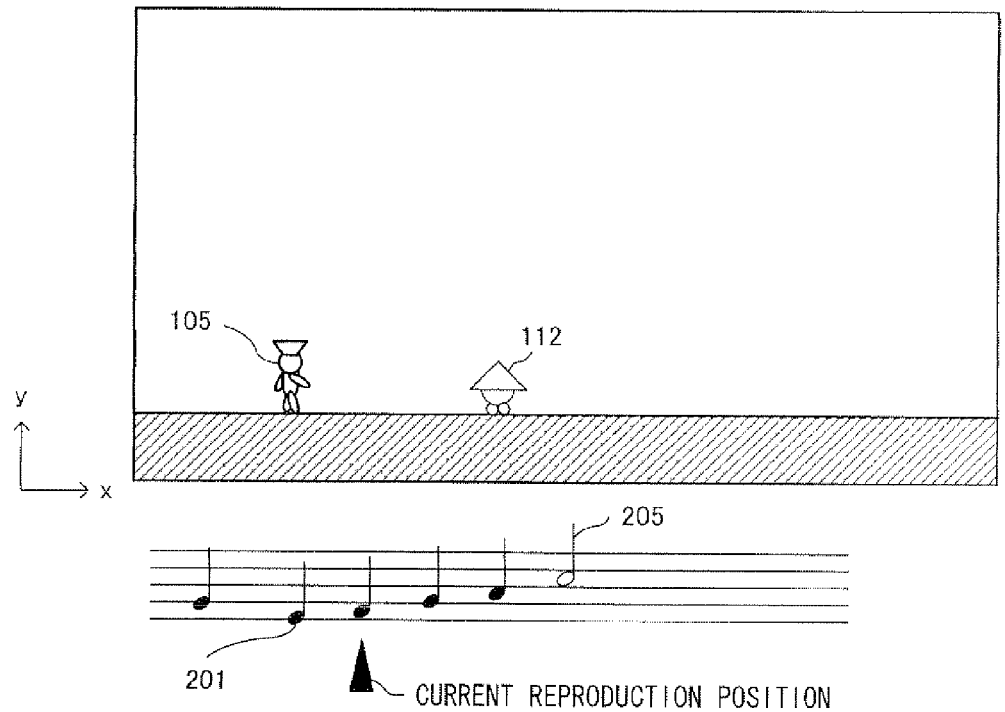
FIG. 41 is a diagram illustrating an outline of a process according to the second embodiment.
Figure 42:
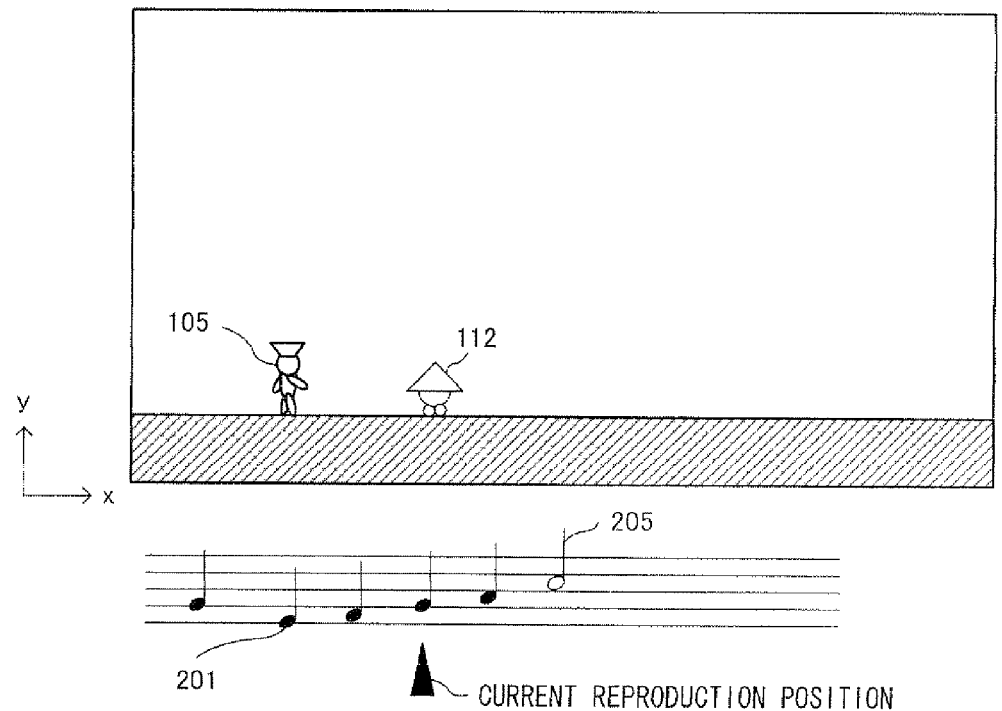
FIG. 42 is a diagram illustrating an outline of a process according to the second embodiment.
Figure 43:
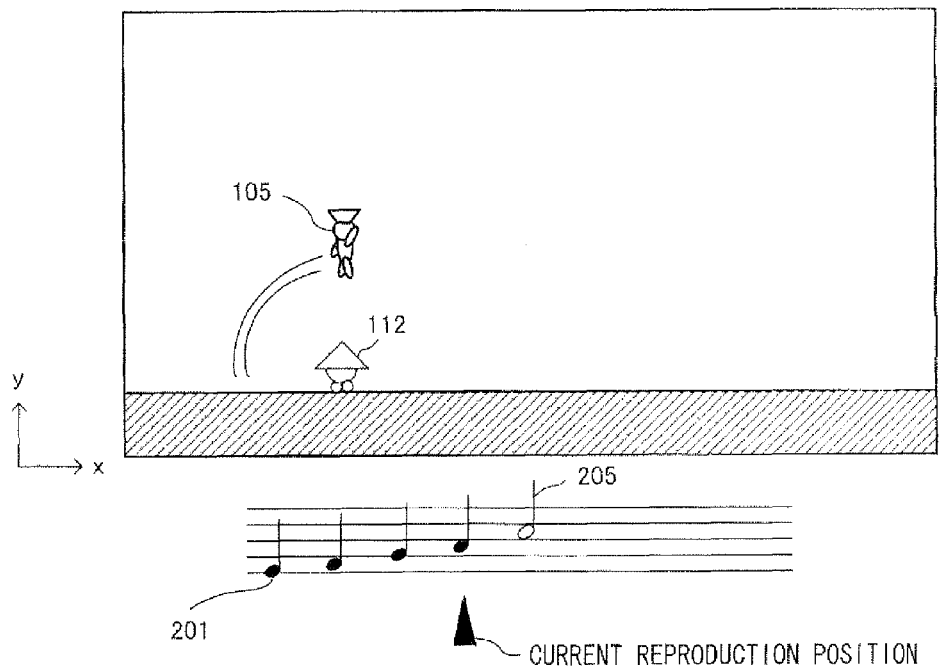
FIG. 43 is a diagram illustrating an outline of a process according to the second embodiment.
Figure 44:
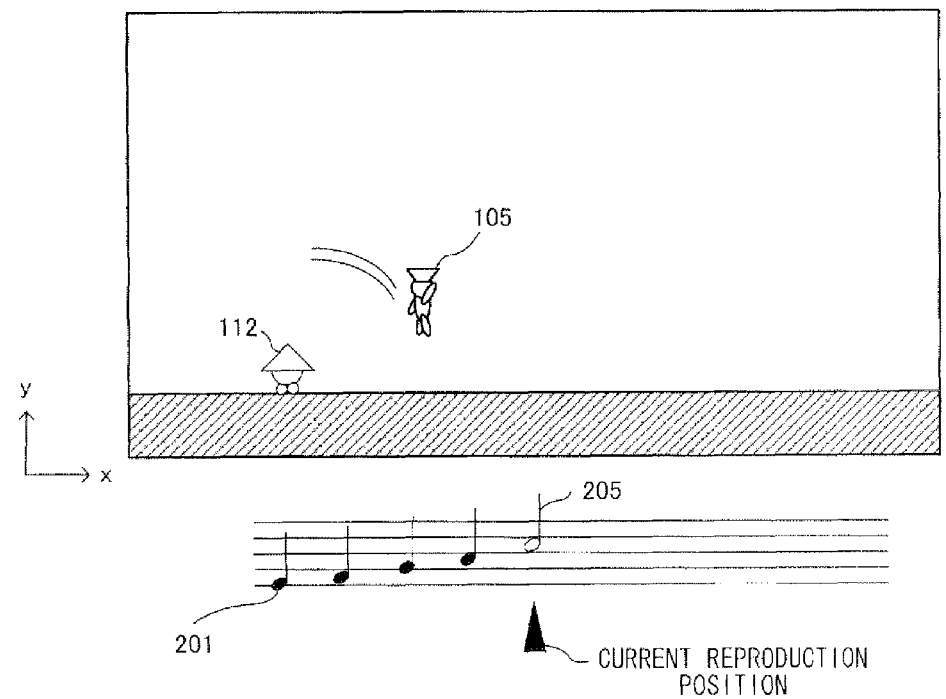
FIG. 44 is a diagram illustrating an outline of a process according to the second embodiment.

FIG. 41 shows the state temporally corresponding to the third frame state, and FIG. 42 shows the state temporally corresponding to the fourth frame state. As described above, in the preparation of the model operation data 136, the enemy character 112 makes a jump in line with the reproduction of the note 205 (trigger timing) in the third frame state and fourth frame state. However, in FIG. 41 and FIG. 42, the BGM reproduction position does not reach the position of the note 205, and thus the enemy character 112 does not make a jump, and simply moves to the left. As a result, as shown in FIG. 43, the position of the enemy character 112 at the time point when the teacher character 111 starts the motion of the "trample attack" is different from the position thereof at the same time point prepared for the model operation data. Accordingly, as shown in FIG. 44, the "trample attack" does not hit the enemy character 112, and the attack ends in failure despite the model play.

Therefore, in the second embodiment, data indicative of the above trigger timing is included in the model operation data 136 as extended data. For the "model play", the motion of the player character (teacher character) is controlled by using the button data 137, and in addition, the motion of the enemy character is also controlled (partially) based on the extended data ("partially" indicating the situation where only the BGM-associated motion is controlled in a forcefully interrupted manner, whereas basically, the motion of the enemy character 112 is controlled based on a dedicated conceptual routine). That is, during the model play, technically, the BGM-associated motion (of making a jump on the spot) by the enemy character 112 is not performed in line with the BGM. Instead, the BGM-associated motion is controlled based on the extended data included in the model operation data 136 (as a result, during the model play, the BGM is not necessarily in synchronization with the motion of the enemy character 112. With such a configuration, it is possible to avoid an inappropriate motion from occurring in the model play.

Next, data in the second embodiment will be described. Basically, data having the same configuration as that described in the first embodiment is used in the second embodiment. However, the second embodiment is different from the first embodiment in that the model operation data 136 includes the extended data, and that the BGM data 132 is additionally included. Here, the different data will be described.

Firstly, the BGM data 132 in the second embodiment includes data indicative of the "trigger timing" (hereinafter referred to as trigger data). For example, a value having no relation with the sound to be reproduced is included in a part of the BGM data as trigger data. Alternatively, the following configuration may be arranged. Firstly, based on the information (not shown) indicative of the tempo of the BGM, a beat in the BGM is calculated. Next, the position where the beat occurs is calculated from the number of samples of the BGM stream. Data indicative of the position where the beat occurs is referred to as the "trigger data". That is, the enemy character is caused to perform the BGM-associated motion concurrently with the beat.

Figure 45:
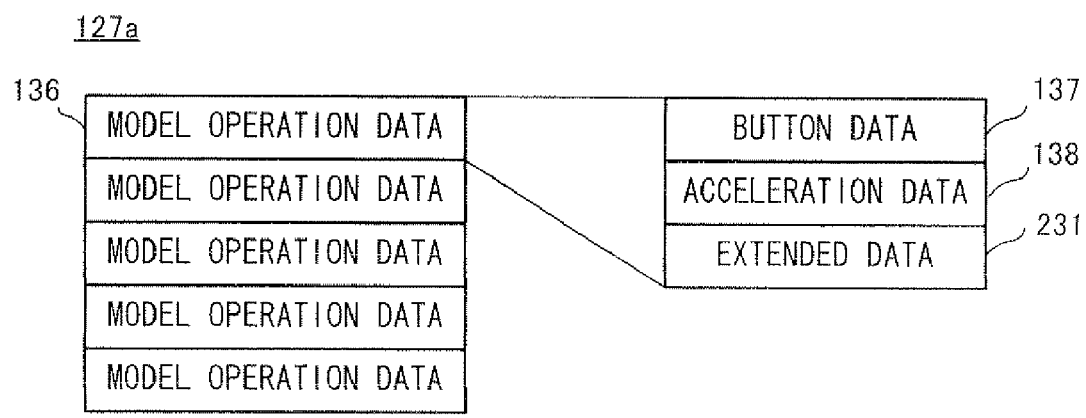
FIG. 45 shows an exemplary configuration of course data 127 according to the second embodiment.

Next, the model operation data 136 in the second embodiment will be described. FIG. 45 is a diagram showing an exemplary configuration of the model operation data 136 according to the second embodiment. The model operation data 136 shown in FIG. 45 includes the extended data 231 in addition to the configuration of the model operation data 136 described in the first embodiment with reference to FIG. 23. The extended data 231 is data indicative of whether or not the above trigger timing has occurred. In this embodiment, when the value of the extended data 231 is "0", it is indicated that the trigger timing does not occur, whereas when the value is "1", it is indicated that the trigger timing has occurred. Further, to prepare the data, during the preparation of the model operation data (while the developer is performing model operations), the above BGM data is loaded every frame, and when the trigger data is detected, "1" is set to and recorded in the extended data 231.

Next, the game processing according to the second embodiment will be described. The game processing according to the second embodiment is basically the same as the processes described in the first embodiment. However, as to the process relating to the "model play", a partially different process is performed, and a function different from that of the first embodiment is realized. Hereinbelow, only the partially different process will be described.

Specifically, the process relates to the course process described in the first embodiment with reference to FIG. 28 and FIG. 29, and is based on the process flowchart shown in FIG. 46 instead of the process flowchart shown in FIG. 29. That is, in FIG. 46, after the process in step S29, in step S81, the BGM-associated motion of the enemy character 112 is controlled based on the above extended data 231. In other words, when the value of the extended data 231 is "1", the motion is controlled such that the enemy character 112 is caused to make a slight jump on the spot. Thereafter, the processes in step S30 and thereafter which are described in the first embodiment will be performed. This is the end of the description of the game processing according to the second embodiment.

In this manner, in the second embodiment, when the enemy character is caused to perform a predetermined motion in line with the BGM, those elements which are likely to affect the model play (the trigger timing in this case) is included in the model operation data so as not to adversely affect the motion of the teacher character 111 controlled by the model play. In other words, as to an element which has no relation with the input operation by the player but controls a timing of a predetermined motion during an ordinary game play, and which directly affects the motion of the player character, such as the motion of the enemy character performed in line with the BGM as described above, such an element may be included in the data such as the model operation data that automatically controls the motion of the player character.

In the above description, for the sake of the simple explanation, only one type of the enemy character 112 has been described. However, when a plurality of types of enemy characters are to appear, the details of the BGM-associated motion may be changed depending on the respective types of enemy characters. Further, an enemy character which performs the BGM-associated motion and an enemy character who does not perform the BGM-associated motion may be arranged in a mixed manner at the above trigger timing. Further, in accordance with the types of enemy characters, a plurality of types of trigger data may be arranged. For example, it is set such that in response to first trigger data, only a first type enemy character performs a BGM-associated motion, and in response to second trigger data, only a second type enemy character performs a BGM-associated motion.

While the invention has been described in detail, the foregoing description is in all aspects illustrative and not restric-

What is claimed is:

1. A non-transitory computer readable storage medium having stored thereon a game program executed by a computer of a game apparatus which includes a predetermined input device outputting operation data indicative of details of an operation input performed by a player and which displays a predetermined operation target character appearing in a virtual game space, the game program causing the computer to perform functionality comprising:
   a manual operator for controlling a motion of the operation target character in accordance with the operation data;
   an automatic operation data obtainer for obtaining, from a predetermined storage device, a series of pieces of operation data which cause the operation target character to move continuously and which are automatic operation data previously stored in the storage device;
   an automatic motion controller for automatically controlling the motion of the operation target character in accordance with the automatic operation data in place of the manual operator; and
   a game controller for performing a first process when a first condition is satisfied as a result of control of the motion of the operation target character by the manual operator without using the automatic operation data, for performing a second process that is different from the first process when a second condition is satisfied, and for performing the first process when the motion of the operation target character is automatically controlled by the automatic motion controller regardless of whether the first condition is satisfied or the second condition is satisfied.

2. The non-transitory computer readable storage medium having stored thereon the game program according to claim 1, the game program further causing the computer to perform functionality comprising:
   a manual/automatic switcher for switching the control of the motion of the operation target character between the control of the motion by the manual operator and that by the automatic motion controller.

3. The non-transitory computer readable storage medium having stored thereon the game program according to claim 2, the game program further causing the computer to perform functionality comprising:
   an automatic control discontinuer for discontinuing the automatic control of the motion by the automatic motion controller in accordance with the operation data inputted during the control of the motion, when the motion of the operation target character is automatically controlled by the automatic motion controller, so as to be switched to the control of the motion by the manual operator.

4. The non-transitory computer readable storage medium having stored thereon the game program according to claim 2, the game program further causing the computer to perform functionality comprising:
   an automatic control instructor for providing an instruction of switching from the control by the manual operator to the automatic control by the automatic controller in accordance with the operation data, wherein
   the control of the motion of the operation target character is switched only when the automatic control instructor provides the instruction.

5. The non-transitory computer readable storage medium having stored thereon the game program according to claim 4, wherein the automatic control instructor is usable only when a predetermined condition during the game is satisfied while the motion of the operation target character is controlled by the manual operator.

6. The non-transitory computer readable storage medium having stored thereon the game program according to claim 5, wherein the automatic control instructor arranges an instruction object in the virtual game space when the predetermined condition during the game is satisfied, and provides the automatic control switcher with an instruction to switch the control of the motion when the operation target character performs a predetermined action to the instruction object.

7. The non-transitory computer readable storage medium having stored thereon the game program according to claim 6, wherein the automatic control instructor arranges the instruction object when the operation target character operated by the manual operator satisfies a predetermined failure condition, which is previously set, for a predetermined number of times.

8. The non-transitory computer readable storage medium having stored thereon the game program according to claim 6, wherein the automatic control instructor arranges the instruction object when play time in the predetermined interval exceeds a threshold which is previously set.

9. The non-transitory computer readable storage medium having stored thereon the game program according to claim 1, wherein the automatic operation data is the series of pieces of operation data representing motions of the operation target character which satisfy the first condition.

10. The non-transitory computer readable storage medium having stored thereon the game program according to claim 1, wherein the game controller is executed in a predetermined interval in a game in progress which is realized by execution of the game program, and performs the first process regardless of whether the first condition or the second condition is satisfied when the motion of the operation target character is automatically controlled by the automatic motion controller in at least a portion of the predetermined interval in the game in progress.

11. The non-transitory computer readable storage medium having stored thereon the game program according to claim 10, wherein
   the game which is realized by execution of the game program includes a plurality of game stages which are obtained by dividing the progress of the game into predetermined units in accordance with how the progress of the game is going, and is designed to cause a player to aim for final game clearing by sequentially clearing the plurality of game stages, and
   the predetermined interval is each of the game stages.

12. The non-transitory computer readable storage medium having stored thereon the game program according to claim 11, wherein
   the first condition is that the operation target character has reached a first point which is previously set in the virtual game space in the game stage, and
   the second condition is that the operation target character has reached a second point which is previously set in the virtual game space in the game stage.

13. The non-transitory computer readable storage medium having stored thereon the game program according to claim 11, wherein
   the first process is a process of setting a predetermined stage as the game stage to be played subsequently, and
   the second process is a process of setting a stage that is different from the predetermined stage as the game stage to be played subsequently.

14. The non-transitory computer readable storage medium having stored thereon the game program according to claim 13, wherein
the first process is a process that allows the player to select the predetermined stage as the game stage to be played subsequently, and
the second process is a process that allows the player to select an other stage than the predetermined stage set by the first process as the game stage to be played subsequently.

15. The non-transitory computer readable storage medium having stored thereon the game program according to claim 10, wherein
the first process is a process for setting a predetermined interval as an interval to be played subsequently, and
the second process is a process for setting an other interval than the predetermined interval set by the first process as the interval to be played subsequently.

16. The non-transitory computer readable storage medium having stored thereon the game program according to claim 1, wherein the first condition and the second condition are predetermined conditions achievable by the operation target character in the virtual game space.

17. The non-transitory computer readable storage medium having stored thereon the game program according to claim 1, the game program further causing the computer to perform functionality comprising:
an inquirer for inquiring whether or not to re-challenge a game stage when the game stage has been cleared while the motion of the operation target object is automatically controlled by the automatic controller; and
a restorer for restoring the state of the game to the state before the start of the game stage when the re-challenge of the game stage is selected in the inquiry by the inquirer.

18. The non-transitory computer readable storage medium having stored thereon the game program according to claim 1, the game program further causing the computer to perform functionality comprising:
a background music reproducer for reproducing a background music including data for partially controlling a motion of a non-operation target character, which is an other character than the operation target character; and
a background music-associated motion controller for partially controlling the motion of the non-operation target character in accordance with the data for partially controlling the motion of the non-operation target character included in the background music, wherein
the automatic operation data includes data for partially controlling the motion of the non-operation target character,
when the motion of the operation target character is controlled by the manual operator, the background music-associated motion controller partially controls the motion of the non-operation target character in accordance with the data for partially controlling the motion of the non-operation target character included in the background music, and
when the motion of the operation target character is automatically controlled by the automatic motion controller, the automatic motion controller partially controls the motion of the non-operation target character in accordance with the data for partially controlling the motion of the non-operation target character included in the automatic operation data.

19. The non-transitory computer readable storage medium having stored thereon the game program according to claim 1, wherein
the input device includes at least one pressable button, and
the automatic operation data includes button data indicative of whether or not an operation of pressing the button is performed.

20. The non-transitory computer readable storage medium having stored thereon the game program according to claim 1, wherein
the input device includes an acceleration sensor, and
the automatic operation data includes acceleration data outputted from the acceleration sensor.

21. The non-transitory computer readable storage medium having stored thereon the game program according to claim 1, wherein
the input device includes an angular velocity sensor, and
the automatic operation data includes angular velocity data outputted from the angular velocity sensor.

22. The non-transitory computer readable storage medium having stored thereon the game program according to claim 1, wherein
the input device includes an imager for capturing at least one imaging target; and
the automatic operation data includes information on the position of an imaging target in a captured image represented by captured image data outputted from the input device including the imager.

23. The non-transitory computer readable storage medium having stored thereon the game program according to claim 1, wherein
the input device includes an analog operator which enables inputs in analog mode, and
the automatic operation data includes analog operation data outputted from the input device including the analog operator.

24. A method for controlling a game in which operation data which indicates details of an operation input performed by a player and is outputted from a predetermined input device is obtained, and a predetermined operation target character appearing in a virtual game space is displayed, the method comprising:
a manual operation step of controlling a motion of the operation target character in accordance with the operation data;
an automatic operation data obtaining step of obtaining, from a predetermined storage device, a series of pieces of operation data which cause the operation target character to move continuously and which are automatic operation data previously stored in the storage device;
an automatic motion controlling step of automatically controlling the motion of the operation target character in accordance with the automatic operation data, in place of the manual operation step; and
a game control step of performing a first process when a first condition is satisfied as a result of control of the motion of the operation target character by the manual operation step without using the automatic operation data, of performing a second process that is different from the first process when a second condition is satisfied, and of performing the first process when the motion of the operation target character is automatically controlled by the automatic motion control step regardless of whether the first condition is satisfied or the second condition is satisfied.

25. A game system which includes a predetermined input device outputting operation data indicative of details of an operation input performed by a player and which displays a predetermined operation target character appearing in a virtual game space, the game system comprising:
- a manual operator for controlling a motion of the operation target character in accordance with the operation data;
- an automatic operation data obtainer for obtaining, from a predetermined storage device, a series of pieces of operation data which cause the operation target character to move continuously and which are automatic operation data previously stored in the storage device;
- an automatic motion controller for automatically controlling the motion of the operation target character in accordance with the automatic operation data in place of the manual operator; and
- a game controller for performing a first process when a first condition is satisfied as a result of control of the motion of the operation target character by the manual operator instead of by the automatic operation data, for performing a second process that is different from the first process when a second condition is satisfied, and for performing the first process when the motion of the operation target character is automatically controlled by the automatic motion controller regardless of whether the first condition is satisfied or the second condition is satisfied.

26. A game apparatus which includes a predetermined input device outputting operation data indicative of details of an operation input performed by a player and which displays a predetermined operation target character appearing in a virtual game space, the game apparatus comprising:
- a processing system having one or more processors and configured to:
  - manually control a motion of the operation target character in accordance with the operation data;
  - obtain, from a predetermined storage device, a series of pieces of operation data which cause the operation target character to move continuously and which are automatic operation data previously stored in the storage device;
  - automatically control the motion of the operation target character in accordance with the automatic operation data, in place of the operation data; and
  - perform a first process when a first condition is satisfied as a result of control of the motion of the operation target character by the operation data without using the automatic operation data, of performing a second process that is different from the first process when a second condition is satisfied, and of performing the first process when the motion of the operation target character is automatically controlled by the automatic operation data regardless of whether the first condition is satisfied or the second condition is satisfied.

* * * * *